US012147175B2

(12) United States Patent
Minato

(10) Patent No.: US 12,147,175 B2
(45) Date of Patent: Nov. 19, 2024

(54) IMAGE FORMING APPARATUS OPERABLE IN PLURAL SETTTING MODES

(71) Applicant: CANON KABUSHIKI KAISHA, Tokyo (JP)

(72) Inventor: Yusuke Minato, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/117,138

(22) Filed: Mar. 3, 2023

(65) Prior Publication Data

US 2023/0280681 A1 Sep. 7, 2023

(30) Foreign Application Priority Data

Mar. 4, 2022 (JP) ................................ 2022-033980

(51) Int. Cl.
*G03G 15/16* (2006.01)
*G03G 15/00* (2006.01)

(52) U.S. Cl.
CPC ..... *G03G 15/1675* (2013.01); *G03G 15/5041* (2013.01); *G03G 15/5058* (2013.01); *G03G 2215/00776* (2013.01)

(58) Field of Classification Search
USPC ............................................................ 399/66
See application file for complete search history.

(56) References Cited

U.S. PATENT DOCUMENTS

| | | | | |
|---|---|---|---|---|
| 8,843,003 | B2 | 9/2014 | Nakao | |
| 10,990,051 | B2 | 4/2021 | Omata et al. | |
| 2013/0039673 | A1* | 2/2013 | Nakao | G03G 15/5062 399/49 |
| 2017/0299987 | A1* | 10/2017 | Sugimoto | G03G 15/1665 |
| 2022/0317608 | A1* | 10/2022 | Minato | G03G 15/1675 |
| 2022/0317610 | A1 | 10/2022 | Minato et al. | |
| 2023/0367249 | A1 | 11/2023 | Minato et al. | |

FOREIGN PATENT DOCUMENTS

| | | | | |
|---|---|---|---|---|
| CN | 104102101 | A * | 10/2014 | G03G 15/065 |
| JP | 2011-197487 | A | 10/2011 | |
| JP | 2013-037185 | A | 2/2013 | |
| JP | 2019066804 | A * | 4/2019 | G03G 15/1665 |
| JP | 2020-086107 | A | 6/2020 | |
| JP | 2021-028669 | A | 2/2021 | |

* cited by examiner

*Primary Examiner* — Quana Grainger
(74) *Attorney, Agent, or Firm* — Venable LLP

(57) ABSTRACT

An image forming apparatus includes an image bearing member, a transfer device, an applying portion; a detecting portion, a controller, and a receiving portion. The controller executes an operation in a setting mode in which during non-image formation, test images are transferred onto the recording material at different test voltages to the transfer device and then a transfer voltage applied to the transfer device during image formation is set on the basis of a detection result of the detecting portion. In a case that the operation in the setting mode is executed to set the transfer voltage for one-side mode, the receiving portion is capable of receiving instruction information selectively instructing a setting condition of the transfer voltage set by the operation in the setting mode from setting conditions including a first setting condition and a second setting condition.

5 Claims, 31 Drawing Sheets

| FIRST SIDE | | WATER CONTENT (g/Kg) | | | | |
|---|---|---|---|---|---|---|
| | | ≤ 0.9 | ··· | 8.9 | ··· | 21.5 ≤ |
| BASIS WEIGHT (g/m²) | · | · | | · | | · |
| | 76～90 | 1000V | ··· | 500V | ··· | 200V |
| | 91～105 | 1150V | ··· | 600V | ··· | 250V |
| | 106～128 | 1300V | ··· | 700V | ··· | 300V |
| | · | · | | · | | · |

| SECOND SIDE | | WATER CONTENT (g/Kg) | | | | |
|---|---|---|---|---|---|---|
| | | ≤ 0.9 | ··· | 8.9 | ··· | 21.5 ≤ |
| BASIS WEIGHT (g/m²) | · | · | | · | | · |
| | 76～90 | 1300V | ··· | 700V | ··· | 300V |
| | 91～105 | 1450V | ··· | 800V | ··· | 350V |
| | 106～128 | 1600V | ··· | 900V | ··· | 400V |
| | · | · | | · | | · |

Fig. 5

ΔN=1_1 SIDE

| No→ | | -20 | -19 | -18 | -17 | -16 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|
| ADJUST PITCH NO. n | 1 | -20 | -20 | -20 | -20 | -20 | -19 | -18 | -17 | -16 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 11 | 11 | 11 | 11 | 11 |
| | 2 | -19 | -19 | -19 | -19 | -19 | -18 | -17 | -16 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 12 | 12 | 12 | 12 | 12 |
| | 3 | -18 | -18 | -18 | -18 | -18 | -17 | -16 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 13 | 13 | 13 | 13 | 13 |
| | 4 | -17 | -17 | -17 | -17 | -17 | -16 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 14 | 14 | 14 | 14 | 14 |
| | 5 | -16 | -16 | -16 | -16 | -16 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 15 | 15 | 15 | 15 | 15 |
| | 6 | -15 | -15 | -15 | -15 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 16 | 16 | 16 | 16 | 16 |
| | 7 | -14 | -14 | -14 | -14 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 17 | 17 | 17 | 17 | 17 |
| | 8 | -13 | -13 | -13 | -13 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 18 | 18 | 18 | 18 | 18 |
| | 9 | -12 | -12 | -12 | -12 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 19 | 19 | 19 | 19 | 19 |
| | 10 | -11 | -11 | -11 | -11 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 | 20 | 20 | 20 | 20 | 20 |
| T→ | | -16 | -16 | -16 | -16 | -16 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 15 | 15 | 15 | 15 | 15 |

Fig. 13A-1

ΔN=1_2 SIDE

| | No→ | -20 | -19 | -18 | -17 | -16 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|
| | T→ | -16 | -16 | -16 | -16 | -16 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 15 | 15 | 15 | 15 | 15 |
| ADJUST PITCH NO. n | 1 | -20 | -20 | -20 | -20 | -20 | -19 | -18 | -17 | -16 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 11 | 11 | 11 | 11 | 11 |
| | 2 | -19 | -19 | -19 | -19 | -19 | -18 | -17 | -16 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 12 | 12 | 12 | 12 | 12 |
| | 3 | -18 | -18 | -18 | -18 | -18 | -17 | -16 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 13 | 13 | 13 | 13 | 13 |
| | 4 | -17 | -17 | -17 | -17 | -17 | -16 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 14 | 14 | 14 | 14 | 14 |
| | 5 | -16 | -16 | -16 | -16 | -16 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 15 | 15 | 15 | 15 | 15 |
| | 6 | -15 | -15 | -15 | -15 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 16 | 16 | 16 | 16 | 16 |
| | 7 | -14 | -14 | -14 | -14 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 17 | 17 | 17 | 17 | 17 |
| | 8 | -13 | -13 | -13 | -13 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 18 | 18 | 18 | 18 | 18 |
| | 9 | -12 | -12 | -12 | -12 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 19 | 19 | 19 | 19 | 19 |
| | 10 | -11 | -11 | -11 | -11 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 | 20 | 20 | 20 | 20 | 20 |

Fig. 13A-2

ΔN=2_1 SIDE

| | No→ | -20 | -19 | -18 | -17 | -16 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|
| ADJUST PITCH NO. n | 1 | -20 | -19 | -20 | -19 | -20 | -19 | -20 | -19 | -20 | -19 | -18 | -17 | -16 | -15 | -14 | -13 | -12 | -11 | -10 | -9 | -8 | -7 | -6 | -5 | -4 | -3 | -2 | -1 | 0 | 1 | 2 | 1 | 2 | 1 | 2 | 1 | 2 | 1 | 2 | 1 | 2 |
| | 2 | -18 | -17 | -18 | -17 | -18 | -17 | -18 | -17 | -18 | -17 | -16 | -15 | -14 | -13 | -12 | -11 | -10 | -9 | -8 | -7 | -6 | -5 | -4 | -3 | -2 | -1 | 0 | 1 | 2 | 3 | 4 | 3 | 4 | 3 | 4 | 3 | 4 | 3 | 4 | 3 | 4 |
| | 3 | -16 | -15 | -16 | -15 | -16 | -15 | -16 | -15 | -16 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 5 | 6 | 5 | 6 | 5 | 6 | 5 | 6 | 5 | 6 |
| | 4 | -14 | -13 | -14 | -13 | -14 | -13 | -14 | -13 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 7 | 8 | 7 | 8 | 7 | 8 | 7 | 8 | 7 | 8 |
| | 5 | -12 | -11 | -12 | -11 | -12 | -11 | -12 | -11 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 9 | 10 | 9 | 10 | 9 | 10 | 9 | 10 | 9 | 10 |
| | 6 | -10 | -9 | -10 | -9 | -10 | -9 | -10 | -9 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 11 | 12 | 11 | 12 | 11 | 12 | 11 | 12 | 11 | 12 |
| | 7 | -8 | -7 | -8 | -7 | -8 | -7 | -8 | -7 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 13 | 14 | 13 | 14 | 13 | 14 | 13 | 14 | 13 | 14 |
| | 8 | -6 | -5 | -6 | -5 | -6 | -5 | -6 | -5 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 15 | 16 | 15 | 16 | 15 | 16 | 15 | 16 | 15 | 16 |
| | 9 | -4 | -3 | -4 | -3 | -4 | -3 | -4 | -3 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 17 | 18 | 17 | 18 | 17 | 18 | 17 | 18 | 17 | 18 |
| | 10 | -2 | -1 | -2 | -1 | -2 | -1 | -2 | -1 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 | 19 | 20 | 19 | 20 | 19 | 20 | 19 | 20 | 19 | 20 |
| | T→ | -12 | -11 | -12 | -11 | -12 | -11 | -12 | -11 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 9 | 10 | 9 | 10 | 9 | 10 | 9 | 10 | 9 | 10 |

Fig. 13B-1

ΔN=2_2 SIDE

| | | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|
| No→ | | -20 | -19 | -18 | -17 | -16 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 |
| T→ | | -12 | -11 | -12 | -11 | -12 | -11 | -12 | -11 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 9 | 10 | 9 | 10 | 9 | 10 | 9 | 10 | 9 | 10 |
| ADJUST PTCH NO. n | 1 | -20 | -19 | -20 | -19 | -20 | -19 | -20 | -19 | -20 | -19 | -18 | -17 | -16 | -15 | -14 | -13 | -12 | -11 | -10 | -9 | -8 | -7 | -6 | -5 | -4 | -3 | -2 | -1 | 0 | 1 | 2 | 1 | 2 | 1 | 2 | 1 | 2 | 1 | 2 | 1 | 2 |
| | 2 | -18 | -17 | -18 | -17 | -18 | -17 | -18 | -17 | -18 | -17 | -16 | -15 | -14 | -13 | -12 | -11 | -10 | -9 | -8 | -7 | -6 | -5 | -4 | -3 | -2 | -1 | 0 | 1 | 2 | 3 | 4 | 3 | 4 | 3 | 4 | 3 | 4 | 3 | 4 | 3 | 4 |
| | 3 | -16 | -15 | -16 | -15 | -16 | -15 | -16 | -15 | -16 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 5 | 6 | 5 | 6 | 5 | 6 | 5 | 6 | 5 | 6 |
| | 4 | -14 | -13 | -14 | -13 | -14 | -13 | -14 | -13 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 7 | 8 | 7 | 8 | 7 | 8 | 7 | 8 | 7 | 8 |
| | 5 | -12 | -11 | -12 | -11 | -12 | -11 | -12 | -11 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 9 | 10 | 9 | 10 | 9 | 10 | 9 | 10 | 9 | 10 |
| | 6 | -10 | -9 | -10 | -9 | -10 | -9 | -10 | -9 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 11 | 12 | 11 | 12 | 11 | 12 | 11 | 12 | 11 | 12 |
| | 7 | -8 | -7 | -8 | -7 | -8 | -7 | -8 | -7 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 13 | 14 | 13 | 14 | 13 | 14 | 13 | 14 | 13 | 14 |
| | 8 | -6 | -5 | -6 | -5 | -6 | -5 | -6 | -5 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 15 | 16 | 15 | 16 | 15 | 16 | 15 | 16 | 15 | 16 |
| | 9 | -4 | -3 | -4 | -3 | -4 | -3 | -4 | -3 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 17 | 18 | 17 | 18 | 17 | 18 | 17 | 18 | 17 | 18 |
| | 10 | -2 | -1 | -2 | -1 | -2 | -1 | -2 | -1 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 | 19 | 20 | 19 | 20 | 19 | 20 | 19 | 20 | 19 | 20 |

Fig. 13B-2

ΔN=3_1 SIDE

| No→ | | -20 | -19 | -18 | -17 | -16 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|
| ADJST PITCH NO. n | 1 | -20 | -19 | -18 | -20 | -19 | -18 | -20 | -19 | -18 | -20 | -19 | -18 | -20 | -19 | -18 | -17 | -16 | -15 | -14 | -13 | -12 | -11 | -10 | -9 | -8 | -7 | -9 | -8 | -7 | -9 | -8 | -7 | -9 | -8 | -7 | -9 | -8 | -7 | -9 | -8 | -7 |
| | 2 | -17 | -16 | -15 | -17 | -16 | -15 | -17 | -16 | -15 | -17 | -16 | -15 | -17 | -16 | -15 | -14 | -13 | -12 | -11 | -10 | -9 | -8 | -7 | -6 | -5 | -4 | -6 | -5 | -4 | -6 | -5 | -4 | -6 | -5 | -4 | -6 | -5 | -4 | -6 | -5 | -4 |
| | 3 | -14 | -13 | -12 | -14 | -13 | -12 | -14 | -13 | -12 | -14 | -13 | -12 | -14 | -13 | -12 | -11 | -10 | -9 | -8 | -7 | -6 | -5 | -4 | -3 | -2 | -1 | -3 | -2 | -1 | -3 | -2 | -1 | -3 | -2 | -1 | -3 | -2 | -1 | -3 | -2 | -1 |
| | 4 | -11 | -10 | -9 | -11 | -10 | -9 | -11 | -10 | -9 | -11 | -10 | -9 | -11 | -10 | -9 | -8 | -7 | -6 | -5 | -4 | -3 | -2 | -1 | 0 | 1 | 2 | 0 | 1 | 2 | 0 | 1 | 2 | 0 | 1 | 2 | 0 | 1 | 2 | 0 | 1 | 2 |
| | 5 | -8 | -7 | -6 | -8 | -7 | -6 | -8 | -7 | -6 | -8 | -7 | -6 | -8 | -7 | -6 | -5 | -4 | -3 | -2 | -1 | 0 | 1 | 2 | 3 | 4 | 5 | 3 | 4 | 5 | 3 | 4 | 5 | 3 | 4 | 5 | 3 | 4 | 5 | 3 | 4 | 5 |
| | 6 | -5 | -4 | -3 | -5 | -4 | -3 | -5 | -4 | -3 | -5 | -4 | -3 | -5 | -4 | -3 | -2 | -1 | 0 | 1 | 2 | 3 | 4 | 5 | 6 | 7 | 8 | 6 | 7 | 8 | 6 | 7 | 8 | 6 | 7 | 8 | 6 | 7 | 8 | 6 | 7 | 8 |
| | 7 | -2 | -1 | 0 | -2 | -1 | 0 | -2 | -1 | 0 | -2 | -1 | 0 | -2 | -1 | 0 | 1 | 2 | 3 | 4 | 5 | 6 | 7 | 8 | 9 | 10 | 11 | 9 | 10 | 11 | 9 | 10 | 11 | 9 | 10 | 11 | 9 | 10 | 11 | 9 | 10 | 11 |
| | 8 | 1 | 2 | 3 | 1 | 2 | 3 | 1 | 2 | 3 | 1 | 2 | 3 | 1 | 2 | 3 | 4 | 5 | 6 | 7 | 8 | 9 | 10 | 11 | 12 | 13 | 14 | 12 | 13 | 14 | 12 | 13 | 14 | 12 | 13 | 14 | 12 | 13 | 14 | 12 | 13 | 14 |
| | 9 | 4 | 5 | 6 | 4 | 5 | 6 | 4 | 5 | 6 | 4 | 5 | 6 | 4 | 5 | 6 | 7 | 8 | 9 | 10 | 11 | 12 | 13 | 14 | 15 | 16 | 17 | 15 | 16 | 17 | 15 | 16 | 17 | 15 | 16 | 17 | 15 | 16 | 17 | 15 | 16 | 17 |
| | 10 | 7 | 8 | 9 | 7 | 8 | 9 | 7 | 8 | 9 | 7 | 8 | 9 | 7 | 8 | 9 | 10 | 11 | 12 | 13 | 14 | 15 | 16 | 17 | 18 | 19 | 20 | 18 | 19 | 20 | 18 | 19 | 20 | 18 | 19 | 20 | 18 | 19 | 20 | 18 | 19 | 20 |
| T→ | | -8 | -7 | -6 | -8 | -7 | -6 | -8 | -7 | -6 | -8 | -7 | -6 | -8 | -7 | -6 | -5 | -4 | -3 | -2 | -1 | 0 | 1 | 2 | 3 | 4 | 5 | 3 | 4 | 5 | 3 | 4 | 5 | 3 | 4 | 5 | 3 | 4 | 5 | 3 | 4 | 5 |

Fig. 13C-1

ΔN=3_2 SIDE

| | | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|
| No→ | | -20 | -19 | -18 | -17 | -16 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 |
| T→ | | -8 | -7 | -6 | -8 | -7 | -6 | -8 | -7 | -6 | -8 | -7 | -6 | -8 | -7 | -6 | -5 | -4 | -3 | -2 | -1 | 0 | 1 | 2 | 3 | 4 | 5 | 3 | 4 | 5 | 3 | 4 | 5 | 3 | 4 | 5 | 3 | 4 | 5 | 3 | 4 | 5 |
| ADJST PTCH NO. n | 1 | -20 | -19 | -18 | -20 | -19 | -18 | -20 | -19 | -18 | -20 | -19 | -18 | -20 | -19 | -18 | -17 | -16 | -15 | -14 | -13 | -12 | -11 | -10 | -9 | -8 | -7 | -9 | -8 | -7 | -9 | -8 | -7 | -9 | -8 | -7 | -9 | -8 | -7 | -9 | -8 | -7 |
| | 2 | -17 | -16 | -15 | -17 | -16 | -15 | -17 | -16 | -15 | -17 | -16 | -15 | -17 | -16 | -15 | -14 | -13 | -12 | -11 | -10 | -9 | -8 | -7 | -6 | -5 | -4 | -6 | -5 | -4 | -6 | -5 | -4 | -6 | -5 | -4 | -6 | -5 | -4 | -6 | -5 | -4 |
| | 3 | -14 | -13 | -12 | -14 | -13 | -12 | -14 | -13 | -12 | -14 | -13 | -12 | -14 | -13 | -12 | -11 | -10 | -9 | -8 | -7 | -6 | -5 | -4 | -3 | -2 | -1 | -3 | -2 | -1 | -3 | -2 | -1 | -3 | -2 | -1 | -3 | -2 | -1 | -3 | -2 | -1 |
| | 4 | -11 | -10 | -9 | -11 | -10 | -9 | -11 | -10 | -9 | -11 | -10 | -9 | -11 | -10 | -9 | -8 | -7 | -6 | -5 | -4 | -3 | -2 | -1 | 0 | 1 | 2 | 0 | 1 | 2 | 0 | 1 | 2 | 0 | 1 | 2 | 0 | 1 | 2 | 0 | 1 | 2 |
| | 5 | -8 | -7 | -6 | -8 | -7 | -6 | -8 | -7 | -6 | -8 | -7 | -6 | -8 | -7 | -6 | -5 | -4 | -3 | -2 | -1 | 0 | 1 | 2 | 3 | 4 | 5 | 3 | 4 | 5 | 3 | 4 | 5 | 3 | 4 | 5 | 3 | 4 | 5 | 3 | 4 | 5 |
| | 6 | -5 | -4 | -3 | -5 | -4 | -3 | -5 | -4 | -3 | -5 | -4 | -3 | -5 | -4 | -3 | -2 | -1 | 0 | 1 | 2 | 3 | 4 | 5 | 6 | 7 | 8 | 6 | 7 | 8 | 6 | 7 | 8 | 6 | 7 | 8 | 6 | 7 | 8 | 6 | 7 | 8 |
| | 7 | -2 | -1 | 0 | -2 | -1 | 0 | -2 | -1 | 0 | -2 | -1 | 0 | -2 | -1 | 0 | 1 | 2 | 3 | 4 | 5 | 6 | 7 | 8 | 9 | 10 | 11 | 9 | 10 | 11 | 9 | 10 | 11 | 9 | 10 | 11 | 9 | 10 | 11 | 9 | 10 | 11 |
| | 8 | 1 | 2 | 3 | 1 | 2 | 3 | 1 | 2 | 3 | 1 | 2 | 3 | 1 | 2 | 3 | 4 | 5 | 6 | 7 | 8 | 9 | 10 | 11 | 12 | 13 | 14 | 12 | 13 | 14 | 12 | 13 | 14 | 12 | 13 | 14 | 12 | 13 | 14 | 12 | 13 | 14 |
| | 9 | 4 | 5 | 6 | 4 | 5 | 6 | 4 | 5 | 6 | 4 | 5 | 6 | 4 | 5 | 6 | 7 | 8 | 9 | 10 | 11 | 12 | 13 | 14 | 15 | 16 | 17 | 15 | 16 | 17 | 15 | 16 | 17 | 15 | 16 | 17 | 15 | 16 | 17 | 15 | 16 | 17 |
| | 10 | 7 | 8 | 9 | 7 | 8 | 9 | 7 | 8 | 9 | 7 | 8 | 9 | 7 | 8 | 9 | 10 | 11 | 12 | 13 | 14 | 15 | 16 | 17 | 18 | 19 | 20 | 18 | 19 | 20 | 18 | 19 | 20 | 18 | 19 | 20 | 18 | 19 | 20 | 18 | 19 | 20 |

Fig. 13C-2

IMAGE FORMING APPARATUS OPERABLE IN PLURAL SETTTING MODES

FIELD OF THE INVENTION AND RELATED ART

The present invention relates to an image forming apparatus, such as a copying machine, a printer, or a facsimile machine, of an electrophotographic type or an electrostatic recording type.

In an image forming apparatus of the electrophotographic type or the like, a toner image formed on an image bearing member such as a photosensitive member or an intermediary transfer member is transferred onto a recording material. The transfer of the toner image from an image bearing member to the recording material is performed by applying a transfer voltage to a transfer member such as a transfer roller which contacts the image bearing member to form a transfer portion in many instances. The transfer voltage can be determined based on a transfer portion part voltage corresponding to the electrical resistance of the transfer portion detected during a pre-rotation process before image formation, and a recording material part voltage depending on a kind of the recording material set in advance. By this, an appropriate transfer voltage can be set according to the environmental fluctuations, the transfer member usage history, the recording material kind, and the like.

However, there are various types and conditions of recording materials used in the image formation, and therefore, the preset recording material part voltage as a default may be higher or lower than the appropriate transfer voltage. Under the circumstances, an image forming apparatus operable in an adjustment mode in which a set voltage (value) of the transfer voltage is adjusted depending on the recording material actually used in the image formation is proposed.

In Japanese Laid-open Patent Application No. 2013-37185, an image forming apparatus capable of executing an operation in an adjustment mode in which a set voltage (value) of a secondary transfer voltage is proposed. In the operation in this adjustment mode, a chart formed by transferring a plurality of patches (test images) onto a single recording material while switching the secondary transfer voltage for each of the patches is outputted. Then, a density of each of the patches is detected, and depending on a detection result, an optimum secondary transfer voltage condition is selected.

However, in an operation in a conventional adjusting mode, for example, a recording material with a severe transfer property (for which it is difficult to set transfer condition such that a good transfer property is obtained) may be used. In general, a transfer voltage with a larger absolute value is needed with a higher density of a toner image to be transferred onto the recording material, and a user was not able to select an optimum adjusting value for an image to be actually transferred onto the recording material, in some instances. This is because, for example, in the case where the recording material with the severe transfer property is used, there is a case that it is difficult to satisfactorily transfer images ranging from half-tone images to solid images by a single transfer voltage.

SUMMARY OF THE INVENTION

A principal object of the present invention is to provide an image forming apparatus capable of appropriately adjusting a transfer voltage for an image to which priority is given by a user.

This object is accomplished by an image forming apparatus according to the present invention.

According to an aspect of the present invention, there is provided an image forming apparatus comprising: an image bearing member configured to bear a toner image; a transfer device configured to transfer the toner image from the image bearing member to a recording material; an applying portion configured to apply a voltage to the transfer device; a detecting portion configured to detect density information on a density of an image on the recording material onto which the image is transferred by the transfer device; a controller configured to execute an operation in a setting mode in which during non-image formation, a plurality of test images are transferred onto the recording material under application of different test voltages to the transfer device and then a transfer voltage applied to the transfer device during image formation is set on the basis of a detection result that the test images transferred onto the recording material are detected by the detecting portion; and a receiving portion configured to receive instruction information, wherein in a case that the operation in the setting mode is executed to set the transfer voltage for one-side mode in which an image is formed on one side of a recording material, the receiving portion is capable of receiving the instruction information selectively instructing a setting condition of the transfer voltage set by the operation in the setting mode from a plurality of setting conditions including a first setting condition and a second setting condition.

Further features of the present invention will become apparent from the following description of exemplary embodiments with reference to the attached drawings.

BRIEF DESCRIPTION OF THE DRAWINGS

FIG. 5 includes tables each showing table data of a recording material part voltage.

Figure 12:
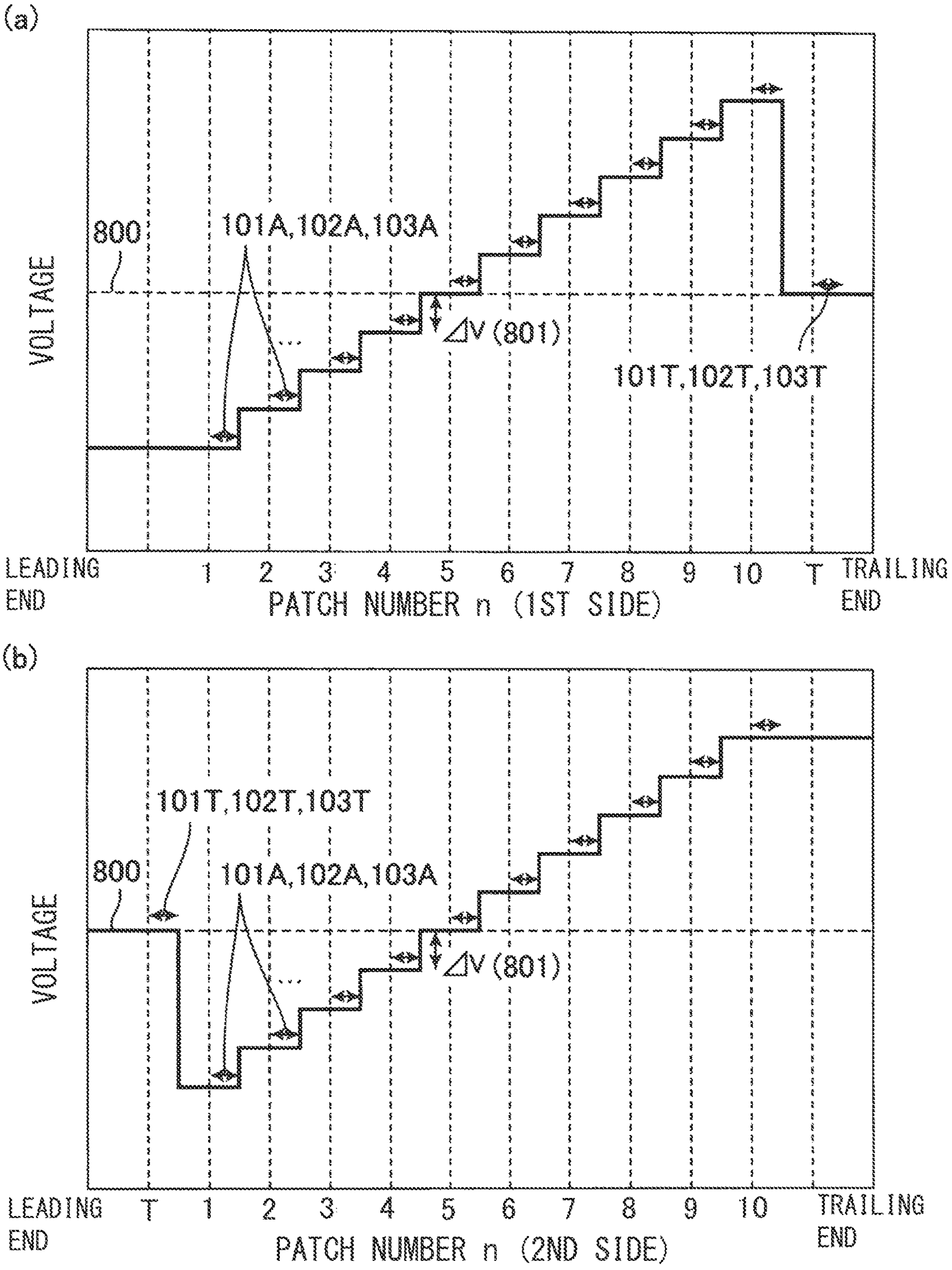

Parts (a) and (b) of FIG. 12 are graphs, each showing progression of a secondary transfer voltage during output of a chart.

FIGS. 13A-1, 13A-2, 13B-1, 13B-2, 13C-1 and 13C-2 are tables each showing an example of a relationship between patch numbers and adjusting values in a chart.

Figure 14:
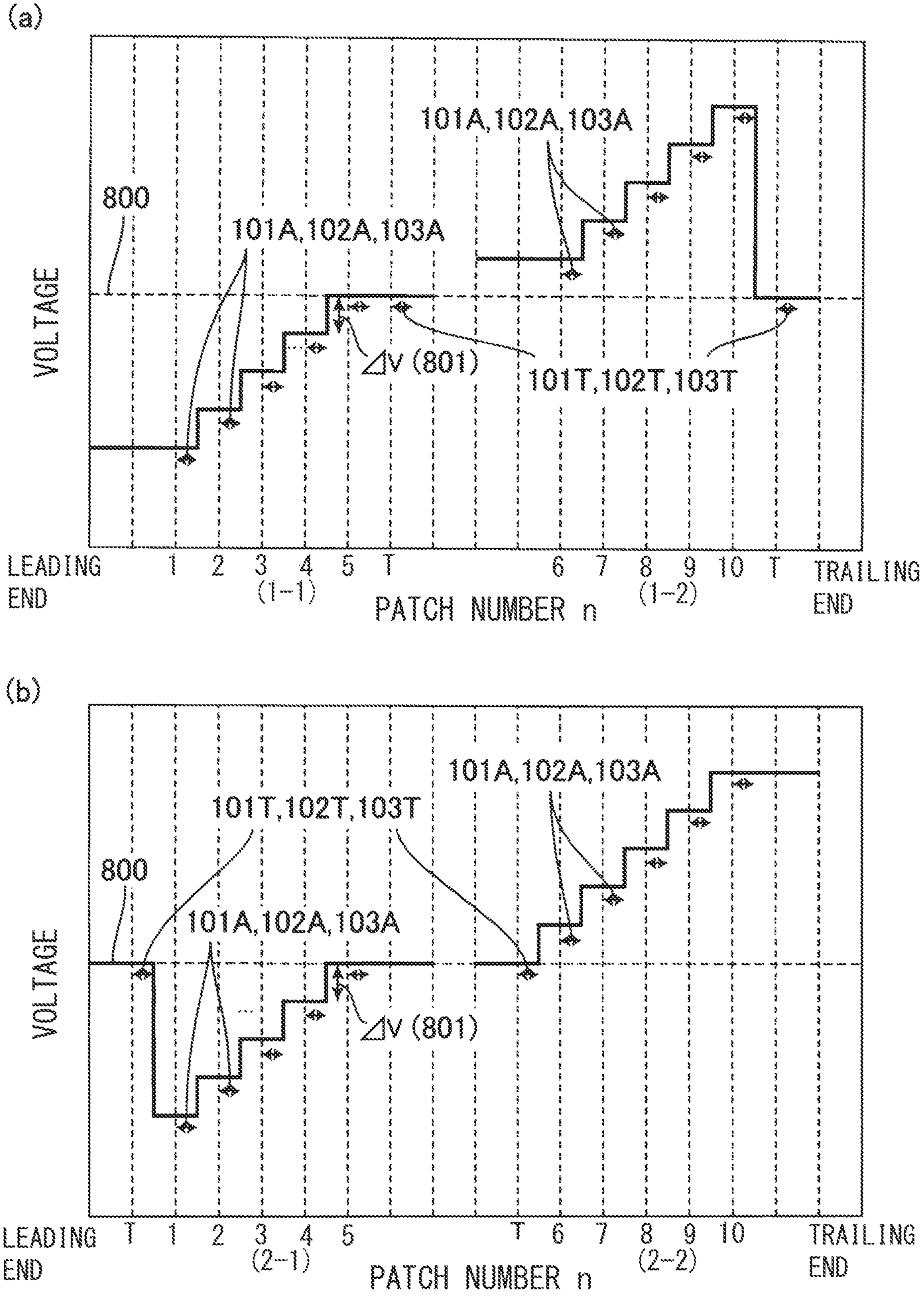

Parts (a) and (b) of FIG. 14 are graphs, each showing progression of a secondary transfer voltage during output of a chart.

Figure 15:
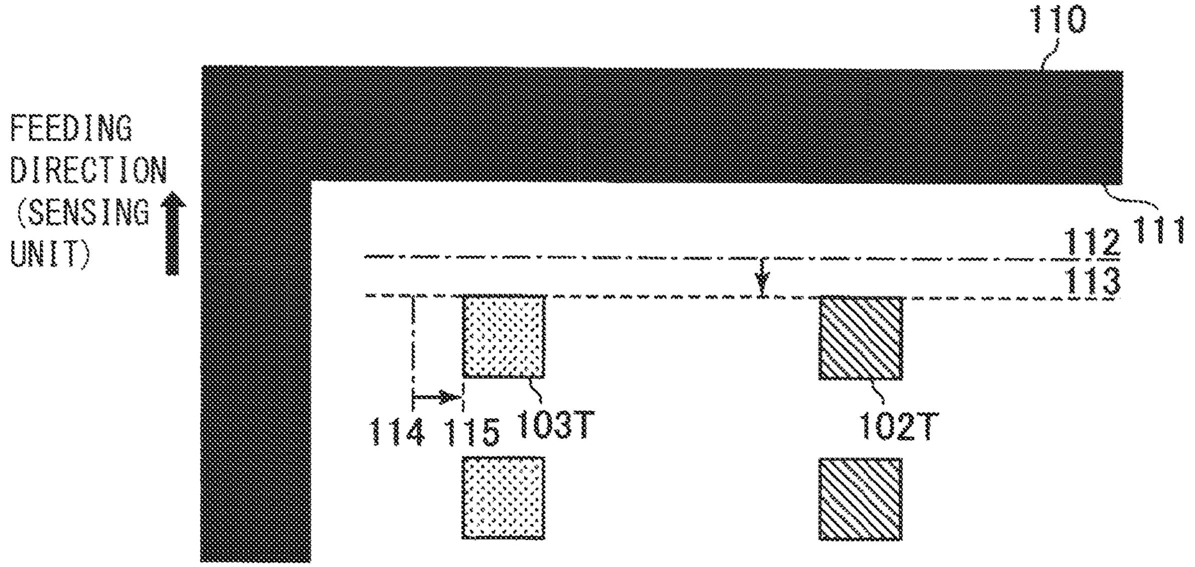

FIG. 15 is a schematic view for illustrating a transfer position detecting method.

Figure 16:
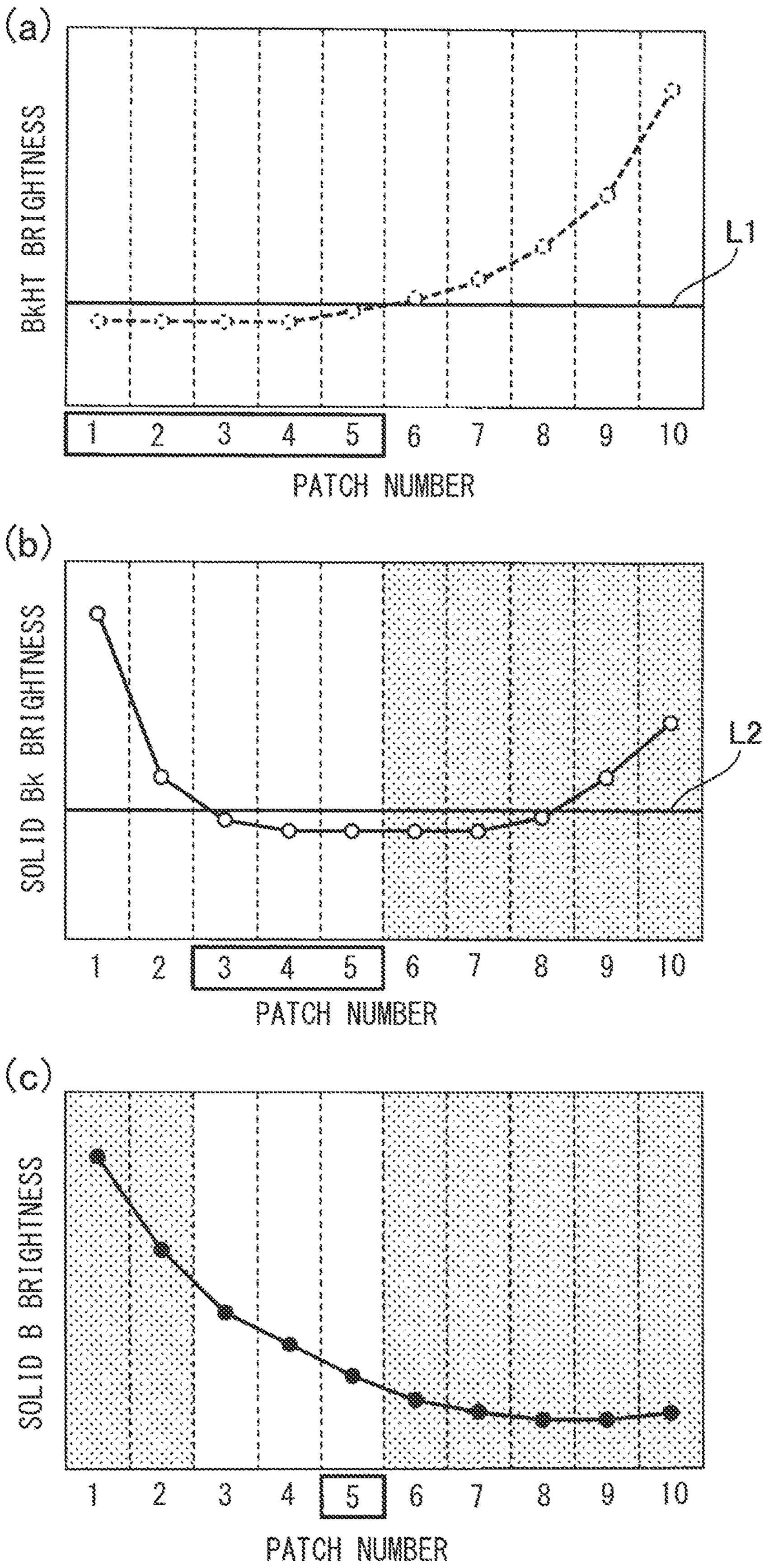

Parts (a) to (c) of FIG. 16 are graphs for illustrating a half-tone priority mode in the embodiment 1.

Figure 17:
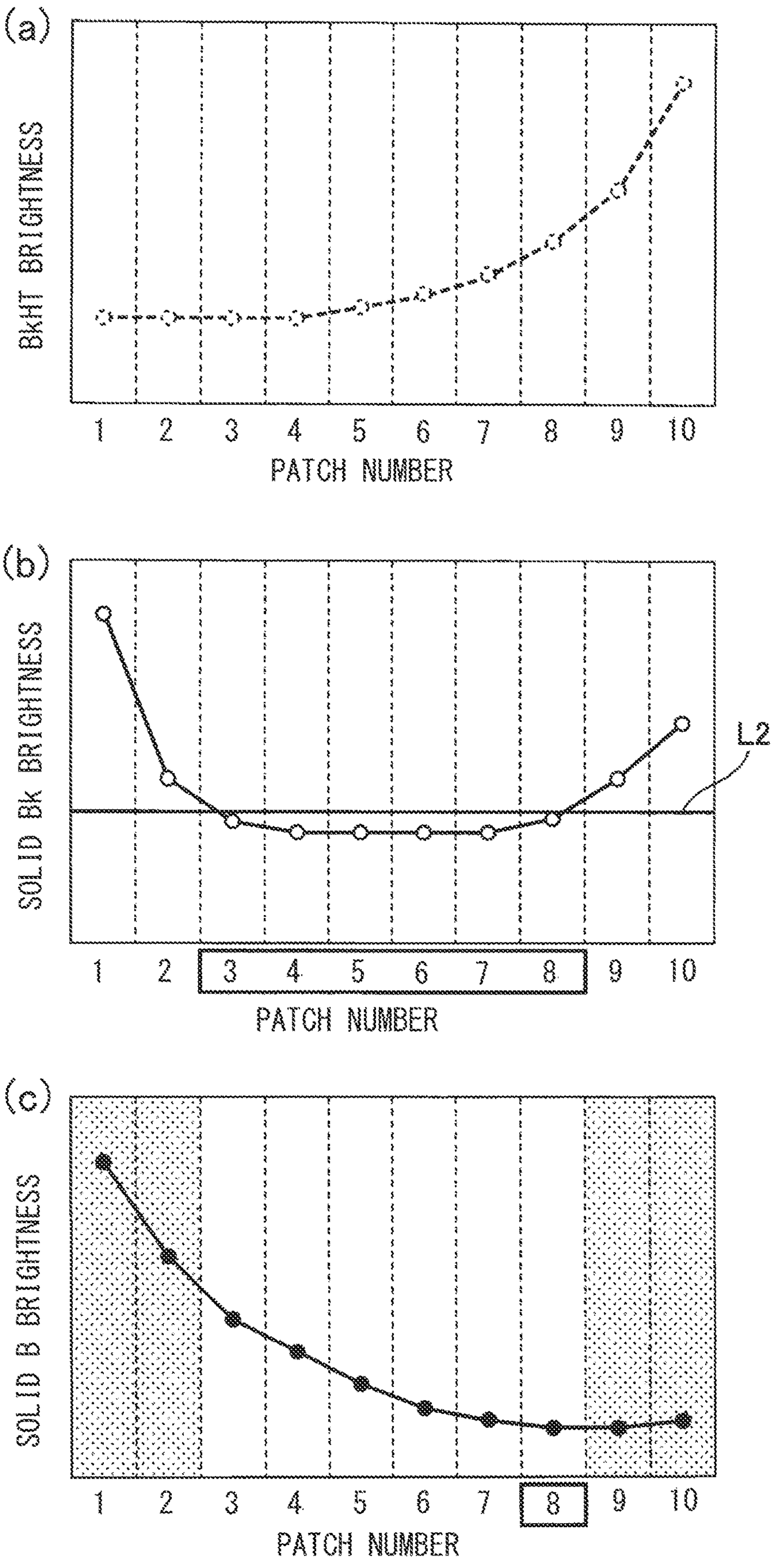

Parts (a) to (c) of FIG. 17 are graphs for illustrating a solid image priority mode in the embodiment 1.

Figure 18:
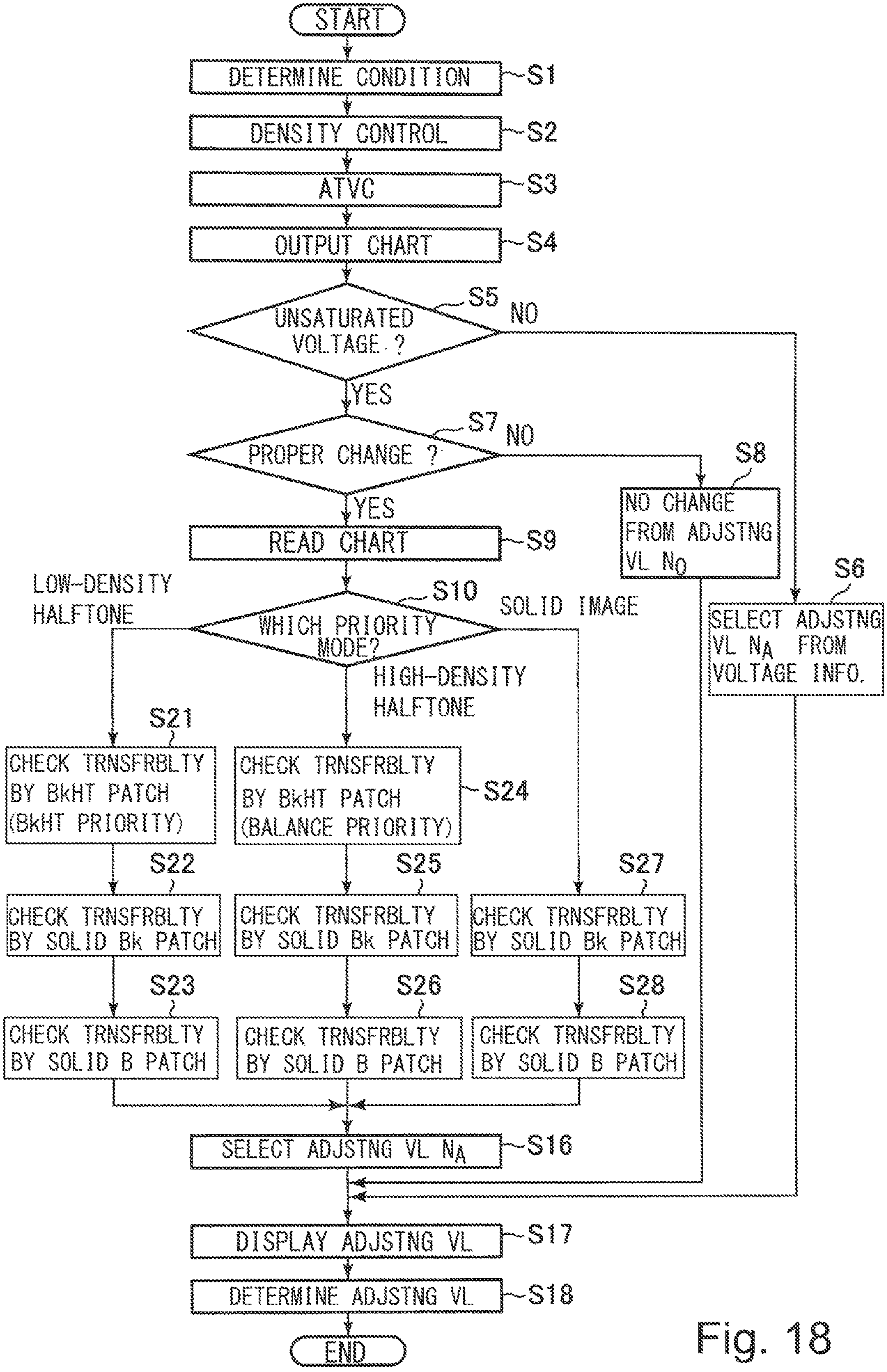

FIG. 18 is a flowchart showing an outline of a procedure of an operation in an adjusting mode in an embodiment 2.

Figure 19:
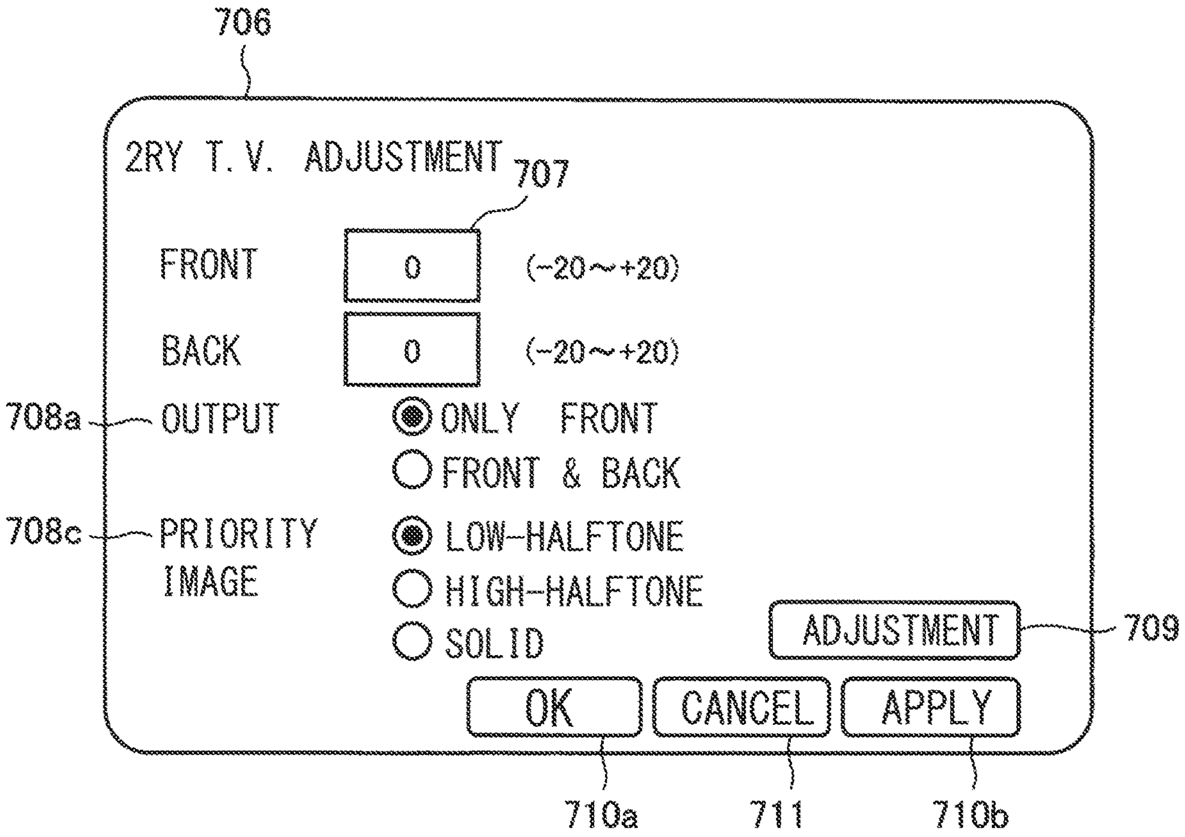

FIG. 19 is a schematic view of a secondary transfer voltage adjusting screen in the embodiment 2.

Figure 20:
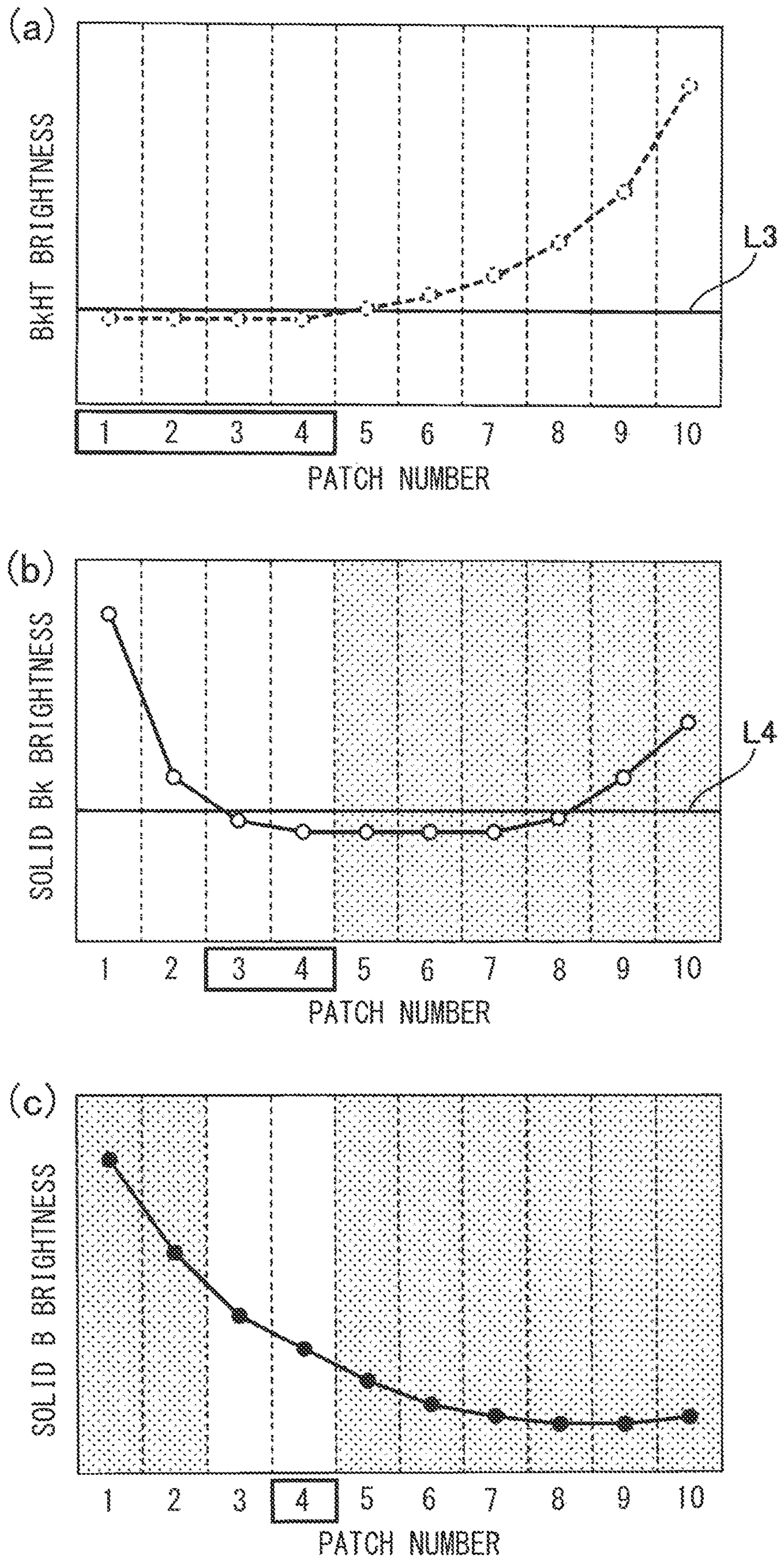

Parts (a) to (c) of FIG. 20 are graphs for illustrating a low-density half-tone priority mode in the embodiment 2.

Figure 21:
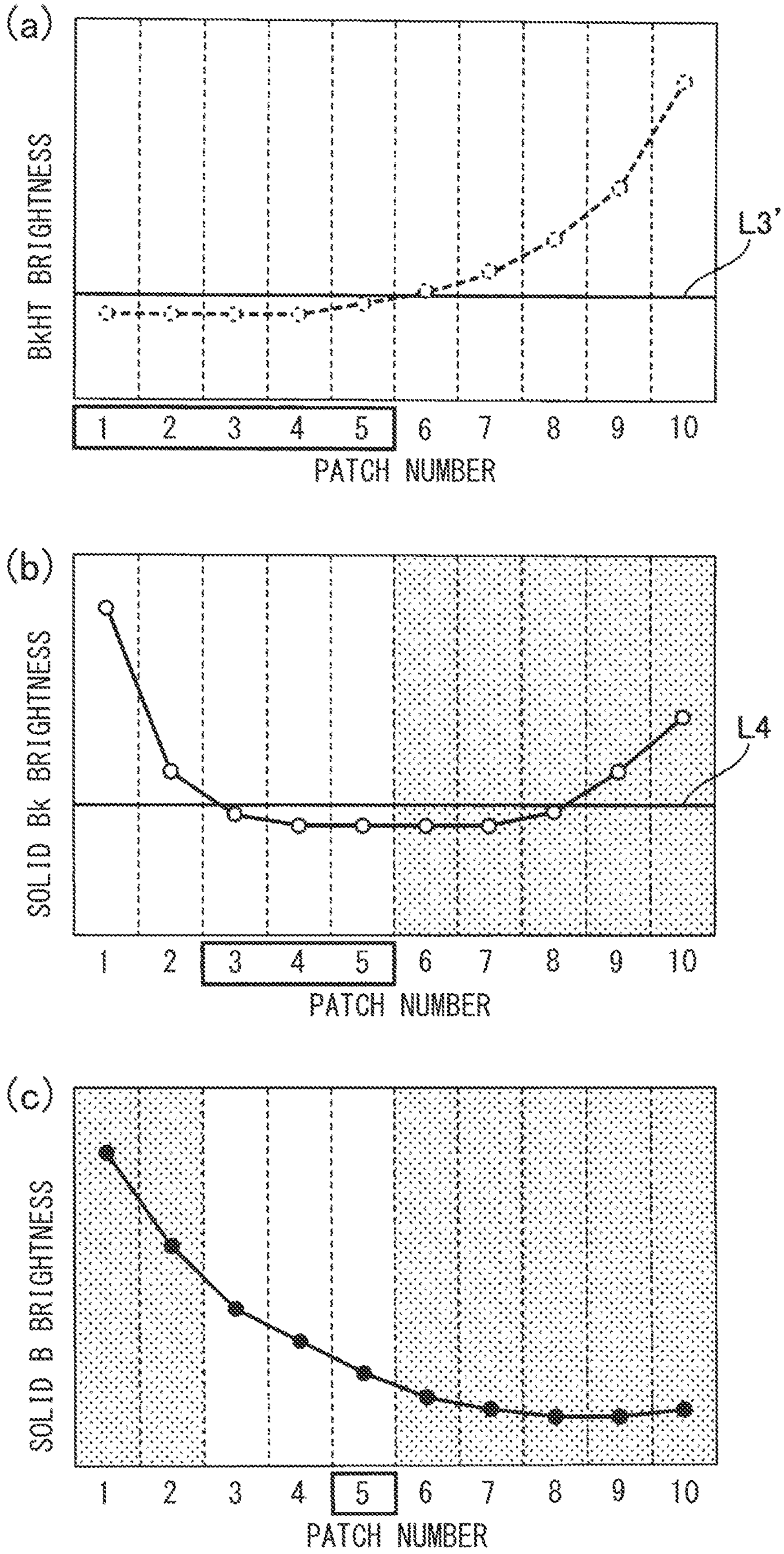

Parts (a) to (c) of FIG. 21 are graphs for illustrating a high-density half-tone priority mode in the embodiment 2.

Figure 22:
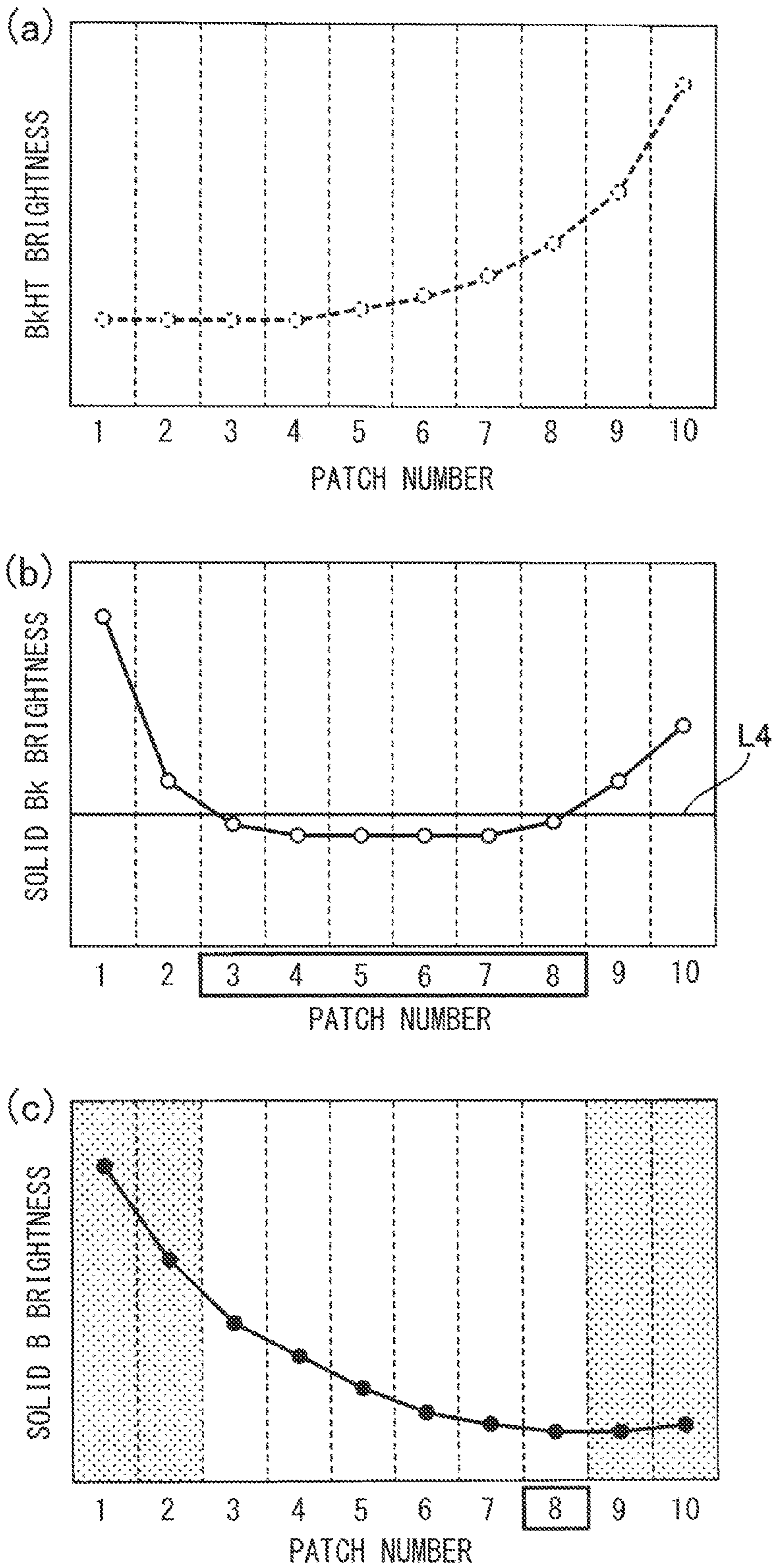

Parts (a) to (c) of FIG. 22 are graphs for illustrating a solid image priority mode in the embodiment 2.

Figure 23:
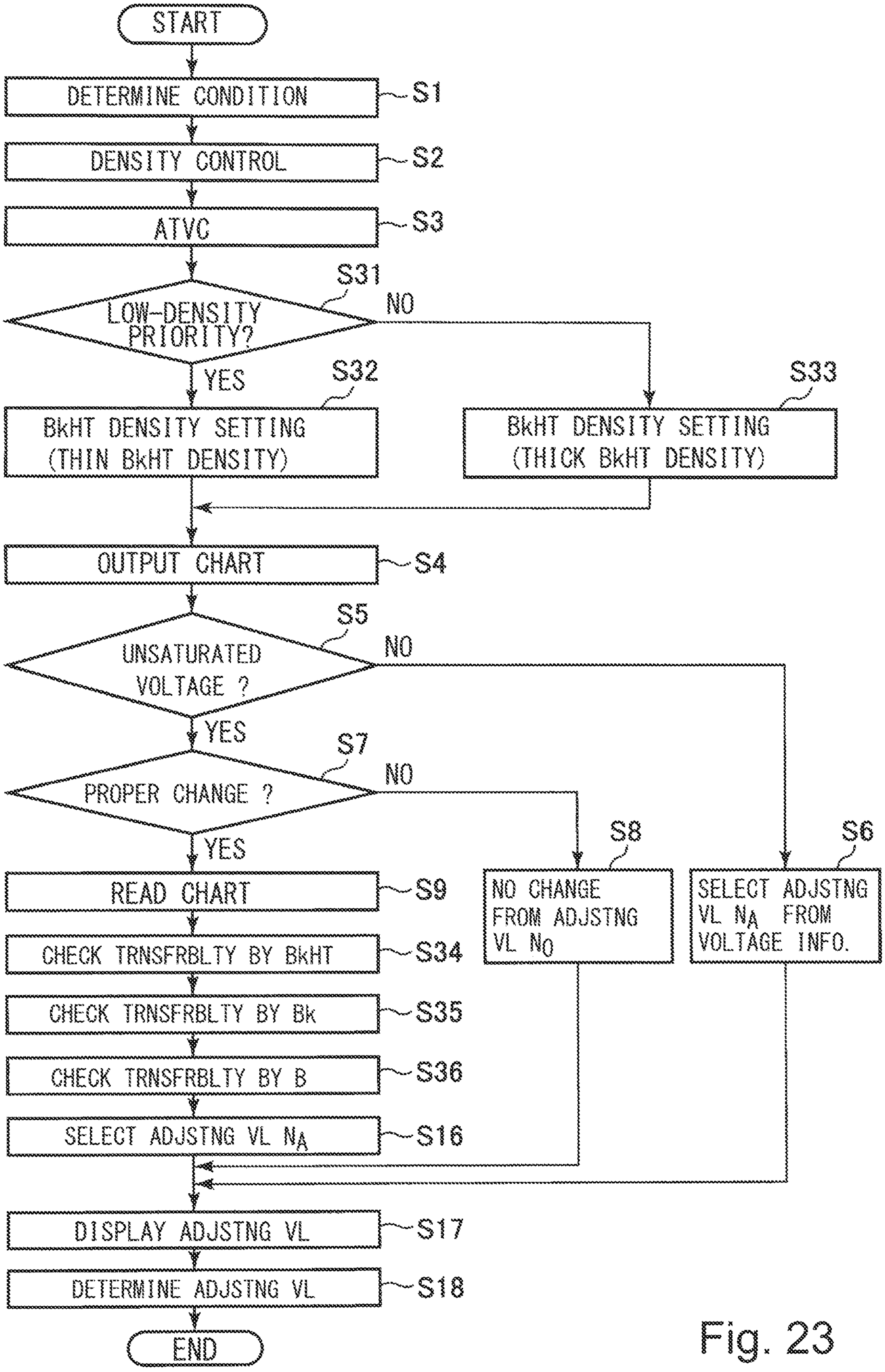

FIG. 23 is a flowchart showing an outline of a procedure of an operation in an adjusting mode in an embodiment 3.

Figure 24:
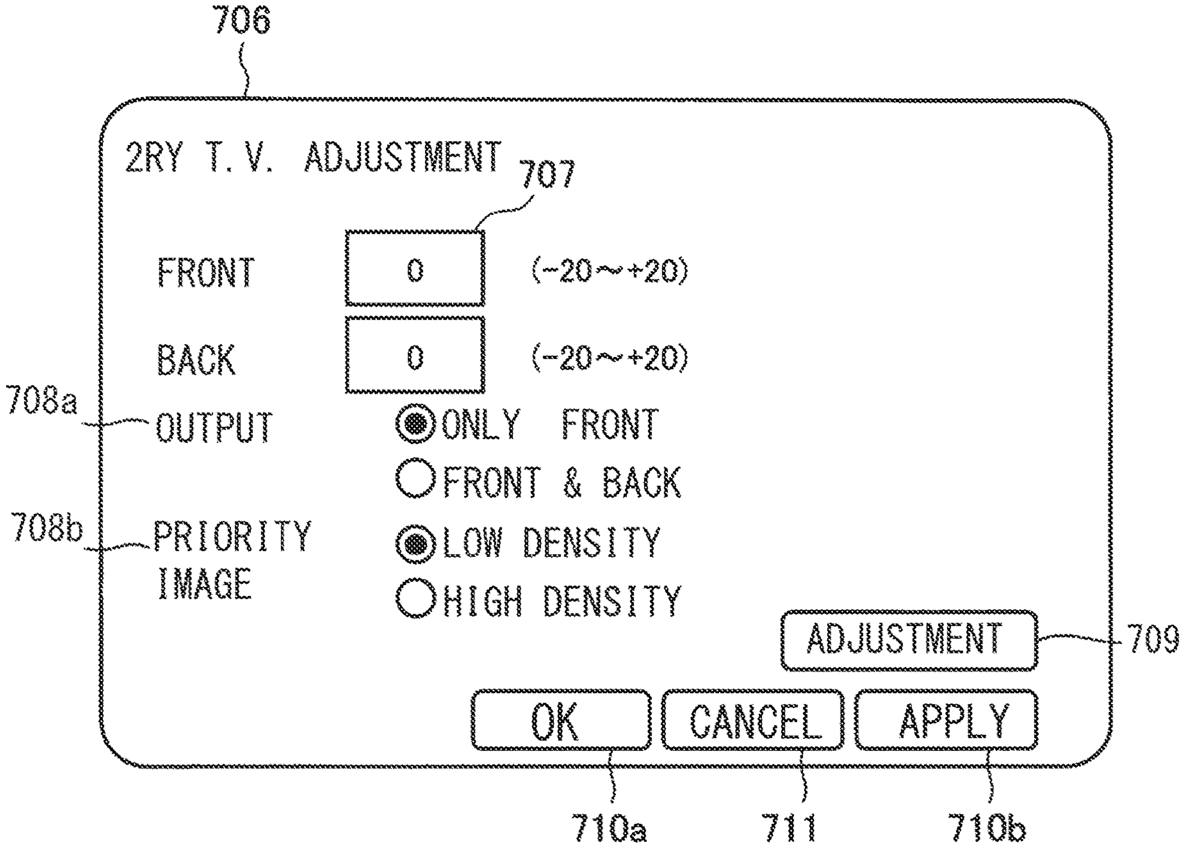

FIG. 24 is a schematic view of a secondary transfer voltage adjusting screen in the embodiment 3.

Figure 25:
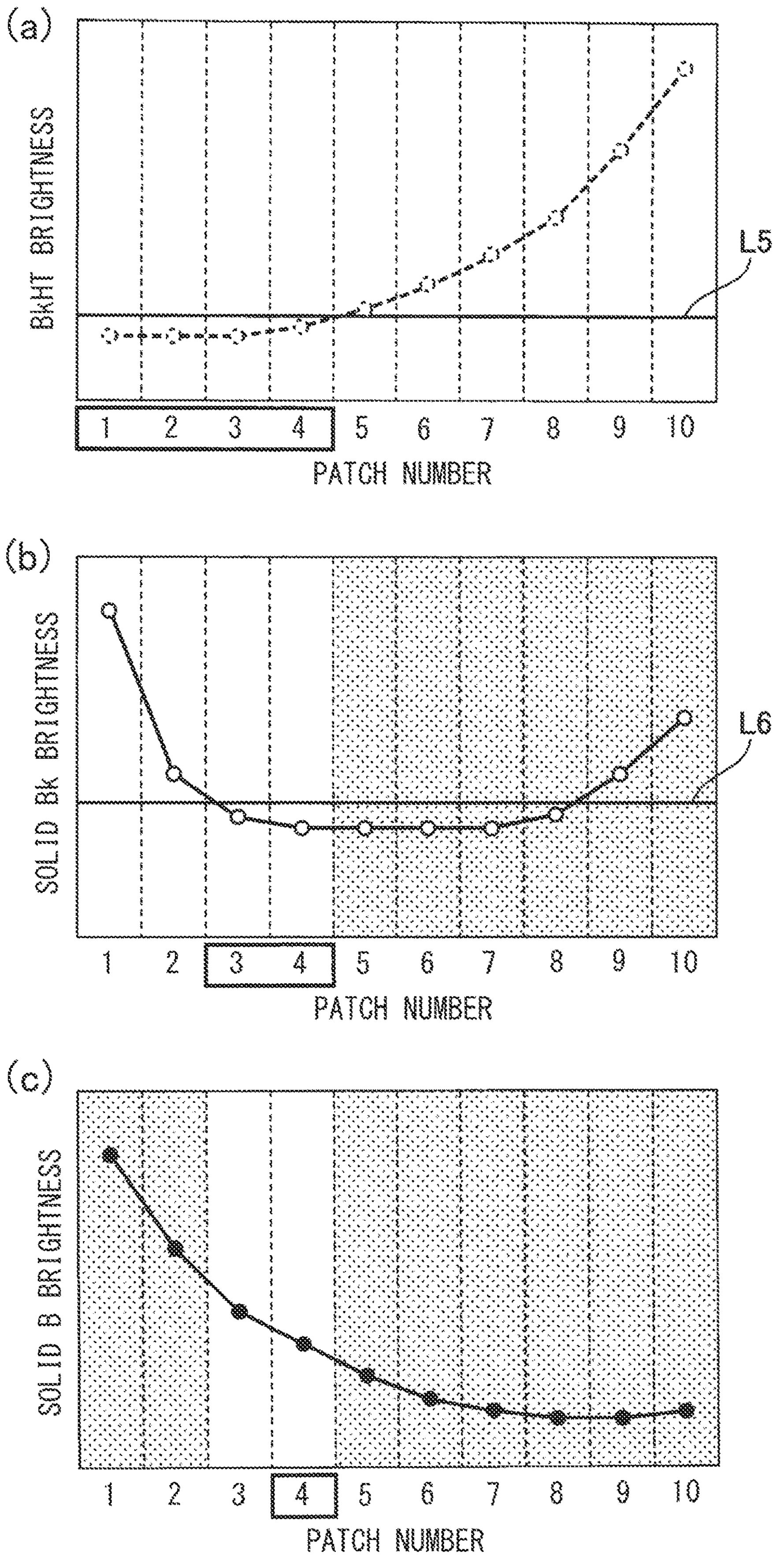

Parts (a) to (c) of FIG. 25 are graphs for illustrating a low-density half-tone priority mode in the embodiment 3.

Figure 26:
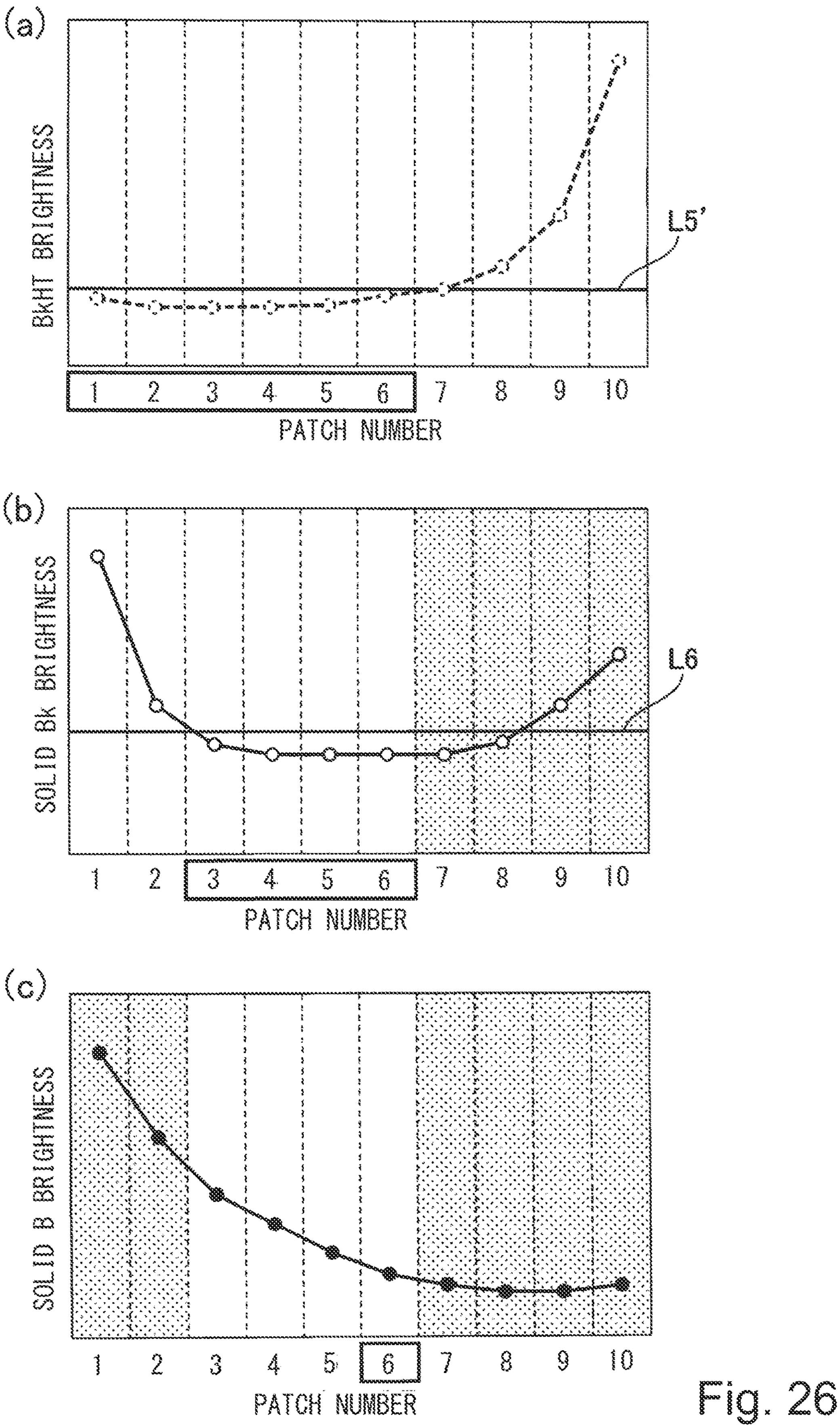

Parts (a) to (c) of FIG. 26 are graphs for illustrating a low-density half-tone priority mode in the embodiment 3.

DESCRIPTION OF EMBODIMENTS

Embodiment 1

1. Image Forming Apparatus

Figure 1:
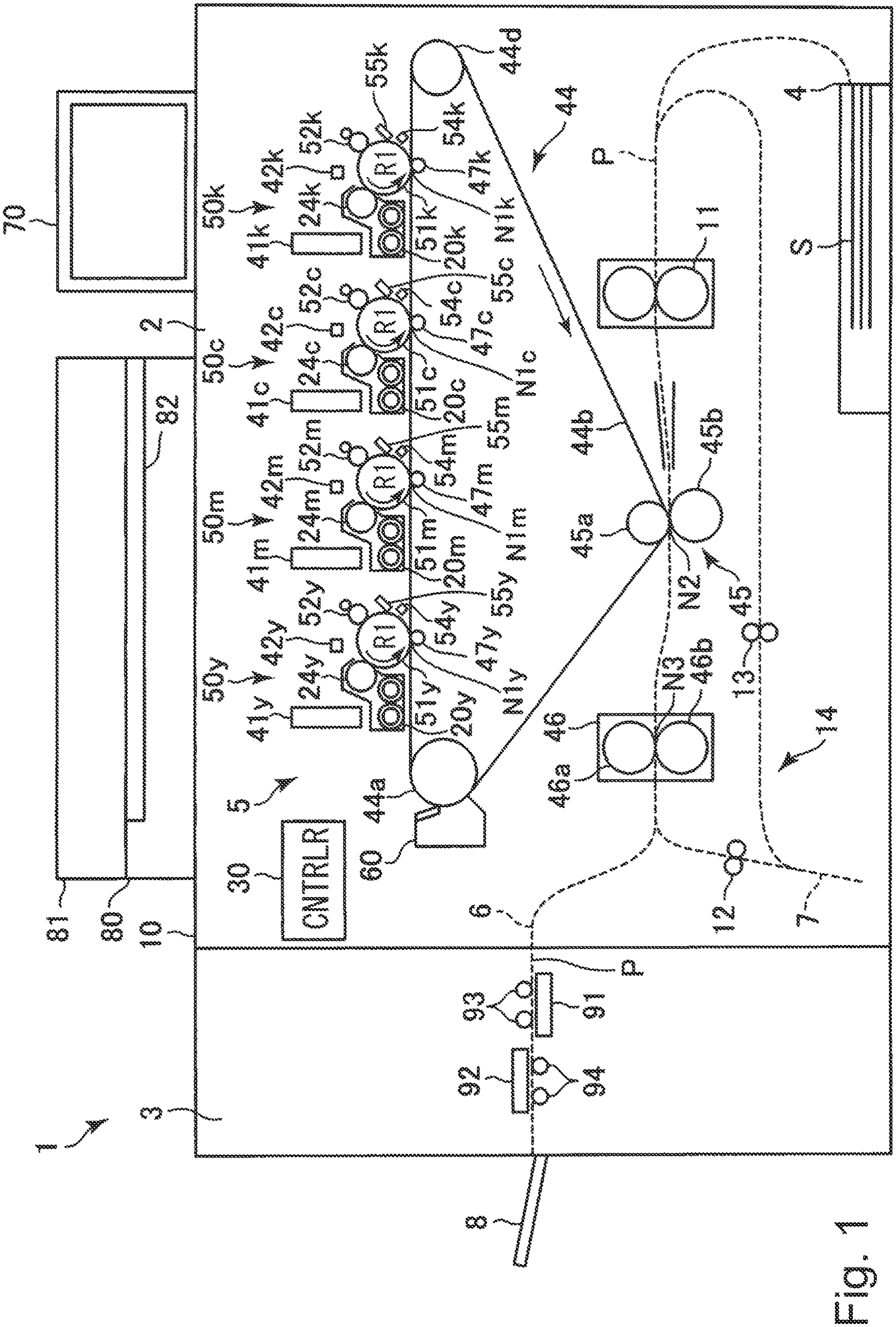
FIG. 1 is a schematic sectional view of an image forming apparatus.

FIG. 1 is a schematic sectional view of an image forming apparatus (image forming system) 1 of embodiment 1. In this embodiment, the image forming apparatus 1 is constituted by connecting a printer unit 2 for carrying out image formation and a sensing unit 3 for reading a chart in order to adjust a secondary transfer voltage. In this embodiment, the printer unit 2 is a tandem type full-color printer capable of forming a full-color image on a recording material S by using an electrophotographic method and employing an intermediary transfer type system. Incidentally, the recording material S is referred to as "paper (sheet)" in some instances, but the recording material is not limited to the paper, as described later.

Figure 2:
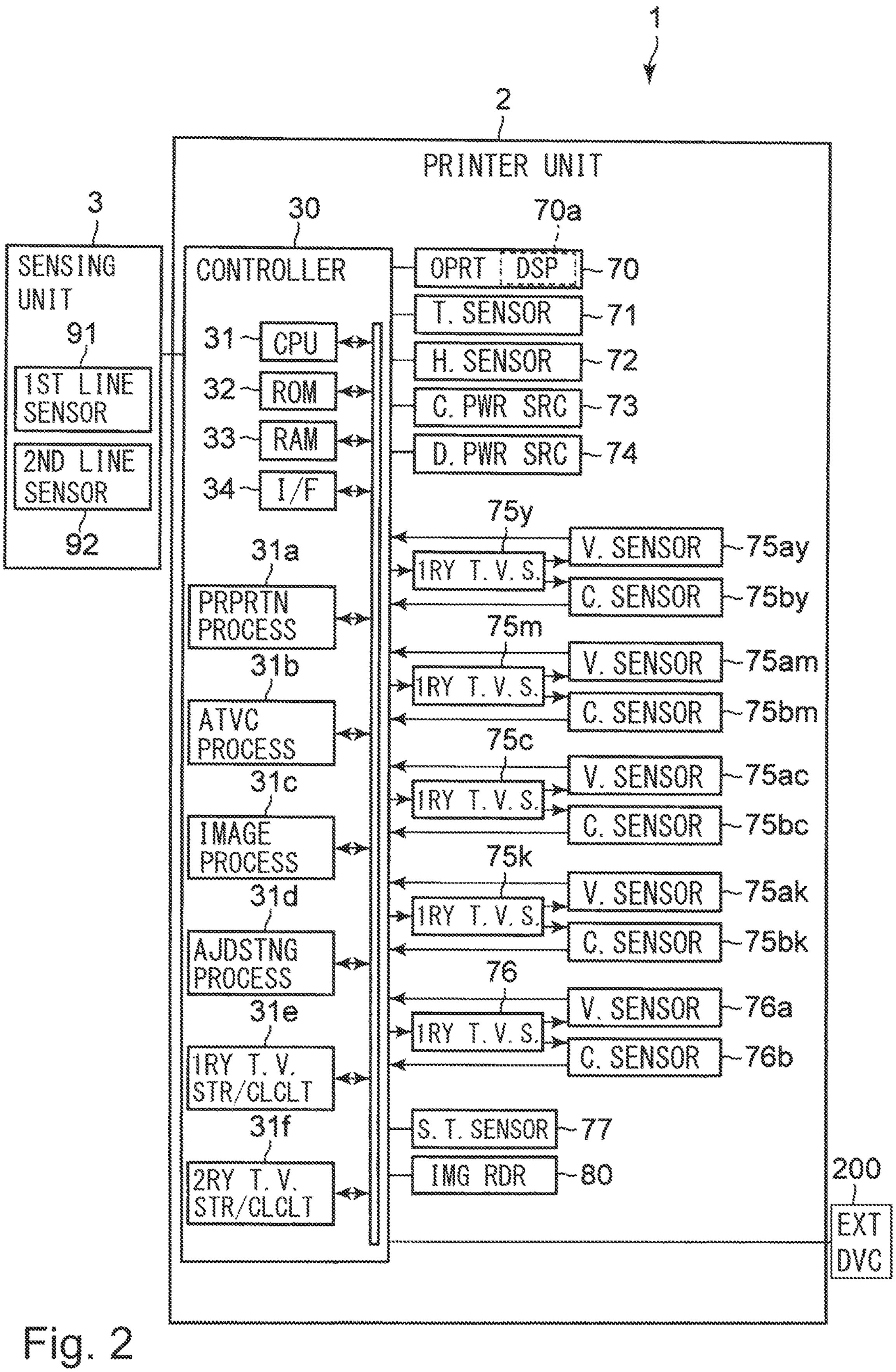
FIG. 2 is a schematic block diagram of a control system of the image forming apparatus.

The printer unit 2 includes a sheet (paper) feeding portion 4, an image forming portion 5, a controller 20, a delivering portion 6 to the sensing unit 3, an operating portion 70, an image reading portion 80, and the like. In FIG. 1, only one sheet feeding portion 4 is shown, but a plurality of sheet feeding portions may be provided in the printer unit 2. Further, inside an apparatus main assembly 10 of the image forming apparatus 1 (printer unit 2), a temperature sensor 71 (FIG. 2) capable of detecting a temperature (inside temperature) on an inside of the apparatus main assembly 10 and a humidity sensor 72 (FIG. 2) capable of detecting a humidity (inside humidity) on an inside of the apparatus main assembly 10 are provided. Each of the temperature sensor 71 and the humidity sensor 72 is an example of an environment detecting means for detecting environment information which is at least one of a temperature and a humidity on at least one of an inside and an outside of the image forming apparatus 1. The printer unit 2 can form a 4-color-based full-color image on a recording material S (sheet, transfer-receiving material) on the basis of image information (image signals) supplied from the image reading portion 80 or from an external device 200 (FIG. 2). As the external device 200, it is possible to cite a host device, such as a personal computer, or a digital camera or a smart phone. Here, the recording material S is a material on which a toner image is formed, and specific examples thereof include, in addition to papers such as plain paper and thick paper, synthetic resin sheets (synthetic paper) which are substitutes for the paper, and overhead projector sheets.

The image forming portion 5 can form the image on the recording material S fed from the sheet feeding portion 4 and moved through an inside of a feeding path (feeding passage) P, on the basis of the image information. The image forming portion 5 includes, as a plurality of image forming units, first to fourth image forming units 50*y*, 50*m*, 50*c* and 50*k* for forming images of yellow (Y), magenta (M), cyan (C), and black (Bk), respectively. Further, the image forming portion 5 includes an intermediary transfer unit 44, a secondary transfer device 45, and a fixing portion 46. Elements having the same or corresponding functions or structures in the respective image forming units 50*y*, 50*m*, 50*c*, and 50*k* are collectively described in some instances by omitting suffixes y, m, c and k of reference numerals or symbols representing the elements for associated colors of Y, M, C and Bk.

The image forming unit 50 includes a photosensitive drum 51 which is a rotatable drum-shaped (cylindrical) photosensitive member (electrophotographic photosensitive member) as a first image bearing member. Further, the image forming unit 50 includes a charging roller 52 which is a roller-shaped charging member as a charging means and an exposure device 42 as an exposure means. Further, the image forming unit 50 includes a developing device 20 as a developing means and a primary transfer roller 47 (constituting the intermediary transfer unit 44 described later) which is a roller-shaped primary transfer member as a primary transfer means. Further, the image forming unit 50 includes a pre-exposure device 54 as a charge-removing means and a drum cleaning device 55 as a photosensitive member cleaning means. Further, the image forming unit 50 includes a toner bottle 41 as a developer supplying container. The image forming unit 50 forms a toner image on the intermediary transfer belt 44*b* which will be described hereinafter.

The photosensitive drum 51 is movable (rotatable) while carrying an electrostatic image (electrostatic latent image) or a toner image. In this embodiment, the photosensitive drum 51 is a negatively chargeable organic photosensitive member (organic photoconductor: OPC) having an outer diameter of 30 mm. The photosensitive drum 51 has an aluminum cylinder as a base material and a surface layer formed on the surface of the base material. In this embodiment, the surface layer comprises three layers of an undercoat layer, a photo charge generation layer, and a charge transportation layer, which are applied and laminated on the substrate in the order named. When an image forming operation is started, the photosensitive drum 51 is driven to rotate in a direction indicated by an arrow R1 (counterclockwise) in the FIG. 1 at a predetermined peripheral speed (process speed) by a motor (not shown) as a driving means.

The surface of the rotating photosensitive drum 51 is uniformly charged to a predetermined polarity (negative in this embodiment) and a predetermined potential by the charging roller 52. In this embodiment, the charging roller 52 is a rubber roller which is disposed in contact with the surface of the photosensitive drum 51. The charging roller 52 is rotated with the rotation of the photosensitive drum 51. To the charging roller 52, a charging power source 73 (FIG. 2) as a charging voltage applying means (charging voltage applying portion) is connected. The charging power source

73 applies a predetermined charging voltage (charging bias) (charging voltage) to the charging roller 52 during the charging process.

The surface of the charged photosensitive drum 51 is scanned and exposed by the exposure device 42 in accordance with the image information, so that an electrostatic image is formed on the photosensitive drum 51. The exposure device 42 includes a laser scanner in this embodiment. The exposure device 42 emits laser beam in accordance with the separated color image information outputted from the controller 30, and scans and exposes the surface (outer peripheral surface) of the photosensitive drum 51.

The electrostatic image formed on the photosensitive drum 51 is developed (visualized) by supplying the toner thereto by the developing device 20, so that a toner image (developer image) is formed on the photosensitive drum 51. In this embodiment, the developing device 20 contains, as a developer, a two-component developer comprising non-magnetic toner particles (toner) and magnetic carrier particles (carrier). The toner is supplied from the toner bottle 41 to the developing device 20. The developing device 20 includes a developing sleeve 24 as a developer carrying member (developing member). The developing sleeve 24 is made of a nonmagnetic material such as aluminum or nonmagnetic stainless steel (aluminum in this embodiment). Inside the developing sleeve 24, a magnet roller, which is a roller-shaped magnet, is fixed and arranged so as not to rotate relative to the main body (developing container) of the developing device 20. The developing sleeve 24 carries a developer and conveys it to a developing zone facing the photosensitive drum 51. A developing power source 74 (FIG. 2) as a developing applying means (developing voltage applying portion) is connected to the developing sleeve 24. The developing power source 74 applies a predetermined developing voltage (developing bias) to the developing sleeve 24 during the developing process operation. In this embodiment, on an exposure portion (image portion) on the photosensitive drum 51 lowered in absolute value of the potential by being exposed to light after being uniformly charged, toner charged to the same polarity (negative in this embodiment) as a charge polarity of the photosensitive drum 1 (reverse development type) is applied. In this embodiment, the normal charging polarity of the toner, which is a principal charging polarity of the toner during the development, is a negative polarity.

An intermediary transfer belt 44*b* which is an intermediary transfer member constituted by an endless belt as a second image bearing member is arranged so as to oppose the four photosensitive drums 51*y*, 51*m*, 51*c* and 51*k*. The intermediary transfer belt 44*b* is wound around a driving roller 44*a*, a tension roller 44*d*, and an inner secondary transfer roller 45*a*, which are used as a plurality of stretching rollers (supporting rollers), and is stretched by a predetermined tension. The intermediary transfer belt 44*b* is movable (rotatable) while carrying the toner image. The driving roller 44 is rotationally driven by a motor (not shown) as driving means, and rotates (circulates) the intermediary transfer belt 44*b*. The tension roller 44*d* is a tension roller which controls the tension of the intermediary transfer belt 44*b* to be constant. The tension roller 44*d* is subjected to a force which pushes the intermediary transfer belt 44*b* from an inner peripheral surface side toward the outer peripheral surface side by the urging force of a spring (not shown) as an urging means. By this force, to the intermediary transfer belt 44*d*, a tension of about 2 to 5 kg is applied in a circumferential direction (surface movement direction) of the intermediary transfer belt 44*b*. The inner secondary transfer roller 45*a* also constitutes the secondary transfer device 45 as will be described hereinafter. The driving force is transmitted to the intermediary transfer belt 44*b* by the driving roller 44*a*, and the intermediary transfer belt 44*b* is rotated (circulated and moved) in an arrow R2 direction (clockwise direction) in FIG. 1 at a predetermined peripheral speed (process speed) corresponding to the peripheral speed of the photosensitive drum 51. On the inner peripheral surface side of the intermediary transfer belt 44*b*, primary transfer rollers 47*y*, 47*m*, 47*c* and 47*k* are provided correspondingly to the four photosensitive drums 51*y*. 51*m*, 51*c* and 51*k*, respectively. In this embodiment, the primary transfer roller 47 is disposed in a position opposing the photosensitive drum 51 through the intermediary transfer belt 44*b*, and nips the intermediary transfer belt 40*b* between itself and the photosensitive drum 51. By this, the primary transfer roller 47 contacts the photosensitive drum 51 through the intermediary transfer belt 44*b*, and forms a primary transfer portion (primary transfer nip) N1 where the photosensitive drum 51 and the intermediary transfer belt 44*b* are in contact with each other. The stretching rollers other than the driving roller 44*a*, and the primary transfer rollers 47*y*, 47*m*, 47*c*, and 47*k* are rotationally driven with rotation of the intermediary transfer belt 44*b*. Further, on the outer peripheral surface side of the intermediary transfer belt 44*b*, in a position opposing the driving roller 44*a* through the intermediary transfer belt 44*b*, a belt cleaning device 60 as an intermediary transfer member cleaning means is provided. The intermediary transfer unit 44 is constituted by the intermediary transfer belt 44*b*, the stretching rollers 44*a*, 44*b*, and 45*a*, the primary transfer rollers 47*y*, 47*m*, 47*c*, and 47*k*, the belt cleaning device 60, and the like.

The toner image formed on the photosensitive drum 51 is primarily transferred onto the rotating intermediary transfer belt 44*b* by the action of the primary transfer roller 47 in the primary transfer portion N1. To the primary transfer roller 47, a primary transfer power source 75 (FIG. 2) as a primary transfer voltage applying means (primary transfer portion applying portion) is connected. The primary transfer power source 75 applies, to the primary transfer roller 47, a predetermined primary transfer voltage (primary transfer voltage) which is a DC voltage of an opposite polarity (positive polarity in this embodiment) to a normal charge polarity of the toner. To the primary transfer power source 75, a voltage detecting sensor 75*a* as a voltage detecting means (voltage detecting portion) for detecting an output voltage and a current detecting sensor 75*b* as a control detecting means (current detecting portion) for detecting an output current are connected (FIG. 2). In this embodiment, the primary transfer power sources 75*y*, 75*m*, 75*c*, and 75*k* are provided correspondingly to the primary transfer roller 47*y*, 47*m*, 47*c*, and 47*k*, respectively, and are capable of individually controlling the primary transfer voltage applied to the primary transfer rollers 47*y*, 47*m*, 47*c*, and 47*k*. In this embodiment, by applying a positive primary transfer voltage to the primary transfer roller 47, a negative toner image on the photosensitive drum 51 is primarily transferred onto the intermediary transfer belt 44*b*. For example, when forming a full-color image, the yellow (Y), magenta (M), cyan (C) and black (Bk) toner images formed on the photosensitive drums 51*y*, 51*m*, 51*c*, and 51*k* are transferred so as to be sequentially superimposed on the intermediary transfer belt 44*b*.

On the outer peripheral surface side of the intermediary transfer belt 44*b*, in a position opposing the inner secondary transfer roller 45*a* as an opposing member through the intermediary transfer belt 44*b*, an outer secondary transfer roller 45*b* which is a roller-shaped secondary transfer member is disposed. The outer secondary transfer roller 45*b* constitutes the secondary transfer device 45 as a secondary transfer means in cooperation with the inner secondary transfer roller 45*a*. The outer secondary transfer roller 45*b* contacts the inner secondary transfer roller 45*a* through the intermediary transfer belt 44*b* and forms the secondary transfer portion (secondary transfer nip) N2 where the intermediary transfer belt 44*b* and the outer secondary transfer roller 45*b* are in contact with each other. The toner image formed on the intermediary transfer belt 44*b* is secondarily transferred onto the recording material S which is nipped and conveyed by the intermediary transfer belt 44*b* and the outer secondary transfer roller 45*a* (i.e., passes through the secondary transfer portion N2), by the action of the secondary transfer device 45 in the secondary transfer portion N2. In this embodiment, a positive secondary transfer voltage is applied to the outer secondary transfer roller 45*b*, whereby the negative toner image on the intermediary transfer belt 44*b* is secondarily transferred onto the recording material S. The recording material S is fed from the sheet feeding portion 4 in parallel with the above-described toner image forming operation, and the toner image on the intermediary transfer belt 44*b* is fed to the secondary transfer portion N2 by a registration roller pair 11 provided as a feeding member in the feeding path P by being timed to the toner image on the intermediary transfer belt 44*b*.

As described above, the secondary transfer device 45 is constituted by including the inner secondary transfer roller 45*a* as an opposing member and the outer secondary transfer roller 43*b* as a secondary transfer member. To the outer secondary transfer roller 45*b*, a secondary transfer power source 76 (FIG. 2) as a secondary transfer voltage applying means (secondary transfer voltage applying portion) is connected. During the secondary transfer process, the secondary transfer power source 76 applies a predetermined secondary transfer voltage which is a DC voltage having a polarity opposite to the normal charging polarity of the toner (positive in this embodiment) to the outer secondary transfer roller 45*b*. To the secondary transfer power source 76, a voltage detecting sensor 76*a* as a voltage detecting means (voltage detecting portion) for detecting the output voltage and a current detecting sensor 76*b* as a current detecting means (current detecting portion) for detecting the output current (FIG. 2) are provided. In this embodiment, the core metal of the inner secondary transfer roller 45*a* is connected to the ground potential. And, when the recording material S is supplied to the secondary transfer portion N2, a secondary transfer voltage with constant-voltage-control having a polarity opposite to the normal charging polarity of the toner is applied to the outer secondary transfer roller 45*b*. In this embodiment, a secondary transfer voltage of 1 to 6.5 kV is applied, a current of about 15 to 100 μA, for example is applied, and the toner image on the intermediary transfer belt 44*b* is secondarily transferred onto the recording material S. Here, in this embodiment, the inner secondary transfer roller 45*a* is connected to the ground potential, and a voltage is applied from the secondary transfer power source 76 to the outer secondary transfer roller 45*b*. On the other hand, a voltage from the secondary transfer power source 76 is applied to the inner secondary transfer roller 45*a* as the secondary transfer member, and the outer secondary transfer roller 45*b* as the opposing member may also be connected to the ground potential. In such a case, a DC voltage having the same polarity as the normal charge polarity of the toner is applied to the inner secondary transfer roller 45*a*.

The recording material S onto which the toner image has been transferred is fed to a fixing device 46 as a fixing means. The fixing device 46 included a fixing roller 46*a* and a pressure roller 46*b*. The fixing roller 46*a* includes therein a heater as a heating means. The pressing roller 46*b* is pressed toward the fixing roller 46*a* and forms a fixing portion (fixing nip) N3 where the fixing roller 46*a* and the pressing roller 46*b* contact each other. The recording material S carrying the unfixed toner image is heated and pressed by being sandwiched and fed between the fixing roller 46*a* and the pressing roller 46*b* in the fixing nip N3. By this, the toner image is fixed (melted and fixed) on the recording material S. Here, the temperature of the fixing roller 46*a* (fixing temperature) is detected by a fixing temperature sensor 77 (FIG. 2) and is controlled by the controller 30.

In the case of one-side printing in which the image is formed on one side of the recording material S, the recording material S on which the toner image is fixed on the one side is delivered from a delivering portion 6 toward the sensing unit 3 as it is. On the other hand, in the case of printing the images on double (both) sides of the recording material S, the recording material S on which the toner image is fixed on a first side (surface) as described above is fed to a reverse feeding path 7 by a reverse feeding roller 12 or the like as a reverse feeding member. In the reverse feeding path 7, the recording material S on which the toner image is fixed on the first side is turned upside-down and then is supplied again to the secondary transfer portion N2 by a double-side roller 13 or the like as a double-side feeding member. Thus, onto the recording material S fed to the secondary transfer portion 45*n* again, the toner image is transferred onto a second side and is fixed, and thereafter, the recording material S is delivered from the delivering portion 6 to the sensing unit 3 and then is stacked on the discharge tray 8. As described above, the printer unit 2 of this embodiment is capable of executing double-side printing (automatic double-side printing) in which images are formed on both sides of a single recording material S. A double-side mode 14 is constituted by the reverse feeding path 7, the reverse feeding roller 12, the double-side feeding roller 13, and the like. The recording material S on which the images are formed passes through an inside of the sensing unit 3 and is discharged (outputted) to a discharge portion 8 provided outside the sensing unit 3 (image forming apparatus 1). Incidentally, when a chart is formed by transferring patches onto the recording material S in an operation in an adjusting mode described later, the patches on the chart are read during passing of the recording material S through the inside of the sensing unit 3, and then the recording material S is discharged to the discharge portion 8.

The surface of the photosensitive drum 51 after the primary transfer is electrically discharged (charge-removed) by the pre-exposure device 54. In addition, the toner remaining on the photosensitive drum 51 without being transferred onto the intermediary transfer belt 44*b* during the primary transfer process (primary transfer residual toner) is removed and collected from the surface of the photosensitive drum 51 by the drum cleaning device 55. The drum cleaning device 55 includes a cleaning blade as a cleaning member. The cleaning blade is a plate-like member which is in contact with the photosensitive drum 51 with a predetermined pressing force. The cleaning blade is in contact with the surface of the photosensitive drum 51 in a counter direction to a rotational direction of the photosensitive drum 51 so that a free end on a free end portion thereof faces an upstream side of the rotational direction of the photosensitive drum 51. In addition, toner remaining on the intermediary transfer belt 44*b* without being transferred onto the recording material S during the secondary transfer process (secondary transfer residual toner) or a deposited matter such as paper dust is removed and collected from the surface of the intermediary transfer belt 44*b* by the belt cleaning device 60. In this embodiment, the belt cleaning device 60 is constituted by including a cleaning blade similarly as the drum cleaning device 55. The collected matters such as the toners and the like collected by the drum cleaning device 55 and the belt cleaning device 60 are conveyed and accumulated into a collecting container (not shown).

Incidentally, the image forming apparatus 1 (printer unit 2) is also capable of forming an image of a single color such as black or an image of a multi-color.

Here, in this embodiment, the primary transfer roller 47 includes an elastic layer of an ion-conductive foam rubber (NBR rubber) and a core metal. An outer diameter of the primary transfer roller 47 is 15-20 mm, for example. Further, as the primary transfer roller 47, a roller of which electrical resistance value of $1\times10^5$-$1\times10^8\Omega$ (in N/N (23° C./50% RH) environment, under application of 2 kV) can be suitably used.

Further, in this embodiment, the intermediary transfer belt 44*b* is an endless belt including a two-layer structure of a base layer and a surface layer from an inner peripheral surface side thereof. As a material constituting the base layer, a material, in which carbon black as an antistatic agent is contained in an appropriate amount in a resin such as polyimide or polycarbonate or in various rubbers, can be suitably used. A thickness of the base layer is 0.05-0.15 mm, for example. As a material of the surface layer, a resin such as a fluorine-containing resin can be suitably used. The surface layer decreases a depositing force of the toner onto the surface of the intermediary transfer belt 44*b*, so that the toner is easily transferred onto the recording material S in the secondary transfer portion N2. A thickness of the surface layer is 0.0002-0.020 mm, for example. As a material of the surface layer, it is possible to use, as a base material, one kind of a resin material such as polyurethane, polyester, or epoxy resin, or two kinds of elastic materials such as an elastic rubber, an elastomer, and a butyl rubber. Further, into this base material, as a material for enhancing a lubricating property by reducing surface energy, for example, powder or particles of fluorine-containing resin and dispersed singly or in combination of two kinds or more or by being made different in particle size can be used. In this embodiment, the intermediary transfer belt 44*b* is $5\times10^8$–$1\times10^{14}$ Ω.cm (23° C., 40% RH) in volume resistivity and is 0.15–0.6 (23° C., 50% RH, measured with "HEIDON Type 94*i*", manufactured by Shinto Scientific Co., Ltd.) in coefficient of static friction. Incidentally, the intermediary transfer belt 44*b* had the two-layer structure in this embodiment, but may also have a single-layer constitution of a material corresponding to the material of the above-described base layer.

Further, in this embodiment, the outer secondary transfer roller 45*b* includes an elastic layer of an ion-conductive foam rubber (NBR rubber) and a core metal. An outer diameter of the outer secondary transfer roller 45*b* is 20-25 mm, for example. Further, as the outer secondary transfer roller 45*b*, a roller of which electrical resistance value of $1\times10^5$-$1\times10^8\Omega$ (in N/N (23° C./50% RH) environment, under application of 2 kV) can be suitably used.

Further, in each of the image forming units 50, the photosensitive drum 1 and, as a process means actable on the photosensitive drum 1, at least one of the charging roller 52, the developing device 20, and the drum cleaning device 55 may be integrally assembled into a unit as a process cartridge. In addition, this unit may be detachably mountable to the apparatus main assembly.

Further, at an upper portion of the apparatus main assembly 10, an automatic original feeding device 81 and an image reading portion 80 are provided. The automatic original feeding device 81 as an original feeding means automatically feeds, toward a reading position (which may be constituted by at least a part of a platen glass 82 described later) of the image reading portion 80, a sheet such as the recording material S on which an original image (text or image) is formed. The image reading portion 80 as a reading means is capable of reading the image on the sheet fed to the above-described reading position by the automatic original feeding device 81. Further, the image reading portion 80 is capable of reading the image on the sheet such as the recording material S which is disposed on the platen glass 82 and on which the image (text or image) of the original is formed. The image reading portion 80 illuminates the sheet with light from a light source (not shown) and is constituted so as to read the image on the sheet, in terms of a dot density determined in advance, by an image reading element (not shown). That is, the image reading portion 80 optically reads the image on the sheet and covers the read image into an electric signal.

2. Control mode

FIG. 2 is a block diagram showing a schematic constitution of a control system of the image forming apparatus 1 of this embodiment. As shown in FIG. 2, the controller 30 is constituted by a computer. The controller 30 includes, for example, a CPU 31, a ROM (including a readable one) 32 for storing a program for controlling the respective portions, a RAM for temporarily storing data 33, and an input/output circuit (I/F) 34 for inputting/outputting signals to and from the outside. The CPU 33 is a microprocessor which controls the entire image forming apparatus 1 and is a main part of the system controller. The CPU 31 is connected to the sheet reading portion 4, the image forming portion 5, the delivering portion 6, the operation portion 70, the sensing unit 3, the image reading portion 80, and the like via the input/output circuit 34, and exchanges signals with these portions, and controls the operation of each of these portions. The ROM 32 stores an image formation control sequence for forming an image on the recording material S. For example, the controller 30 is connected to a charging power source 73, a developing power source 74, a primary transfer power source 75, and a secondary transfer power source 76, which are controlled by signals from the controller 30, respectively. In addition, the controller 30 is connected to a temperature sensor 71, a humidity sensor 72, a voltage detection sensor 75*a* and a current detection sensor 75*b* of the primary transfer power supply 75, a voltage detection sensor 76*a* and a current detection sensor 76*b* of the secondary transfer power supply 76, and a fixing temperature sensor 77. Signals detected by the respective sensors are inputted to the controller 30.

The operation portion 70 includes an operation button (such as numerical keys) as an input means, and a display portion 70*a* including a liquid crystal panel as a display means. Incidentally, in this embodiment, the display portion 70*a* is constituted as a touch panel, and also has a function as the input means. The operators such as a user or a service person can input an instruction to the controller 30 so as to execute a job (described later). The controller 30 receives the signal from the operating portion 70 and operates various devices of the image forming apparatus 1, so that the controller 30 is capable of controlling the image forming apparatus 1 so as to execute the job. Incidentally, the image forming apparatus 1 can also execute the job on the basis of an image forming signal (image data, control instruction) supplied from the external device 200 such as the personal computer.

In this embodiment, the controller 30 includes an image formation pre-preparation process portion 31*a*, an ATVC process portion 31*b*, an image formation process portion 31*c*, and an adjustment process portion 31*d*. In addition, the controller 30 includes a primary transfer voltage storage/operation portion 31*e* and a secondary transfer voltage storage/operation portion 31*f*. Here, each of these process portions and storage/operation portions may be provided as a portion or portions of the CPU 31, the ROM 32 or the RAM 33. For example, the controller 30 (specifically, the image formation process portion 31*c*) is capable of carrying out control so as to execute a print job as described above. In addition, the controller 30 (specifically, the ATVC process portion 31*b*) is capable of carrying out control so as to execute ATVC (setting mode) for the primary transfer portion N1 and the secondary transfer portion N2. The ATVC will be specifically described hereinafter. In addition, the controller 30 (specifically, the adjustment process portion 31*d*) is capable of carrying out control so as to execute an operation in an adjustment mode for adjusting a set value of the secondary transfer voltage. The operation in the adjustment mode will be described specifically hereinafter. In this embodiment, the controller 30 (specifically, the adjustment process portion 31*d*) has a function of an executing portion for executing an operation (output mode) for outputting a chart in an operation in the adjustment mode (described later). Further, in this embodiment, the sensing unit 3 constitutes an acquiring portion (detecting portion for detecting density information) for acquiring density information on a density of test images on a chart in the operation in the adjustment mode (described later). Further, in this embodiment, the controller 30 (specifically, the adjustment process portion 31*d* or the secondary transfer voltage storage/operation portion 31*f*) has a function of a setting portion for setting the secondary transfer voltage on the basis of the density information acquired by the acquiring portion.

Here, the image forming apparatus 1 executes the job (image output operation, print job) which is series of operations to form and output an image or images on a single or a plurality of recording materials S started by one start instruction. The job includes an image forming step, a pre-rotation step, a sheet (paper) interval step in the case where the images are formed on the plurality of recording materials S, and a post-rotation step in general. The image forming step is performed in a period in which formation of an electrostatic image for the image actually formed and outputted on the recording material S, formation of the toner image, primary transfer of the toner image, secondary transfer of the toner image, and fixing of the toner image are carried out, in general, and during image formation (image forming period) refers to this period. Specifically, timing during the image formation is different among positions where the respective steps of the formation of the electrostatic image, the toner image formation, the primary transfer of the toner image, the secondary transfer of the toner image, and the fixing of the toner image are performed. The pre-rotation step is performed in a period of a preparatory operation, before the image forming step, from an input of the start instruction until the image is started to be actually formed. The sheet interval step (image interval step) is performed in a period corresponding to an interval between a recording material S and a subsequent recording material S when the images are continuously formed on a plurality of recording materials S (continuous image formation). The post-rotation step is performed in a period in which a post-operation (preparatory operation) after the image forming step is performed. During non-image formation (non-image formation period) is a period other than the period of the image formation (during image formation) and includes the periods of the pre-rotation step, the sheet interval step, the post-rotation step and further includes a period of a pre-multi-rotation step which is a preparatory operation during turning-on of a main switch (power source) of the image forming apparatus 1 or during restoration from a sleep state.

3. Sensing Unit

Next, a structure of the sensing unit 3 having a function of reading the chart outputted in the operation in the adjustment mode in which the secondary transfer voltage is adjusted will be described.

As shown in FIG. 1, inside the sensing unit 3, a feeding path P along which the recording material S passes is provided, and first and second line sensors 91 and 92 are provided so as to sandwich the feeding path P from front and back sides. The first line sensor 91 is disposed on a side upstream of the second line sensor 92 with respect to the feeding direction of the recording material S so as to oppose the feeding path P from below in FIG. 1. Further, the second line sensor 92 is disposed on a side downstream of the first line sensor 91 with respect to the feeding direction so as to oppose the feeding path P from above in FIG. 1. In this embodiment, in the case where the adjustment of the secondary transfer voltage for both sides (double sides) is made in the operation in the adjustment mode, the recording material S on which the charts are formed on both (double) sides passes through the feeding path P inside the sensing unit 3 so that an upper side in FIG. 1 is a second side and a lower side in FIG. 1 is a first side. That is, the first line sensor 91 opposes the first side of the recording material S and the second line sensor 92 opposes the second side of the recording material S, so that the images (patches) of the chart formed on both (double) sides of the recording material S can be read by single passing of the recording material S.

Further, a first pressing roller 93 is provided in a position opposing the first line sensor 91, and a second pressing roller 94 is provided in a position opposing the second line sensor 92.

During the reading of the chart, the first and second pressing rollers 93 and 94 stabilize an attitude of the recording material S and thus stabilize a reading result. The recording material S passed through the sensing unit 3 is discharged to the discharge portion 8.

As each of the first and second line sensors 91 and 92, for example, a CIS (contact image sensor) or the like can be suitably used. In this embodiment, each of the first and second line sensors 91 and 92 is capable of reading the chart with resolution of about 300 dpi. In this embodiment, image data read by each of the first and second line sensors 91 and 92 is processed as a brightness value of 0-255 for each of RGB in the controller 30.

As shown in FIG. 2, the sensing unit 3 is connected to the controller 30 and is capable of delivering, to the controller 30, information (density information on the density) read by the first and second line sensors 91 and 92.

In this embodiment, the chart is read by a sensing unit 3, but the present invention is not limited to such a constitution. For example, the image reading portion 80 may be provided with a chart reading function. In that case, the chart discharged from the image forming apparatus 1 (printer unit 2) is set on the image reading portion 80 by an operator. Further, devices corresponding to the line sensors 91 and 92 may be provided along a feeding passage of the printer unit 2.

4. Control of Secondary Voltage

Figure 3:
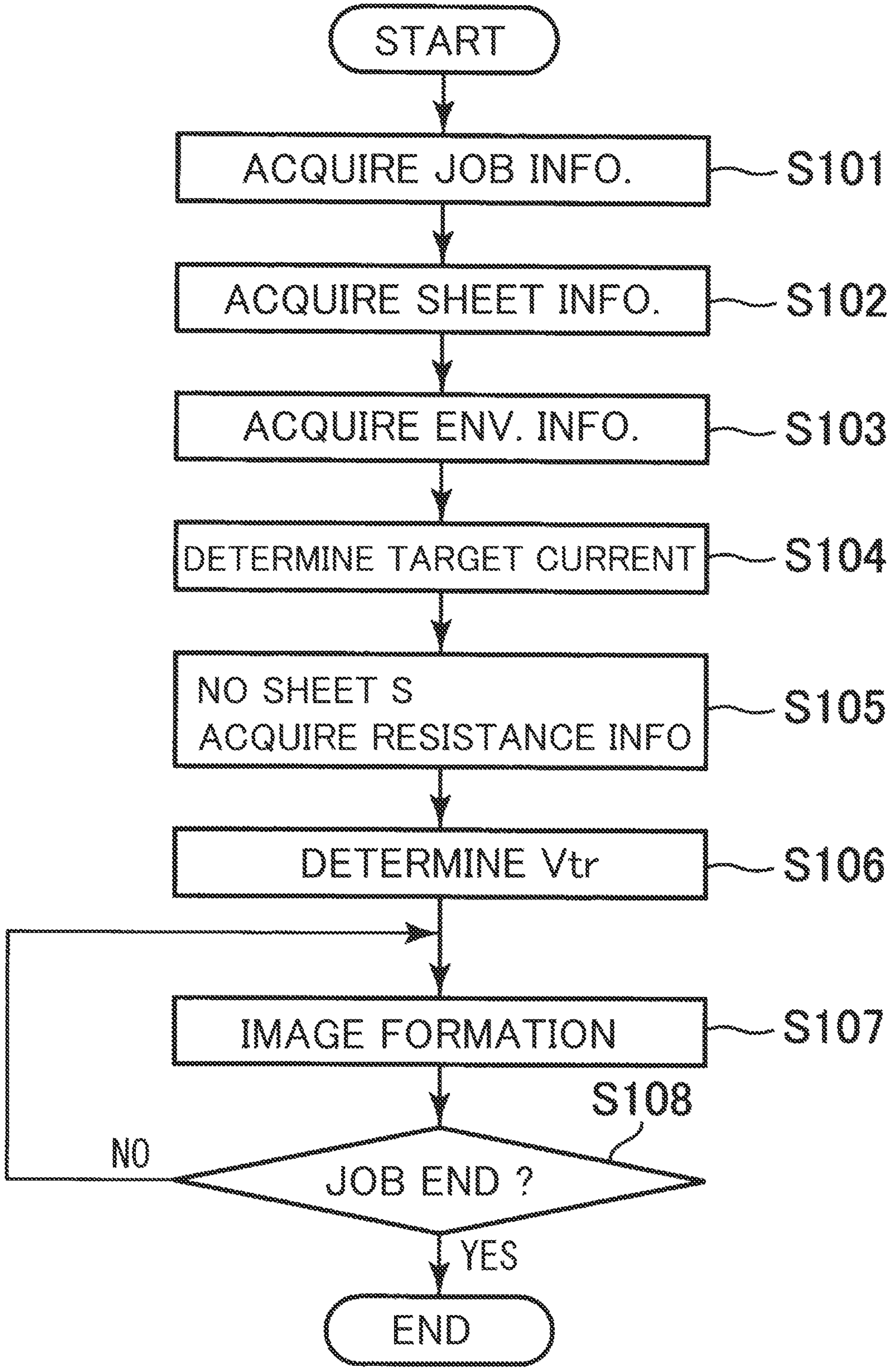
FIG. 3 is a flowchart showing an outline of a procedure of secondary transfer voltage control.

Next, control of the secondary transfer voltage will be described. FIG. 3 is a flowchart showing an outline of a procedure relating to the control of the secondary transfer voltage in this embodiment. Generally, the control of the secondary transfer voltage includes constant-voltage control and constant-current control, and in this embodiment, the constant-voltage control is used.

First, the controller 30 (image formation pre-preparation process portion 31*a*) causes the image forming portion to start an operation of a job when it acquires information on the job from the operation portion 70 or the external device 200 (S101). In the information on this job, image information designated by the operator and information on the recording material S are included. The information on the recording material S includes information on a size of the recording material S and information on a kind (so-called "category of paper kind") of the recording material S such as "thin paper, plain paper, thick paper, . . . ". Incidentally, the kind of the recording material S includes types based on general characteristics such as plain paper, thick paper, thin paper, glossy paper, coated paper, and any distinguishable information on the recording material S, such as brand, product number, basis weight, thickness. The controller 30 (image formation pre-preparation process portion 31*a*) writes this job information in the RAM 33 (S102).

Next, the controller 30 (image formation pre-preparation process portion 31*a*) acquires environment information detected by the temperature sensor 71 and the humidity sensor 72 (S103). In the ROM 32, information showing correction between the environment information and a target current Itarget for transferring the toner image from the intermediary transfer belt 44*b* onto the recording material S is stored. The controller 30 (secondary transfer voltage storage/operation portion 31*f*) acquires the target current Itarget corresponding to the environment from the information showing the correlation between the environment information and the target current Itarget, on the basis of the environment information read in S103. Then, the controller 30 (secondary transfer voltage storage/operation portion 30*f*) writes this target current Itarget in the RAM 33 (or the secondary transfer voltage storage/operation portion 31*f*) (S104). Incidentally, why the target current Itarget is changed depending on the environment information is that the toner charge amount varies depending on the environment. As regards the target current Itarget in this embodiment, a secondary transfer current value at which a toner image (a secondary-color whole surface image in this embodiment) with a maximum toner application amount can be transferred onto the recording material S by the image forming apparatus 1 has been acquired in each environment in advance.

Figure 4:
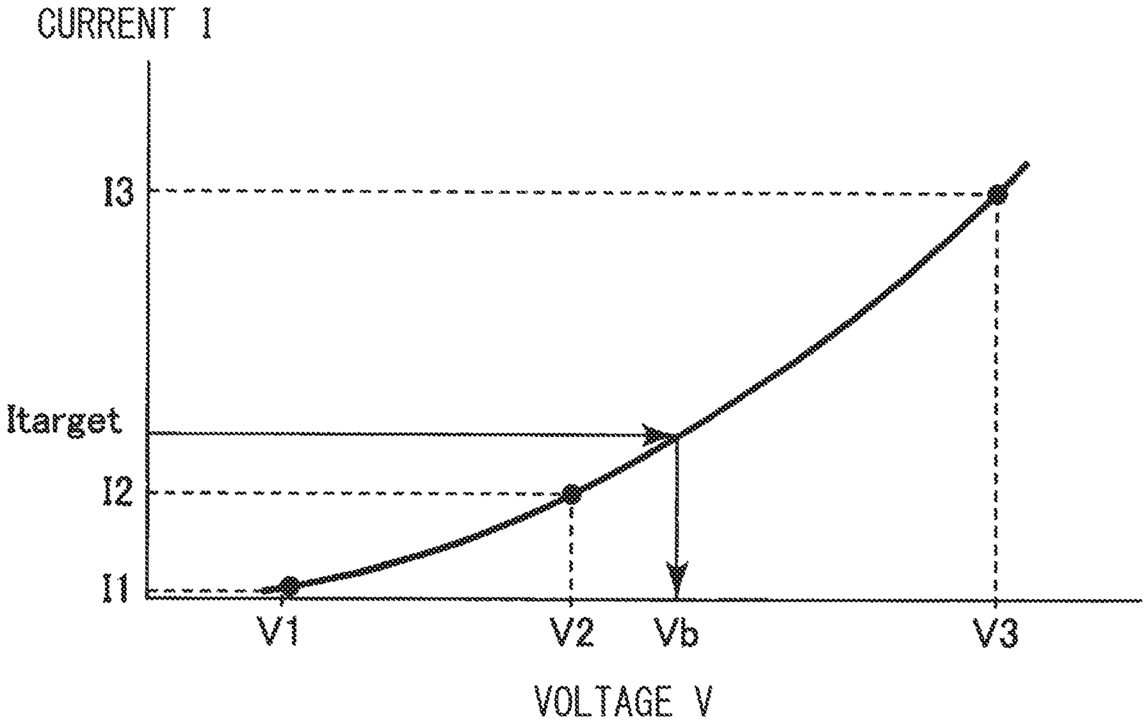
FIG. 4 is a graph showing an example of a voltage-current characteristic acquired in the secondary transfer voltage control.

Next, the controller 30 (ATVC process portion 31*b*) acquires information on an electric resistance of the secondary transfer portion N2 by the ATVC (Active Transfer Voltage Control) before the toner image on the intermediary transfer belt 44*b* and the recording material S onto which the toner image is transferred reach the secondary transfer portion N2 (S105). That is, in a state in which the outer secondary transfer roller 45*b* and the intermediary transfer belt 44*b* are in contact with each other, predetermined voltages of a plurality of levels are applied (supplied) from the secondary transfer power source 76 to the outer secondary transfer roller 45*b*. Then, current values when the predetermined voltages are applied are detected by the current detecting sensor 76*b*, so that a relationship between the voltage and the current (voltage-current characteristic) as shown in FIG. 4 is acquired. The controller 30 (ATVC process portion 31*b*) writes information on this relationship between the voltage and the current in the RAM 33 (or secondary transfer voltage storage/operation portion 31*f*). This relationship between the voltage and the current changes depending on the electric resistance of the secondary transfer portion N2. Incidentally, a plurality levels of predetermined currents are supplied from the secondary transfer power source 76 to the secondary transfer roller 45*b*, and values of voltages generated at that time may be detected by the voltage detection sensor 76*a*. In the constitution of this embodiment, the relationship between the voltage and the current is not such that the current changes linearly relative to the voltage (i.e., is linearly proportional to the voltage), but is such that the current changes so as to be represented by a polynomial expression consisting of two or more terms of the voltage. For that reason, in this embodiment, in order that the relationship between the voltage and the current can be represented by the polynomial expression, the number of predetermined voltages or currents supplied when the information on the electric resistance of the secondary transfer portion N2 is acquired is three or more (levels).

Then, the controller 30 (secondary transfer voltage storage/operation portion 31*f*) acquires a voltage value to be applied from the secondary transfer power source 76 to the outer secondary transfer roller 45*b* (S106). That is, on the basis of the target current Itarget written in the RAM 33 in S104 and the relationship between the voltage and the current acquired in S105, the controller 30 acquires a voltage value Vb necessary to cause the target current Itarget to flow in a state in which the recording material S is absent in the secondary transfer portion 45*n*. This voltage value Vb corresponds to a secondary transfer portion part voltage (transfer voltage corresponding to the electric resistance of the secondary transfer portion N2). Further, in the ROM 32, pieces of information for acquiring a recording material part voltage (transfer voltage corresponding to the electric resistance of the recording material S) Vp as shown in FIG. 5 are stored. The information is set as table data showing a relationship between ambient water content (absolute water content) and the recording material part voltage Vp for each of sections (corresponding to paper kind categories) of basis weights of recording material S. Further, the recording material S once passed through the fixing portion 46 increases in electric resistance by a lowering in water content of an external environment, and therefore, separate table data are prepared for the first side and the second side. On the basis of the information on the job acquired in S101 and the environment information acquired in S103, the controller 30 (secondary transfer voltage storage/operation portion 31*f*) acquires the recording material part voltage Vp from the above-described table data. Incidentally, the table data for acquiring the recording material part voltage Vp as shown in FIG. 5 has been acquired in advance by an experiment or the like. Further, the controller 30 is capable of acquiring the ambient water content on the basis of the temperature information acquired by the temperature sensor 71 and the humidity information acquired by the humidity sensor 72. Further, in the case where the adjusting value is set by the operation in the adjustment mode, described later, for setting the set value of the secondary transfer voltage, the controller 30 (secondary transfer voltage storage/operation portion 31*f*) acquires an adjusting amount AV depending on the adjusting value. As described later, this adjusting value is stored in the RAM 33 (or the secondary transfer voltage storage/operation portion 31*f*) in the case where the adjusting value is set by the operation in the adjustment mode. The controller 30 (secondary transfer voltage storage/operation portion 31*f*) acquires Vp+Vp+AV which is the sum of the above-described voltage values Vb, Vp and AV, as a secondary transfer voltage Vtr applied from the secondary transfer power source 76 to the outer secondary transfer roller 45*b* when the recording material S passes through the secondary transfer portion N2. Then, the controller 30 writes this Vtr(=Vb+Vp+ΔV) in the RAM 33 (or the secondary transfer voltage storage/operation portion 31*f*).

Here, the recording material part voltage Vp also changes depending on a surface property of the recording material S other than the information (thickness, basis weight or the like) relating to the electric resistance of the recording material S in some instances. For that reason, the table data may also be set so that the recording material part voltage Vp changes also depending on the information relating to the surface property of the recording material S. Further, in this embodiment, the information relating to the electric resistance of the recording material S (and in addition, the information relating to the surface property of the recording material S) are included in the job information acquired in S101. However, a measuring means for detecting the thickness of the recording material S and the surface property of the recording material S is provided in the image forming apparatus 1, and the recording material part voltage Vp may also be acquired on the basis of information acquired by this measuring means.

Next, the controller 30 (the image formation process portion 31*c*) controls the image forming portion to form the image and to send the recording material S to the secondary transfer portion N2 and controls the secondary transfer device to perform the secondary transfer by applying the secondary transfer voltage Vtr determined as described above (S107). Thereafter, the controller 30 (the image formation process portion 31*c*) repeats the processing of S107 until all the image in the job are transferred and completely outputted on the recording material S (S108).

Incidentally, also as regards the primary transfer portion N1, the ATVC similar to the above-described ATVC is carried out in a period from a start of the job until the toner image is fed to the primary transfer portion N1, but detailed description thereof will be omitted in this embodiment.

5. Outline of Adjustment Mode

Next, an operation in an adjustment mode for setting the set voltage of the secondary transfer voltage will be described. Depending on the type and condition of the recording material S used in image formation, the water (moisture) content and electrical resistance value of the recording material S may differ greatly from the standard recording material S. In this case, there is a possibility that appropriate transfer cannot be performed with the set voltage of the secondary transfer voltage using the default recording material part voltage Vp set in advance as described above.

First, when the secondary transfer voltage is insufficient, the toner on the intermediary transfer belt 44*b* cannot be sufficiently transferred onto the recording material S, so that the image density lowers. For example, the case where a resistance value of the recording material S is higher than a value (corresponding to the recording material part voltage Vp) assumed for each paper kind category, or the case where the recording material S lowers in water content (dries) depending on a storage condition of the recording material S and thus an electric resistance value increases, would be considered. In such a case, it is desirable to increase (an absolute value of) the set voltage of the secondary transfer voltage by increasing the recording material part voltage Vp.

On the other hand, when the secondary transfer voltage is higher than necessary, abnormal (electric) discharge occurs and image defect is caused to occur, or electric charge of the toner is reversed by the influence of the discharge in the secondary transfer portion N2, and thus the transfer property lowers in some instances. For example, the case where the electric resistance value of the recording material S is lower than the value (corresponding to the recording) material part voltage Vp) assumed for each paper kind category, or the case where the recording material S increases in water content (absolute moisture) depending on the storage condition and thus the electric resistance value increases, would be considered. In this case, it is desirable to decrease (an absolute value of) the set voltage of the secondary transfer voltage by reducing the recording material part voltage Vp.

Therefore, it is desired that the operator such as a user or a service person adjusts (changes) the recording material part voltage Vp depending on the recording material S actually used for image formation, for example, to optimize the setting voltage of the secondary transfer voltage during the execution of the job. In other words, it is only required that an optimum "recording material part voltage Vp+Vb (adjusting amount)" depending on the recording material S actually used for image formation is selected. This adjustment may be performed by the following method. For example, the operator outputs the images while switching the secondary transfer voltage for each recording material S. and confirms the presence or absence of an image defect occurring in the output image to obtain an optimal secondary transfer voltage, on the basis of which setting voltage (specifically. (recording material part voltage) Vp+(adjusting amount) ΔV) of the optimum secondary transfer voltage is determined. However, in this method, since the outputting operation of the image and the adjustment of the setting voltage of the secondary transfer voltage are repeated, the recording material S which is wasted increases, and it takes time in some instances.

Therefore, in this embodiment, the image forming apparatus 1 is capable of executing the operation in the adjustment mode in which the set voltage of the secondary transfer voltage is adjusted. In this operation in the adjustment mode, a chart on which a plurality of representative color patches (test images, test patterns, test toner images) are transferred and formed on the recording material S is formed, while the secondary transfer voltage is switched for each of the patches. And, the set voltage of an optimum secondary transfer voltage (specifically, (recording material part voltage) Vp+(adjusting amount) ΔV) is determined on the basis of a result of reading of the outputted chart by the sensing unit 3. Particularly, in this embodiment, on the basis of brightness information (density information) of a path on the chart, the adjusting amount ΔV (specifically, an adjusting value N corresponding thereto) recommended for optimizing an image density is presented. By this, necessity that the operator confirms the presence or absence of the image defect by eye observation is reduced, so that it becomes possible to appropriately adjust the set voltage to a set voltage of a more appropriate secondary transfer voltage while alleviating an operation load of the operator.

6. Chart

Next, a chart 100 outputted in the operation in the adjustment mode in this embodiment will be described. In this embodiment, depending on a size of the recording material S used for outputting the chart 100, different charts 100 are outputted. Incidentally, a length of the recording material S in the feeding direction of the recording material S is simply referred to as a "feeding direction length", and a length of the recording material S in a direction substantially perpendicular to the feeding direction of the recording material S is simply referred to as a "width". The feeding direction of the recording material S is substantially parallel to a sub-scan direction (surface movement direction of the photosensitive drum 51 and the intermediary transfer belt 44*b*), and the direction (herein, also referred to as a "widthwise direction") substantially perpendicular to the feeding direction of the recording material S is substantially parallel to a main scan direction (direction substantially perpendicular to the surface movement direction of the photosensitive drum 51 and the intermediary transfer belt 44*b*). Incidentally, also, as regards the chart, image data defining the chart, or patches formed on the chart, the above-described "feeding direction length" of the recording material S and the above-described length of the recording material S in the direction corresponding to the "width" are also simply referred to as the "feeding direction length" and the "width", respectively.

Figure 6:
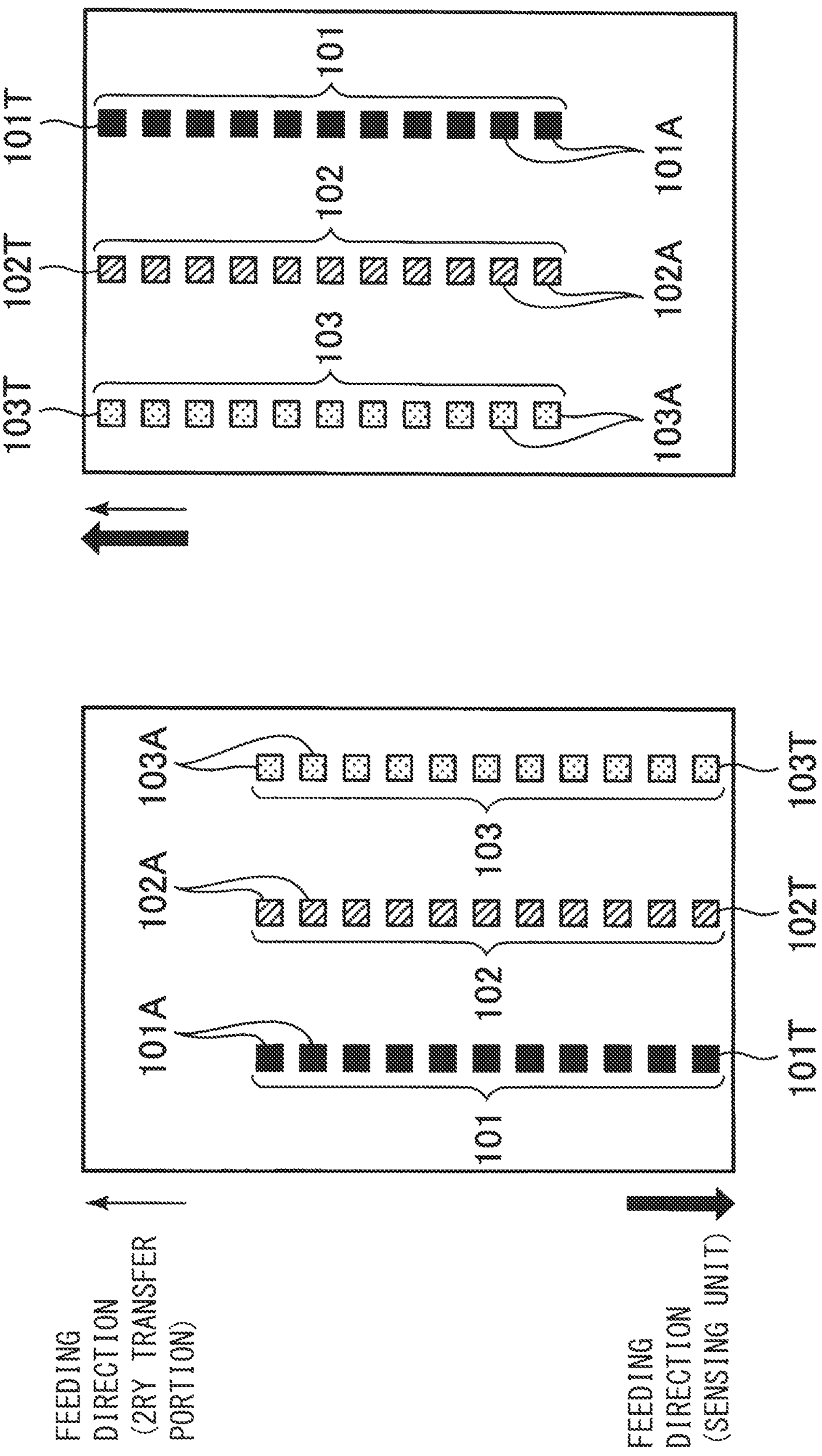
FIG. 6 includes schematic views each showing a L (large) chart outputted in an operation in an adjustment mode.

FIG. 6 is a schematic view showing a large chart (also referred to as an "L chart") 100L in the case where a length in the feeding direction of the recording material S is 420 mm (long side of A3-size sheet) or more and a width of the recording material S is 279.4 mm (long side of LTR-size sheet) or more.

A Large chart data (also referred to as "L chart data"), which is image data defining the L chart 100L corresponds to the maximum sheet passing size. An image size of the L chart data is approx. 13 inches (nearly equal to 330 mm) (width)×19.2 inches (nearly equal to 487 mm) (feeding direction length). An L chart 100L corresponding to image data cut out from this L chart data is outputted according to the size of the recording material S. At this time, the image data is cut out from the L chart data in accordance with the size of the recording material S based on a leading end with respect to a reading direction and a center with respect to the widthwise direction. FIG. 6 shows the case where the size of the recording material S is an A3 size (short edge feeding). For example, in the case where the recording material S used for outputting the L chart 100L is the A3 size (short edge feeding) (width: 297 mm×feeding direction length: 420 mm), the image data having a size of 292 mm (width)×415 mm (feeding direction length) is cut out from the L chart data. And, the image corresponding to the cut-out image data is formed on an A3-size recording material S (short edge feeding) with a margin of 2.5 mm at each end portion on the basis of the leading end with respect to the reading direction and on the center with respect to the widthwise direction. Incidentally, this margin is typically about 2-10 mm.

On the L chart 100L, solid blue (B) patches 101, solid black (Bk) patches 102, and black half-tone (BkHT) patches 103 are arranged in the widthwise direction, and 11 sets of these patches in total are arranged in the feeding direction of the recording material S. In this embodiment, in the case where an output of the exposure device 42 during non-image formation is 0 and an output of the exposure device 42 during image formation is 255, an output of the exposure device 42 during image formation of the BkHT patch 103 was 128. Incidentally, a solid patch (solid image) is an image with a maximum toner application amount. Further, the half-tone patch (half-tone image) can be formed in a toner application amount of about 10-80% when the toner amount of the solid image is 100%, and is typically formed in the toner application amount of about 40-60%. Further, a large chart 100L (1) shown in FIG. 6 shows the first side of the recording material S, and a large chart 100L (2) shown in FIG. 6 corresponds to the second side of the recording material S. The second side passes through the secondary transfer portion N2 and then passes through an inside of the sensing unit 3 with no change in direction, but the first side once passes through the reverse feeding portion. For that reason, the first side is different in direction between when it passes through the secondary transfer portion N2 and when it passes through the inside of the sensing unit 3. In FIG. 6, the feeding direction of the chart when it passes through the secondary transfer portion N2 is indicated by a thin arrow, and the feeding direction of the chart when it passes through the inside of the sensing unit 3 is indicated by a thick arrow. In this embodiment, a leading end patch of the solid B patches 101, a leading end patch of the solid Bk patches 102, and a leading end patch of the BkHT patches 103 when the chart passes through the inside of the sensing unit 3 are patches 101T, 102T and 103T, respectively (in this case, these patches are also referred to as "trigger patches" for acquiring positional information). The trigger patches 101T, 102T, and 103T are used for accurately detecting positions of a patch line (array) when they are read by the first and second line sensors 91 and 92. Of the solid B patches 101, the solid Bk patches 102, and the BkHT patches 103, remaining 10 patches each thereof excluding the trigger patches 101T, 102T, and 103T are patches for acquiring brightness information (density information) (herein, referred to as "adjusting patches") 101A, 102A, and 103A. The adjusting patches 101A, 102A, and 103A are transferred onto the recording material S under application of different secondary transfer voltages Vtr.

In this embodiment, a size of each of the patches (adjusting patches, trigger patches) is 15 mm (feeding direction length)×15 mm (width), and the solid B patches 101, the solid Bk patches 102, and the BkHT patches 103 are arranged with an interval of 15 mm between adjacent two patches thereof in the feeding direction of the recording material S.

Further, on the first side 100L (1) and the second side 100L (2) of the L chart 100, the patches 101, 102, and 103 are arranged so as not overlap with each other between the front side and the back side of the recording material S. This is because, when these patches are read by the first and second line sensors 91 and 92, the influence of the set-off on detected brightness is avoided. This influence of the set-off on the detected brightness is worrisome in the case where the recording material S is thin paper which is particularly small in basis weight.

Figure 7:
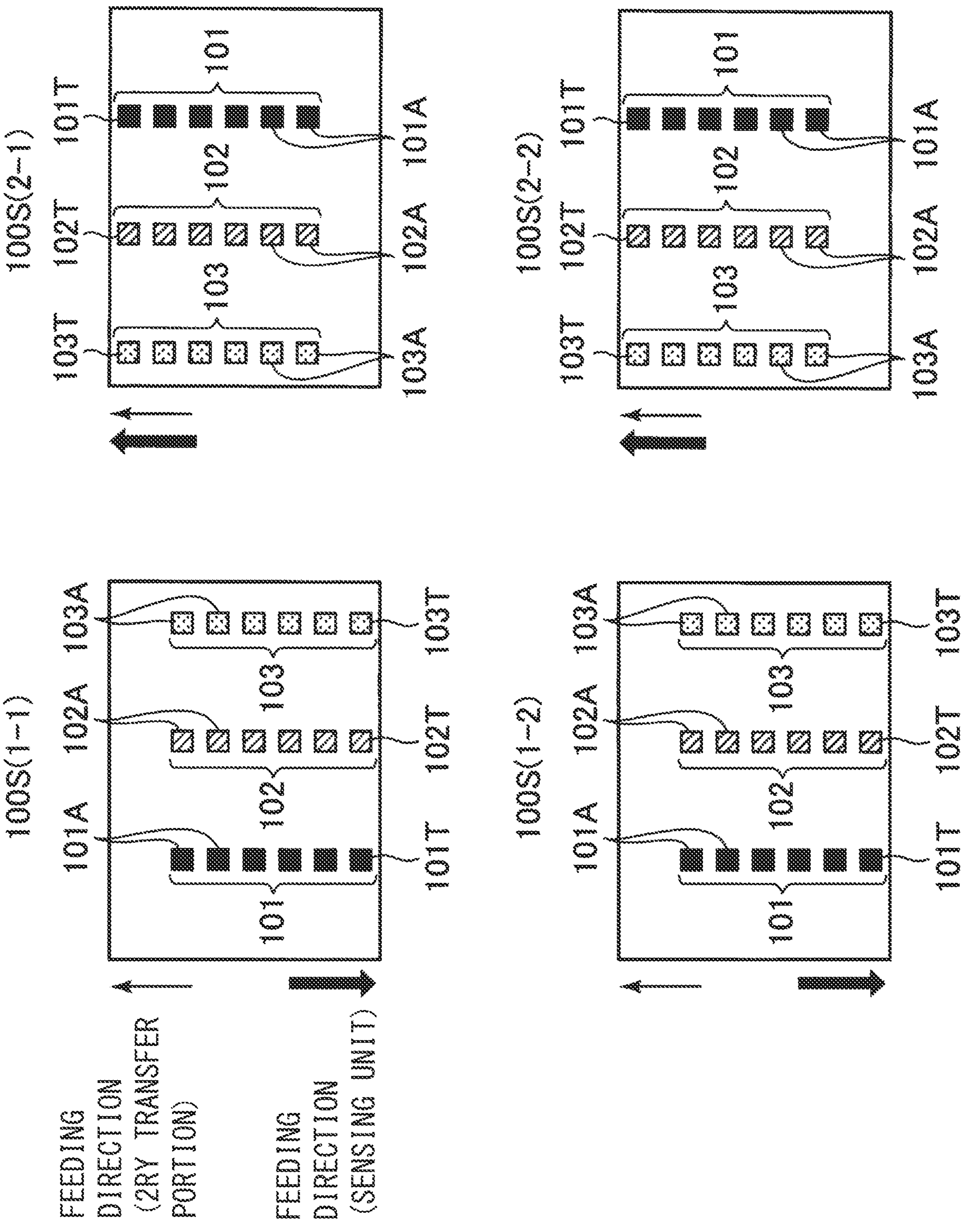
FIG. 7 includes schematic views each showing a S (small) chart outputted in the operation in the adjustment mode.

FIG. 7 is a schematic view showing a small chart (also referred to as an "S chart") 100S in the case where a length in the feeding direction of the recording material S is 210 mm (short side of A4-size sheet) or more and less than 420 mm (long side of A3-size sheet), and a width of the recording material S is 279.4 mm (long side of LTR-size sheet) or more.

Small chart data (also referred to as "S chart data"), which is image data defining the S chart 100S, corresponds to half of the maximum sheet passing size. An image size of the L chart data is approx. 13 inches (nearly equal to 330 mm) (width)×9.6 inches (nearly equal to 243 mm) (feeding direction length). In the case where the size of the recording material S is an A4 size (long edge feeding) or an LTR size (long edge feeding), an S chart 100S corresponding to image data cut out from this L chart data is outputted according to the size of the recording material S. At this time, the image data is cut out from the S chart data in accordance with the size of the recording material S based on a leading end with respect to a reading direction and a center with respect to the widthwise direction. FIG. 7 shows the case where the size of the recording material S is an A4 size (long edge feeding). For example, in the case where the recording material S used for outputting the S chart 100S is the A4 size (long edge feeding) (width: 210 mm×width: 297 mm), the image data having a size of 205 mm (feeding direction length)×292 mm (width) is cut out from the L chart data. And, the image corresponding to the cut-out image data is formed on an A4-size recording material S (long edge feeding) with a margin of 2.5 mm at each end portion on the basis of the leading end with respect to the reading direction and on the center with respect to the widthwise direction. Incidentally, this margin is typically about 2-10 mm.

On the S chart 100S, solid blue (B) patches 101, solid black (Bk) patches 102, and the BkHT patches 103 are arranged in the widthwise direction over two recording materials S, and 12 sets of these patches in total are arranged in the feeding direction of the recording material S over the two recording materials S. In the S chart 100S, the two recording materials S are used for forming the chart, so that the same patch number as the patch number of the L chart 100L is ensured and thus similar adjustment can be performed. In the S chart 100S shown in FIG. 7, a chart 100S (1-1) shows a first side of a first sheet, a chart 100S (1-2) shows a first side of a second sheet, a chart 100L (2-1) shows a second side of the first sheet, and a chart 100L (2-2) shows a second side of the second sheet. The second side passes through the secondary transfer portion N2 and then passes through an inside of the sensing unit 3 with no change in direction, but the first side once passes through the reverse feeding portion. For that reason, the first side is different in direction between when it passes through the secondary transfer portion N2 and when it passes through the inside of the sensing unit 3. In FIG. 6, the feeding direction of the chart when it passes through the secondary transfer portion N2 is indicated by a thin arrow, and the feeding direction of the chart when it passes through the inside of the sensing unit 3 is indicated by a thick arrow. In this embodiment, a leading end patch of the solid B patches 101, a leading end patch of the solid Bk patches 102, and a leading end patch of the BkHT patches 103 when the chart passes through the inside of the sensing unit 3 are patches 101T, 102T, and 103T, respectively (in this case, these patches are also referred to as "trigger patches" for acquiring positional information). The trigger patches 101T, 102T, and 103T are used for accurately detecting positions of a patch line (array) when they are read by the first and second line sensors 91 and 92. Of the solid B patches 101, the solid Bk patches 102, and the BkHT patches 103, remaining 10 patches each thereof excluding the trigger patches 101T, 102T, and 103T are adjusting patches 101A, 102A, and 103A for acquiring brightness information (density information). The adjusting patches 101A, 102A, and 103A are transferred onto the recording material S under application of different secondary transfer voltages Vtr.

As described above, in this embodiment, a size of each of the patches (adjusting patches, trigger patches) is 15 mm (feeding direction length)×15 mm (width), and the solid B patches 101, the solid Bk patches 102, and the BkHT patches 103 are arranged with an interval of 15 mm between adjacent two patches thereof in the feeding direction of the recording material S. Further, on the first sides 100S (1-1) and 100S (1-2) and the second sides 100S (2-1) and 100S (2-2) of the S chart 100S, the B patches 101, 102 and 103 are arranged so as not overlap with each other between the front side and the back side of the recording material S. This is because when these patches are read by the first and second line sensors 91 and 92, the influence of the set-off on detected brightness is avoided.

This influence of the set-off on the detected brightness is worrisome in the case where the recording material S is thin paper particularly small in basis weight.

The size of each of the patches (particularly the adjusting patches) may desirably be large in area to some extent when reading by the line sensors 91 and 92 is taken into consideration. However, when the size of each patch (adjusting patch) is made excessively large, the number of secondary transfer voltages Vtr which can be changed in the chart becomes small. In this embodiment, in the low chart 10L, the patch size is to the extent such that the secondary transfer voltage Vtr can be changed at 10 levels. Further, a patch interval with respect to the feeding direction of the recording material S may only be required to be set so as to permit switching of the secondary transfer voltage.

Here, it is preferable to prevent patches from being formed in the neighborhood of the leading and trailing ends of the recording material S in the process advance direction (for example, in the range of about 10 mm inward from the edge). This is because there may be an image defect that occurs only at the leading end or the trailing end in some instances, and there is a possibility that it is hard to determine whether or not such an image defect has occurred due to the secondary transfer voltage.

In this embodiment, the size of the recording material S usable for outputting the chart is 210 mm (short side of A4 size) or more in length with respect to the feeding direction and is 279.4 mm (short side of LTR size) or more in width. In this embodiment, when the recording material size is larger than the size, not only recording material S of regular sizes but also recording materials S of arbitrary sizes may be made usable by designation thereof through input from the operating portion 70 or the external device 200 by the operator. Incidentally, the size of the recording material S usable for outputting the chart is not limited to those in this embodiment, but may be appropriately set depending on the maximum sheet passing size or the like of the image forming apparatus 1.

Further, in this embodiment, in the case where adjustment of the secondary transfer voltage only for one-side of the recording material S (adjustment of only the secondary transfer voltage during one-side printing) (herein, also referred to as "one-side adjustment") is performed, the following operation is carried out. In the case where the L chart 100L is outputted, in the image forming operation of the one-side printing, the chart of 100L (2) in FIG. 6 is formed and outputted on a first side of a single recording material S. Further, in the case where the S chart 100S is outputted, in the image forming operation of the one-side printing, the chart of 100S (2-1) and the chart of 100S (2-2) in FIG. 7 are formed and outputted on a first side of a first recording material S and a first side of a second recording material S, respectively. That is, the chart for a second side in the case where adjustment of the secondary transfer voltages for the double sides of the recording materials (adjustment of the secondary transfer voltages for the first side and the second side during the double-side printing) (herein, also referred to as "double-side adjustment") is performed is outputted without being passed through the reverse feeding path 7. Further, reading of the chart is made by using the second line sensor 92 of the sensing unit 3. By this, a direction of the read image is not changed from the direction during the double-side adjustment and the recording material S does not pass through the reverse feeding path 7, so that the one-side adjustment can be executed while minimizing a downtime (time when the image cannot be outputted for adjustment or the like). Incidentally, an adjustment result for the first side during the double-side printing can be used for setting the secondary transfer voltage during the one-side printing.

Further, design of the chart is not limited to those in this embodiment. For example, the adjusting patches are not limited to the solid B image, the solid Bk image, and the BkHT image. The solid patch may be, for example, either one of the solid B image and the solid Bk image, or another single-color solid image and another solid image of mixed color such as a secondary color or a multiple-order color consisting of three or more colors may be arbitrarily used singly or in combination. Further, the half-tone patch (image) is not limited to the black patch (image), but may be a half-tone image of another single color or a half-tone image of mixed color such as a secondary color or a multiple-order color consisting of three or more colors. Further, the density of the half-tone patch is not limited to the density in this embodiment. Further, the color and the density of the patches may be made changeable depending on, for example, an image actually outputted by the user. Such a change can be made from, for example, the operating portion 70 or the external device 200. Further, a shape and the number of the adjusting patches may be changed depending on the size, a reading type, or the like of the recording material S which meets the output of the chart. Further, the shape and the like of the trigger patches are not limited to those in this embodiment. Further, depending on the reading type of the chart, the trigger patches are not necessarily needed.

Further, for example, on assumption that the operator checks information by eyes, as identification (discrimination) information indicating setting of the secondary transfer voltage when the respective patches are transferred onto the recording material S, information such as a patch number (described later) may be printed in association with the patches of each set with respect to the feeding direction of the recording material S. Further, for example, on assumption that the operator checks information by eyes, as identification information indicating whether the chart is the adjusting chart for the first side or the adjusting chart for the second side, information such as the front side (first side) or the back side (second side) may be printed on a corresponding side.

7. Operation of Adjustment Mode

Figure 8:
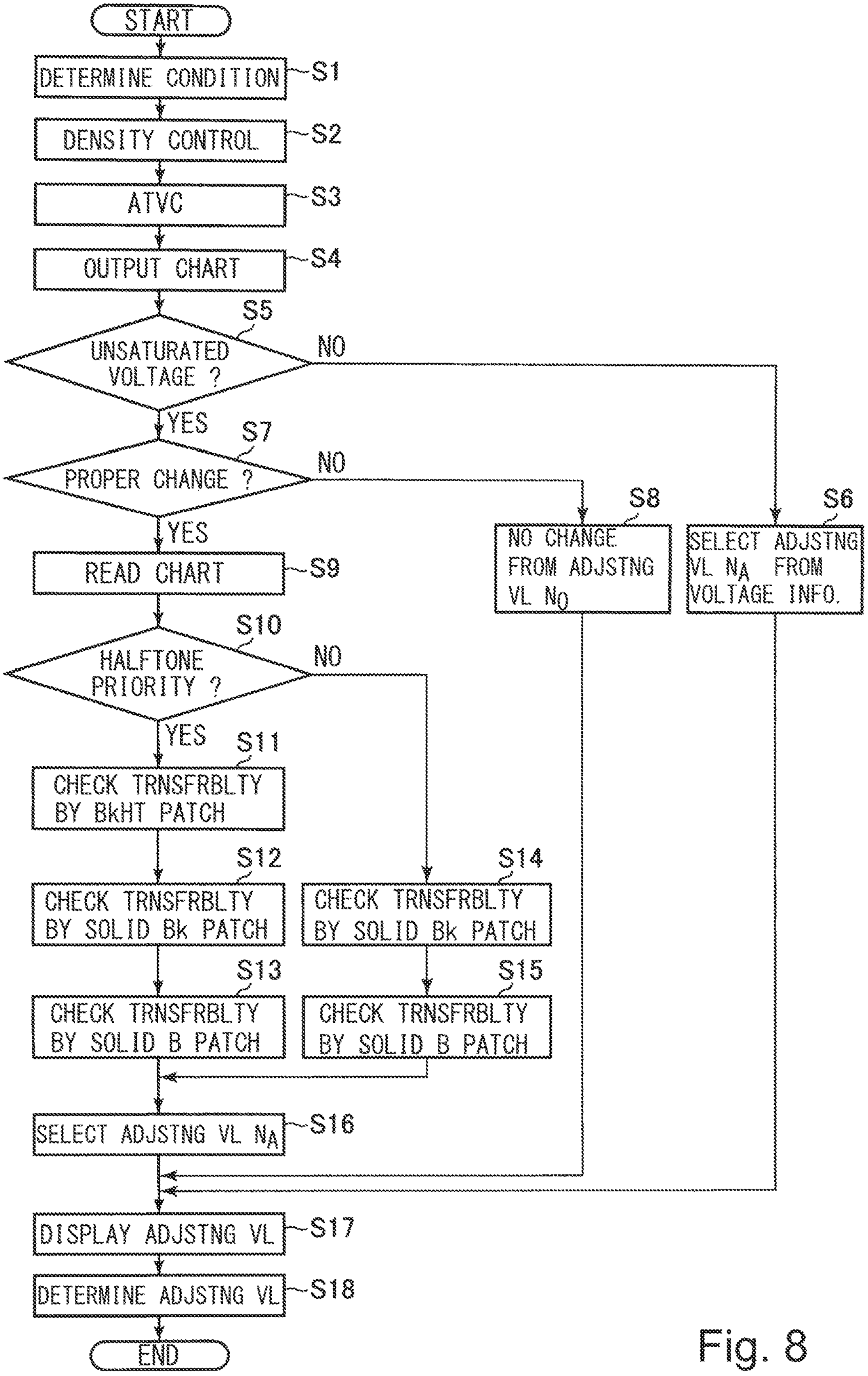
FIG. 8 is a flowchart showing an outline of a procedure of the operation in the adjustment mode in an embodiment 1.

Next, the operation in the adjustment mode in this embodiment will be described. FIG. 8 is a flowchart showing an outline of procedure of the operation in the adjustment mode in this embodiment. In this embodiment, the case where the operator causes the image forming apparatus 1 to execute the operation in the adjustment mode via the operating portion 70 of the image forming apparatus 1 will be described. A function of the operating portion 70 for causing the image forming apparatus 1 to execute the operation in the adjustment mode may also be performed by the external device 200 such as a personal computer, for example. Further, in the following description, symbols shown below will be used.

N: adjusting value (=−20 to +20)

$N_0$: present adjusting value (before execution of operation in adjustment mode)

NA: selected adjusting value n: adjusting patch number in (n=1 to 10 from small adjusting value)

n0: patch number corresponding to present adjusting value (corresponding to adjusting value $N_0$ nA: selected patch number (corresponding to adjusting value NA)

T: symbol indicating trigger patch

Figure 9:
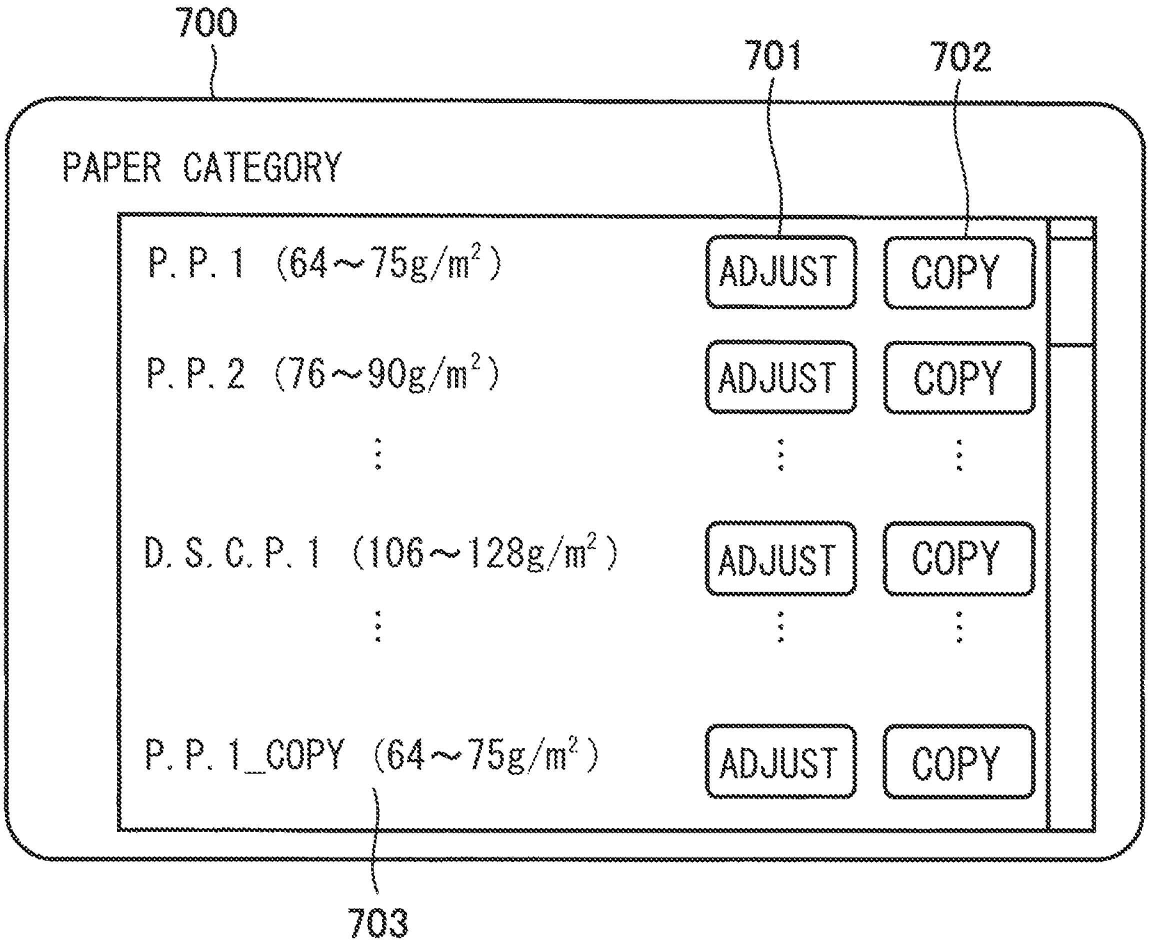
FIG. 9 is a schematic view of a paper kind category selecting screen.

First, the controller 30 (adjustment process portion 31*d*) acquires information of the recording material S (size and paper kind category of the recording material S) and information of an adjusting condition which are inputted by and intended to be adjusted by the operator (S1). FIG. 9 is a schematic view of a paper kind category selecting screen 700 displayed at the display portion 70*a* of the operating portion 70 through control by the controller (adjustment process portion 31*d*) in S1. On the paper kind category selecting screen 700, paper kind categories of the recording materials S settable in the image forming apparatus 2 are displayed. The operator presses (operates) an adjusting button 701, so that the sequence can go to the operation in the adjustment mode in which the set voltage of the secondary transfer voltage is adjusted.

Incidentally, in the paper kind category selecting screen 700, the operator may have access to changing screens not only for adjusting the secondary transfer voltage but also for other image forming conditions such as a fixing condition. Further, in order to leave default setting of each of the paper kind categories as it is, the paper kind category is copied in the RAM 33 or the ROM 32 by a copy button 702, and then the operation in the adjustment mode may also be enabled. The copied paper kind category 703 is stored in another image in the RAM 33 or the ROM 32, and then, as regards the paper kind category 703, the image is formed in the default setting except for a condition in which the setting is changed.

Figure 10:
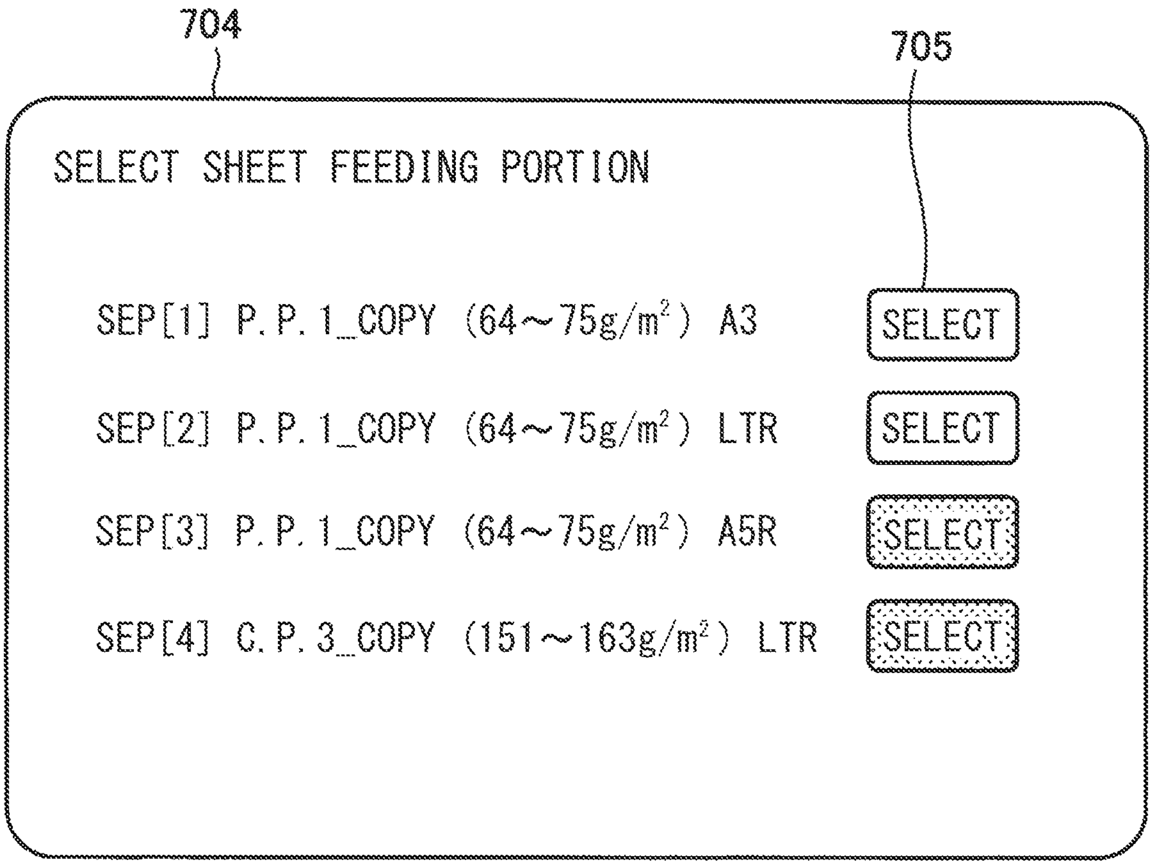
FIG. 10 is a schematic view of a sheet feeding portion selecting screen.

FIG. 10 is a schematic view of a sheet feeding portion selecting screen 704 displayed at the display portion 70*a* of the operating portion 70 through control by the controller 30 (adjustment process portion 31*d*) in S1. When the paper kind category of the recording material S subjected to execution of the operation in the adjustment mode is selected, the sheet feeding portion selecting screen 704 shown in FIG. 10 is displayed. On the sheet feeding portion selecting screen 704, the paper kind categories of the recording materials S accommodated in the sheet feeding portions 4 set through the operating portion 70 or the like in advance by the operator and sizes detected by a recording material size detecting sensor (not shown) provided in each of the sheet feeding portions 4 are displayed. For example, the case where "Plain paper 1 copy (P.P.I. COPY) (64-75 g/m$^2$)" is selected and the operation in the adjustment mode is executed will be described.

In the example shown in FIG. 10, the same "P.P.I. COPY (64-75 g/m$^2$)" is stored in a plurality of sheet feeding portions (sheet feeding portion [1], sheet feeding portion [2], and sheet feeding portion [3]).

Further, in the case of sizes of the recording materials S capable of meeting the operation in the adjustment mode (sheet feeding portion [1] and sheet feeding portion [2] in FIG. 10), the operator is capable of pushing (operating) a selection button 705. In the case of the paper kind category and the paper size which do not meet the operation in the adjustment mode, the selection button 705 is displayed in a gray-out state, and thus the operator may be made not to press (operate) the selection button 705. Further, in the case where the recording material S for executing the operation in the adjustment mode is not stored in either one of the sheet feeding portions 4 or in the like case, by a return(ing) button (not shown) or the like, the operator may be capable of getting out of the sheet feeding portion selecting screen 704 once.

Figure 11:
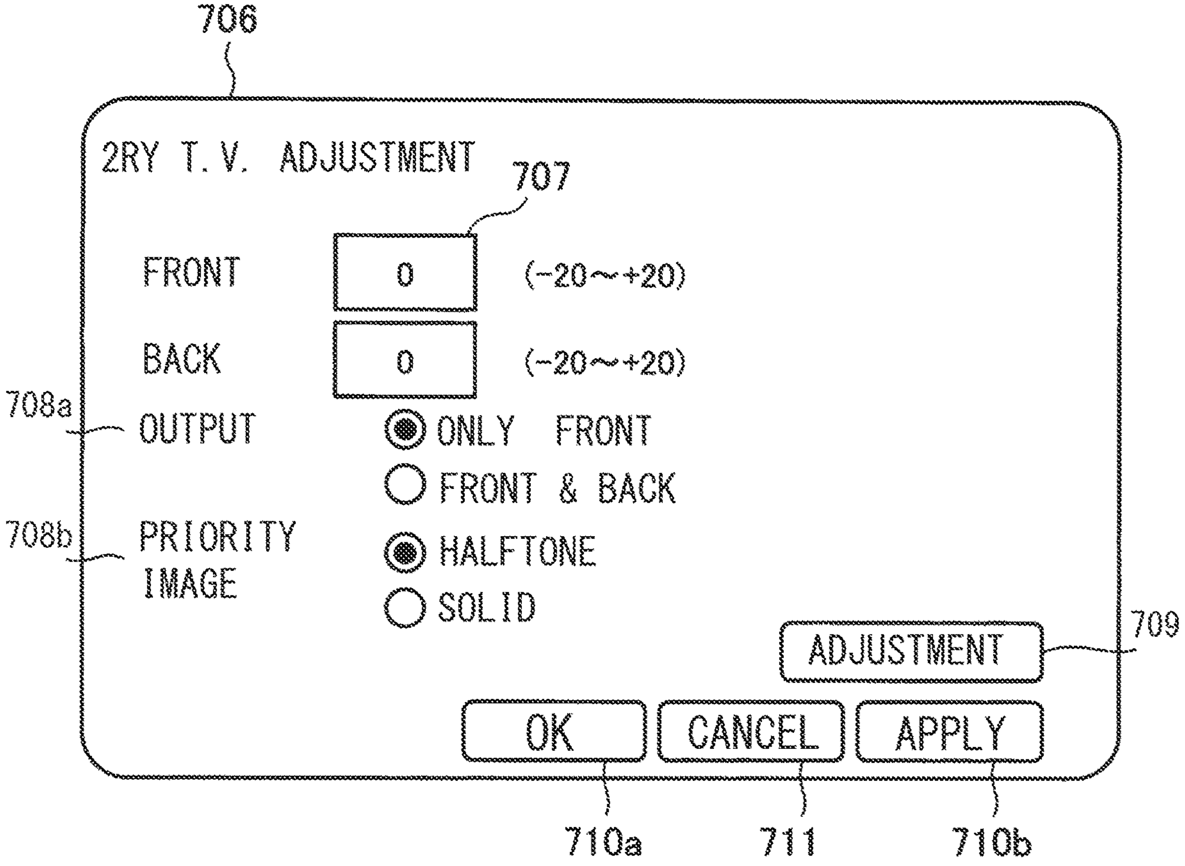
FIG. 11 is a schematic view of a secondary transfer voltage adjusting screen in the embodiment 1.

FIG. 11 is a schematic view of a secondary transfer voltage adjusting screen 706 displayed at the display portion 70*a* of the operating portion 70 by control of the controller 30 (adjusting process portion 31*d*) in S1. When the paper kind category of the recording material S for executing the operation in the adjustment mode is selected and the sheet feeding portion 4 in which the recording material S is stored is selected, the secondary transfer voltage adjusting screen 706 is displayed. The secondary transfer voltage adjusting screen 706 includes an adjusting value display portion 707 on which a present adjusting value is displayed, a one-side/double-side (printing) selecting portion 708*a* for selecting whether an execution object of the operation in the adjustment mode is one side or double (both) sides, and the like. Further, the secondary transfer voltage adjusting screen 706 includes a priority image selecting portion 708*b* for selecting the density of the image intended to be optimized by the user in the operation in the adjusting mode, an adjustment execution button 709 for starting formation of the chart, and the like. As specifically described later, in this embodiment, the priority image selecting portion 708*b* is capable of selecting a priority image from two images consisting of a "half-tone image" and a "solid image". A value is inputted to the adjusting value display portion 707, whereby the secondary transfer is enabled in a state in which with respect to the corresponding paper kind category, the recording material part voltage is offset from a default recording material part voltage Vp stored in the ROM 32. In this embodiment, in the adjusting value display portion 707, an integer value from −20 to +20 is capable of being inputted as an adjusting value N, and a default thereof is 0. In the case where the adjusting value N is 0, the default recording material part voltage Vp corresponding to the paper kind category stored in the ROM 32 is used as it is. As regards the value (adjusting value N) at the adjusting value display portion 707, ΔN=1 is caused to correspond to ΔV=150 V (that is, when the adjusting value N is changed by 1, an adjusting value ΔV changes by 150 V). For example, in the case where N=−5 is inputted to the adjusting value display portion 707, as the recording material part voltage, a value obtained by offsetting the default recording material part voltage Vp by −750 V (=−5×150) is used. In the case where the operator executes the operation in the adjustment mode, the operator selects whether to perform the double-side printing or the one-side printing at the one side/double side selecting portion 708*a* and selects the priority image at the priority image selecting portion 708*b*, and then the operator presses (operates) the adjustment execution button 709. Input contents at the one side/double-side selecting portion 708*a* and the priority image selecting portion 708*b* are stored in the RAM 33. Thus, the input contents in determination of the adjusting condition (S1) are stored in the RAM 33 and are reflected in a subsequent process.

When the adjustment execution button 709 is pressed (operated), the controller 30 (adjusting process portion 31*d*) executes density correction control (S2). The density correction control is carried out for forming a state in which before the secondary transfer voltage is adjusted, the toner in a proper toner amount is placed on the intermediary transfer belt 44*b*. The controller 30 (adjusting process portion 31*d*) forms toner patches for density correction control while changing outputs of the charging power source 73, the developing power source 74, the exposure device 42, and the like, and carries out control so that the toner patches are primary-transferred onto the intermediary transfer belt 44*b*. Then, the controller 30 (adjusting process portion 31*d*) determine an image forming condition during output of the chart by measuring a toner amount of the toner patches, formed on the intermediary transfer belt 40*b*, by a patch detecting sensor (not shown). Incidentally, the density correction control is not necessarily required to be executed every execution of the operation in the adjustment mode. For example, on the basis of the number of times of image formation, a change in environment, an elapsed time from the last execution of the density correction control, the controller 30 (adjusting process portion 31*d*) may discriminate whether or not the density correction control is executed.

Thereafter, the controller 30 (adjusting process portion 31*d*, ATVC process portion 31*b*) executes ATVC (S3). Details of the ATVC are as described above.

Thereafter, the controller 30 (adjusting process portion 31*d*) executes the output of the chart (S4). At this time, the controller 30 (adjusting process portion 31*d*) selects a chart depending on a size of the recording material S and outputs the selected chart.

Parts (a) and (b) of FIG. 12 are graphs each showing a progression of output of the secondary transfer power source 76 in the case where the L chart 100L is formed. Part (a) of FIG. 12 shows the case of the first side during the double-side adjustment, and part (b) of FIG. 12 shows the case of the second side during the double-side adjustment. In the case of the first side, 10 adjusting patches 101A, 10 adjusting patches 102A, and 10 adjusting patches 103A are continuously secondary-transferred onto the recording material S and then the trigger patches 101T to 103T are secondary-transferred onto the recording material S. The adjusting patches 101A to 103A are arranged so that the adjusting values N thereof increase from the lowest adjusting value N. Further, as regards the patch numbers of the adjusting patches 101A to 103A, the patch-number corresponding to the smallest adjusting value N is referred to asn=1 and the patch number corresponding to the largest adjusting value N is referred to as n=10, and these numbers increase correspondingly to an increase in adjusting value. Further, in the case of the first side, as the secondary transfer voltage part voltage Vp, a value for the first side in the table stored in the ROM 32 is used. A switching timing of the secondary transfer voltage when the chart is secondary-transferred onto the recording material S is after passing of the patches 101 to 103 through the secondary transfer portion N2. There is some time lag for switching the output of the secondary transfer power source 76, but the switching is made at the above-described timing, whereby the current of the secondary transfer power source 76 is switched in the margin portion between the patches. In the case of the second side, the arrangement between (the adjusting patches 101A to 103A) and (the trigger patches 101T to 103T) is reversed from the arrangement in the case of the first side, and as regards the recording material part voltage Vp, a table stored for the second side in the ROM 32 is used. However, switching of the secondary transfer voltage and other operations are carried out similarly as in the case of the first side.

In this embodiment, a change range ΔV (801 in FIG. 12 (one-level (stage) change range) of the secondary transfer voltage when the chart is secondary-transferred onto the recording material S is switched depending on the secondary transfer portion part voltage Vb. In this embodiment, when the secondary transfer portion part voltage V b is 2000 V or more, the change range ΔV of the secondary transfer voltage is 450 V corresponding to the adjusting value change range ΔN=3 (corresponding to 3 levels (stages) of the adjusting value N). Further, in the case where the secondary transfer portion part voltage Vb is 1500 V or more and less than 2000 V, the change range ΔV of the secondary transfer voltage is 300 V corresponding to the adjusting value change range ΔN=2 (corresponding to 2 levels of the adjusting value N). In the case where the secondary transfer portion part voltage Vb is less than 1500 V, the secondary transfer voltage change range ΔV is 150 V corresponding to the adjusting value change range ΔN=1 (corresponding to 1 level of the adjusting value N). This is because in order to check current sensitivity of a secondary transfer property, when the change range of the secondary transfer voltage at the 1 level is made larger with an increasing secondary transfer portion part voltage Vb, it would be considered that a change range of a secondary transfer current in entirety of the chart can be made wide and is efficient. In this embodiment, the secondary transfer voltage change range ΔV (adjusting value change range ΔN) when the chart is secondary-transferred on the recording material S is automatically selected depending on a result of the ATVC, but may be made selectable directly in the secondary transfer voltage adjusting screen 706 or the like by the operator. Further, the secondary transfer voltage change range ΔV (adjusting value change range ΔN) when the chart is secondary-transferred on the recording material S may be made selectable by the operation as to whether in an "automatic selection" manner or in a "direct designation" manner.

In each of FIGS. 13A-1 to 13C-2, a list including present adjusting values $N_0$ and secondary transfer voltage adjusting values N applied for each of patch numbers n is shown for each adjusting average value change range ΔN and each side (first side or second side) in this embodiment. FIGS. 13A-1 and 13A-2 show the case of ΔN=1, FIGS. 13B-1 and 13B-2 show the case of ΔN=2, and FIGS. 13C-1 and 13C-2 show the case of ΔN=3. In the case w % here the present adjusting value $N_0$ is "0", a patch number n=5 corresponds to the present adjusting value $N_0$=0, n=1 to n=4 correspond to a lower adjusting value side in ΔN interval, and n=6 to n=10 correspond to a higher adjusting value side in ΔN interval. In the case where the present adjusting value $N_0$ is a value other than 0, the adjusting values corresponding to the adjusting patches 101A to 103A are offset uniformly. Further, in the case where the present adjusting value $N_0$ is large on a "+side" or "−side" when the present adjusting value $N_0$ is fixed to n=5, there is a case that all the patches 101A to 103A of n=1 to 10 do not always fall within an adjusting range of "20". In such a case, the patch corresponding to the present adjusting value $N_0$ is deviated from n=5, so that all the adjusting patches 101A to 103A are caused to fall within the adjusting range of "±20". By this, all the adjusting patches 101A to 103A can be effectively utilized.

In the case of the L chart 100L, when the chart is secondary-transferred onto the recording material S, on a first-side trailing end side of the recording material S and on a second-side leading end side of the recording material S, the trigger patches 101T to 103T exist. The trigger patches 101T to 103T are used for detecting patch positions when the sensing unit 3 reads the patches. For that reason, there is a need that these trigger patches 101T to 103T are transferred at a minimum required density for that purpose. At an extremely high secondary transfer voltage or at an extremely low secondary transfer voltage, there is a risk that these trigger patches cannot be read. For this reason, in this embodiment, a voltage corresponding to the patch number n=5 (voltage indicated by a broken line of 800 in FIG. 12) is applied when the trigger patches 101T to 103T are secondary-transferred onto the recording material S. Incidentally, a setting method of the secondary transfer voltage applied when the trigger patches 101T to 103T are secondary-transferred onto the recording material S is not limited to the above-described method in this embodiment. For example, a method in which the secondary transfer voltage is set at a high value (large in absolute value) to at least suppress a lowering (improper transfer due to a low transfer voltage), a method in which the secondary transfer voltage is subjected to constant-current control and the trigger patches are transferred at a minimum required density, and the like method would be considered.

Parts (a) and (b) of FIG. 14 are graphs each showing a progression of output of the secondary transfer power source 76 in the case where the S chart 100S is formed. Part (a) of FIG. 14 shows the first side during the double-side adjustment, and part (b) of FIG. 14 shows the second side during the double-side adjustment. In the case of the S chart 100S, the chart is divided into a plurality of charts for a first side of a first sheet (100S (1-1)), a first side of a second sheet (100S (1-2)), a second side of the first sheet (100S (2-1)), and a second side of the second sheet (100S (2-2)), and the trigger patches 101T to 103T are disposed on each of the divided charts. However, also, in the case of the S chart 100S, a magnitude and a timing of the overlap of the secondary transfer power source 76 are basically similar to those in the case of the L chart 100L.

Incidentally, as described above, in the case where the one-side adjustment is selected in the one-side/double-side selecting portion 708*a* of the secondary transfer voltage adjusting screen 706 by the operator, the following operation is performed. In the case where the L chart 100L is outputted, the chart of 100L (2) in FIG. 6 is outputted. Further, in the case where the S chart 100S is outputted, the chart of 100S (2-1) and the chart of 100S (2-2) in FIG. 7 are outputted. That is, the charts for the second side in the case where the double-side adjustment is performed are outputted in the image forming operation of the one-side printing without being passed through the reverse feeding path 7. Further, reading of each of the charts is made using the line sensor 92 of the sensing unit 3. By this, the one-side printing can be executed with a minimum downtime since a direction of the reading image is unchanged from during the double-side adjustment and the recording material S does not pass through the reverse feeding path 7.

When the chart is outputted, the controller 30 (adjusting process portion 31*d*) first discriminates whether or not the high voltage (secondary transfer voltage) is not saturated (S5). Here, "saturation of high voltage" refers to a state such that the secondary transfer voltage Vtr reaches an upper limit or a lower limit of the output voltage of the secondary transfer power source 76. There is an upper limit in output voltage of the secondary transfer power source 76, and although depending on specifications of the high-voltage power source, the upper limit of the output voltage (absolute value) of the secondary transfer power source 76 in the case of this embodiment is 6.5 kV.

For example, in the case where the outer secondary transfer roller 45*b* is used for a long term, or in the case where a use environment of the image forming apparatus 1 is a low temperature/low humidity environment, an electric resistance of the secondary transfer portion N2 becomes high, so that the secondary transfer portion part voltage Vb becomes high (absolute value becomes large). As another example, in the case where the present adjusting value $N_0$ is excessively large such as +20, adjustment is performed at the present adjusting value $N_0$=about +20, and therefore, the secondary transfer voltage Vtr necessarily becomes high (absolute value necessarily becomes large). In such a case, the secondary transfer voltage Vtr reaches the upper limit of the output of the secondary transfer power source 76, so that the secondary transfer voltage Vtr cannot be changed during the output of the chart. In the case where the secondary transfer voltages Vtr for all the adjusting patches 101A to 103A (patch numbers, adjusting values) reach the upper limit of the output of the secondary transfer power source 76, the controller 30 (adjusting process portion 31*d*) is incapable of making the acquisition itself, and therefore, determines the adjusting value as a smallest adjusting value ($N_A$=smallest N in chart) in the chart (S6). The reason why the smallest adjusting value is determined is that when the acquisition is made again, a possibility of selection of an adjusting value away from the upper limit of the output of the secondary transfer power source 76 is increased. Further, at this time, the controller 30 (adjusting process portion 31*d*) may also cause the operating portion 70 or the external device 200 to display a message such that “optimum acquisition could not be made” or “check lifetime of outer secondary transfer roller”. Thus, the controller 30 (adjusting process portion 31*d*) may also carry out control so as to notify to the effect that acquisition of the secondary transfer voltage could not be made properly.

Further, in the case where the use environment of the image forming apparatus 1 is the high temperature/high humidity environment or in the like case, the default recording material part voltage Vp is low (absolute value is small), and therefore, the adjusting value is offset to the negative (−) side, with the result that there is a possibility that the priority of the secondary transfer voltage Vtr becomes negative. Further, in the case where the present adjusting value $N_0$ is extremely small such as −20, the acquisition is made at the present adjusting value $N_0$=about −20, and therefore, the secondary transfer voltage Vtr necessarily becomes low (absolute value necessarily becomes small). In the constitution of this embodiment, the case where the negative (−) secondary transfer voltage Vtr becomes theoretically optimum cannot readily considered, and therefore, in this embodiment, the secondary transfer voltage Vtr is limited to 0 V or more.

In the case where the secondary transfer voltages Vtr for all the adjusting patches 101A to 103A (patch numbers, adjusting values) becomes 0 V, the controller 30 (adjusting process portion 31*d*) is incapable of making the acquisition itself, and therefore, determines the adjusting value as a largest adjusting value ($N_A$=smallest N in chart) in the chart (S6). The reason why the largest adjusting value is determined is that when the acquisition is made again, a possibility of selection of an adjusting value at which the secondary transfer voltage Vtr becomes 0 V or more is increased. Further, at this time, the controller 30 (adjusting process portion 31*d*) may also cause the operating portion 70 or the external device 200 to display a message such that “optimum acquisition could not be made”. In this embodiment, limitation such that the secondary transfer voltage Vtr is 0 V or more is imposed, but another limitation may also be imposed. For example, in the case where a lower-limit numerical value at which the voltage can be stably applied as the secondary transfer voltage exists, the value of the secondary transfer voltage Vtr may be a numerical value other than 0 V.

Further, the recording material part voltage Vp is limited to become the negative recording material part voltage Vp, and the lower limit of the secondary transfer voltage Vtr may be used as the secondary transfer portion part voltage Vb.

The controller 30 (adjusting process portion 31*d*) causes the process to go to a process of S7 in the case where a part or all of the adjusting patches 101A to 103A (patch numbers, adjusting values) are not in the “high-voltage saturation” state.

Incidentally, in this embodiment, in the case where the part of the adjusting patches 101A to 103A is in the “high-voltage saturation” state, the controller 30 (adjusting process portion 31*d*) carries out control so that the adjusting value N does not fall within candidates of the adjusting value of the secondary transfer voltage recommended in a subsequent process. This is because when the secondary transfer portion part voltage Vb fluctuates, secondary transfer of the adjusting patches at the recording material part voltage Vp different from the adjusting value determined in the operation in the adjusting mode is avoided. That is, at the adjusting value N in which the adjusting patches are in the “high-voltage saturation state”, in the case where the use environment or the like is fluctuated, there is a possibility that a proper secondary transfer voltage Vtr cannot be set.

Then, the controller 30 (adjusting process portion 31*d*) discriminates whether or not the current is properly changed (S7). In this embodiment, for this discrimination, the controller 30 (adjusting process portion 31*d*) causes the current detecting sensor 76*b* to acquire the current flowing through the secondary transfer portion N2 when the adjusting patches 101A to 103A pass through the secondary transfer portion N2 during the output of the chart and then causes the RAM 33 to store the current. In this embodiment, this discrimination method is as follows.

I(n): current of n-th adjusting patch

α: coefficient n=1 to 9

$I(N+1) \geq I(n) \times \alpha$

In the above formula, α is roughly a coefficient of about 1. That is, the controller 30 (adjusting process portion 31*d*) checks whether or not a secondary transfer current I(n+1) (absolute value) of an (n+1)-th adjusting value large in secondary transfer voltage Vtr is larger than a secondary transfer current I(n) (absolute value) of an n-th adjusting value by α time(s) or more. In the case where the above-described formula is not satisfied, there is a high possibility that the second transfer currents of the adjusting patches 101A to 103A (patch numbers, adjusting values) are not properly changed. As such a case, the case where an in-plane electric resistance of the recording material S is not uniform, the case where the current flows through members (the feeding (conveying) rollers and the guides) conveying the recording material S in the neighborhood of the secondary transfer member N2 along the recording material S, or the like case would be considered. In such a case, the controller 30 (adjusting process portion) discriminates that it is difficult to make the adjustment itself, and ends the operation in the adjusting mode at a present adjusting value (S8). In this embodiment, α is 1. However, a is not necessarily required to be 1. For example, α can be made more than 1, so that the adjustment may be executed only when the current is changed with reliability. Further, α may also be set at different values for the first side and the second side. Particularly, as regards the first side for which in-plane water content non-uniformity is large depending on the influence of a storage state of the recording material S in some instances, α may be less than 1. Further, in the case where the above-described formula is not satisfied, the controller 30 (adjusting process portion 31*d*) may cause the operating portion 70 to display a message such that "optimum adjustment could not be made" or "there is a possibility that the recording material S cannot be adjusted" or the like. Thus, the controller 30 (adjusting process portion 31*d*) may carry out control so as to notify to the effect that there is a possibility that adjustment of the secondary transfer voltage could not be properly made.

When a targeted change of the current can be configured, the controller (adjusting process portion 31*d*) causes the sensing unit 3 to read the chart, and carries out control so as to calculate brightness and a dispersion of each of the patches 101A to 103A as described later (S9).

The first and second line sensors 91 and 92 of the sensing unit 3 read the charts on each of the first side and the second side at a resolution of "300 dpi". Incidentally, information of the images read by the first and second line sensors 91 and 92 of the sensing unit 3 is stored in the RAM 33. Then, on the basis of positions of the trigger patches 101T to 103T of the chart, the controller 30 (adjusting process portion 31*d*) calculates positions of the adjusting patches 101A to 103A in the following manner. FIG. 15 is a schematic view for illustrating an example of a method in which the positions of the trigger patches 101T to 103T are identified from an image 110 read by the first-and second-line sensors 91 and 92. The L chart 100L (2) is used as an example. First, with respect to the feeding direction of the recording material S passing through an inside of the sensing unit 3, a line 112 positioned at a margin portion between an edge 111 of the adjusting chart and the trigger patches 101T to 103T is set from a roughly positional relationship. Then, the average brightness value of the line 112 is read from information of the read chart. At this time, when the average brightness value is smaller than a preset threshold (when the density is larger than a predetermined value), the controller 30 discriminates that an edge line of the trigger patches 101T to 103T exists. When this edge (line) discrimination is not made, this discrimination is repeated every (one) line toward an upstream side of the feeding direction of the recording material S passing through the inside of the sensing unit 3, and the controller 30 finds out an edge line 113. Then, with respect to the widthwise direction, a line 114 positioned at a margin portion between the edge 111 of the chart (recording material S) and the trigger patches 103T is set from a roughly positional relationship. Then, average brightness value of the line 114 is read from information of the read chart. At this time, when the average brightness value is smaller than a preset threshold, the controller 30 discriminates that an edge line of the trigger patches 103T exists. When this edge (line) discrimination is not made, this discrimination is repeated every line toward a right-hand side of the widthwise direction in FIG. 15, and the controller 30 finds out an edge line 115. The right-hand side of the widthwise direction in FIG. 15 is the right-hand side in the case where sides of the recording material S on the first and second line sensors 91 and 92 are viewed in a state in which a leading end side of the recording material S with respect to the feeding direction when the recording material S passes through the inside of the sensing unit 3 is an upper side. Incidentally, with respect to the widthwise direction, similar edge detection is also made between the trigger patches 103T and 102T and between the trigger patches 102T and 101T. By the above-described edge detecting method, it becomes possible to detect positions of the trigger patches 101T to 103T in the image 110. Incidentally, the above-described edge detecting method is an example, and the edge detecting method in the present invention is not limited to the method described above. For example, a method different from the method in this embodiment may be used depending on a design of the chart.

When the positions of the adjusting patches 101A to 103A can be identified, the controller 30 (adjusting process portion 31*d*) calculates the average brightness value and a dispersion value and stores these values in the RAM 33. That is, as regards the n-th patch, the average brightness value $B_{ave}$ and the dispersion value D(n) calculated by the following formulas are stored in the RAM 33.

$$B_{ave}(n) = \frac{1}{M} \times \sum_{m=1}^{M} B(m)$$

$$D(n) = \frac{1}{M} \times \sum_{m=1}^{M} (B(m) - B_{ave}(n))^2$$

In the above formulas, B(m) represents brightness of a m-th read pixel, M represents a total number of read pixels, and m is 1 to M (M pixels are read at this time).

In this embodiment, B(m) is detected as signal values from the low brightness 0 to high brightness 255. The average brightness value (brightness average value) is a parameter reflecting the density (i.e., correlating with the density) (density is higher with lower brightness). Further, by study of the present inventor, it turns out that the dispersion value is a parameter sensitive to a transfer property in the case where the recording material S is uneven. In this embodiment, as regards both the average brightness value and the dispersion value, a transfer property is better with a smaller value. In this embodiment, by principally using the average brightness value, a method of acquiring a recommended adjusting amount ΔV (specifically, a corresponding adjusting value N) of the set voltage (value) of the secondary transfer voltage will be described, but as described later, the dispersion value may also be used. Incidentally, in the case where either one of the average brightness value and the dispersion value is used, as regards the value which is not used, calculation is not required to be performed.

In this embodiment, as the brightness to be read from the information of the image read by the sensing unit 3, B (blue) brightness is used for the solid B patches 101, and G (green) brightness is used for the solid Bk patches 102 and the BkHT patches 103. Incidentally, whether which of brightness values of RGB may be different from the above brightness values, an average of these three brightness values or brightness of gray scale which is not color-separated into RGB may be used.

Further, when the dispersion value is calculated, there is a need that brightness per read pixel is temporarily stored, but this leads to a high load on the controller 30 and a long time of the operation in the adjustment mode in some instances. In such a case, the brightness values from "0 to 255" are divided into some sections and a frequency per pixel is counted, and then the dispersion value may be calculated from a digital histogram. The number of divisions of the brightness values and whether to employ which interval can be changed depending on a characteristic of the first and second line sensors 91 and 92 or throughput of the controller 30. Further, the brightness histogram is also different depending on the paper kind category, so that these factors may also be changed depending on the paper kind category.

Next, the controller 30 (adjusting process portion 31*d*) carries out a process for selecting patches (patch numbers, adjusting values) with a good transfer property by using the calculated average brightness value or the calculated dispersion value (particularly, the average brightness value in this embodiment). In this embodiment, at this time, the controller 30 (adjusting process portion 31*d*) makes reference to an input result through the priority image selecting portion 708*b* stored in the RAM 33 (S10). In this embodiment, specifically whether or not a half-tone priority mode is selected in S10 is discriminated.

That is, as described above, in general, a secondary transfer voltage larger in absolute value is needed with a higher density of the toner image to be transferred. However, for example, in the case where the recording material S for which the transfer property is severe, it is difficult to satisfactorily transfer images from half-tone images to solid images by a single secondary transfer voltage in some instances. As an example of the recording material S for which the transfer property is severe, it is possible to cite embossed paper large in surface unevenness compared with plain paper or the like. In the case of the embossed paper, in the secondary transfer portion N2, due to surface recesses of the paper, a gap is liable to generate between the secondary transfer belt 44*b* and the surface of the paper, so that an image density is liable to become thin (low) by the influence of electric discharge in this gap in the case where the secondary transfer voltage is high (in the case where the absolute value is high). This influence becomes conspicuous in some instances in the half-tone image smaller in toner application amount than in the solid image. For that reason, for example, in the case where the half-tone image is outputted using such a recording material S many times or in the like case, when the secondary transfer voltage is adjusted so that the transfer property of the solid image becomes good, there is a possibility that a desirable result cannot be obtained. Therefore, in this embodiment, the adjustment is performed depending on a priority image selected by the priority image selecting portion 708*b*.

In the case where the "half-tone (image)" is selected by the priority image selecting portion 708*b*, the controller 30 (adjusting process portion 31*d*) makes adjustment as an operation in the "half-tone priority mode", and selects an adjusting value at which the transfer property of a half-tone toner image becomes optimum. Further, in the case where the "solid image" is selected by the priority image selecting portion 708*b*, the controller 30 (adjusting process portion 31*d*) makes adjustment as an operation in a "solid image priority mode", and selects an adjusting value at which the transfer property of the toner image with a thick (high) density such as the solid image becomes optimum. Incidentally, in the following description of a process for selecting patches good in transfer property, the B solid patches 101, the Bk solid patches 102, and the BkHT patches 103 are the adjusting patches 101A, 102A, and 103A, respectively.

The half-tone priority mode will be described. Parts (a) to (c) of FIG. 16 are graphs for illustrating a patch with a good transfer property in the operation in the half-tone priority mode. Part (a) of FIG. 16 shows an example of an acquisition result of an average brightness value for each of patch numbers of the BkHT patches 103. Part (b) of FIG. 16 shows an example of an acquisition result of an average brightness value for each of patch numbers of the Bk solid patches 102. Part (c) of FIG. 16 shows an example of an acquisition result of an average brightness value for each of patch numbers of the B solid patches 101. In the operation in the half-tone priority mode, the controller 30 (adjusting process portion 31*d*) first performs narrowing of the adjusting value by the BkHT patches 103 (S11), as shown in part (a) of FIG. 16, in S11, narrowing to patch numbers which are not more than a value (threshold L1) obtained by multiplying a lowest (smallest) average brightness value by 1.2 is performed. In an example shown in part (a) of FIG. 16, the narrowing to the patch numbers 1 to 5 is performed. That is, in this embodiment, a transfer voltage setting condition set by the operation in the half-tone priority mode is a setting condition in which the transfer property of the half-tone toner image becomes optimum. That is, the transfer voltage setting condition set by the operation in the half-tone priority mode contains a condition in which the BkHT patch 103 is capable of being transferred at an image density which is a first density or more (the threshold L1 or less in terms of the brightness value). Then, the controller 30 (adjusting process portion 31*d*) performs narrowing of the adjusting value by the Bk solid patches 102 (S12). As shown in part (b) of FIG. 16, in this embodiment, in S12, narrowing to patch numbers which are not more than a value (threshold L2) obtained by multiplying a lowest average brightness value of the patch numbers, obtained in S11 by the above-described narrowing, by 1.2 is performed. In an example shown in part (b) of FIG. 16, the narrowing to the patch numbers 3 to 5 from the patch numbers 1 to 5 obtained by the above-described narrowing in S1 is performed. Finally, the controller (adjusting process portion 31*d*) performs narrowing of the adjusting value by the B solid patches 101 (S13). As shown in part (c) of FIG. 16, in this embodiment, in S13, the patch number lowest in average brightness value is selected from the patch numbers obtained by the above-described narrowing processes in S11 and S12. In an example shown in part (c) of FIG. 16, the patch number 5 is selected from the patch numbers 3 to 5 obtained by the above-described narrowing processes in S11 and S12. Then, the controller 30 (adjusting process portion 31*d*) determines an adjusting value corresponding to this patch number 5($n_A$) as a recommended adjusting value ($N_A$) good in transfer property in the operation in the half-tone priority mode (S16).

The solid image priority mode will be described. Parts (a) to (c) of FIG. 17 are graphs for illustrating a patch with a good transfer property in the operation in the solid image priority mode. Part (a) of FIG. 17 shows an example of an acquisition result of an average brightness value for each of patch numbers of the BkHT patches 103. Part (b) of FIG. 17 shows an example of an acquisition result of an average brightness value for each of patch numbers of the Bk solid patches 102. Part (c) of FIG. 17 shows an example of an acquisition result of an average brightness value for each of patch numbers of the B solid patches 101.

Average brightness values shown in parts (a) to (c) of FIG. 17 are the same as those shown in parts (a) to (c) of FIG. 16, respectively. In the operation in the solid image priority mode, the controller 30 (adjusting process portion 31*d*) does not perform narrowing of the adjusting value by the BkHT patches 103 but performs narrowing of the adjusting value by the Bk solid patches 102 (S14). That is, in this embodiment, a transfer voltage setting condition set by the operation in the solid image priority mode is a setting condition in which the transfer property of the toner image with a higher density than in the operation in the half-tone priority mode is capable of being set optimally. That is, the transfer voltage setting condition set by the operation in the solid image priority mode contains a condition in which the BkHT patch 103 is permitted to be transferred onto the recording material at the image density which is the first density or more (the threshold L1 or less in terms of the brightness value). As shown in part (b) of FIG. 17, in S14, narrowing to patch numbers which are not more than a value (threshold L2) obtained by multiplying a lowest (smallest) average brightness value by 1.2 is performed. In an example shown in part (b) of FIG. 17, the narrowing to the patch numbers 3 to 8 is performed. Then, the controller 30 (adjusting process portion 31*d*) performs narrowing of the adjusting value by the B solid patches 101 (S15). As shown in part (c) of FIG. 17, in this embodiment, in S15, the patch number lowest in average brightness value is selected from the patch numbers obtained by the above-described narrowing process in S14. In an example shown in part (c) of FIG. 17, the patch number 8 is selected from the patch numbers 3 to 8 obtained by the above-described narrowing process in S14. Then, the controller 30 (adjusting process portion 31*d*) determines an adjusting value corresponding to this patch number 5(nA) as a recommended adjusting value (NA) good in transfer property in the operation in the solid image priority mode (S16).

Thus, between the operation in the half-tone priority mode and the operation in the solid image priority mode, the selected adjusting values $N_A$ are different from each other. This is a difference as to whether or not the narrowing by the BkHT patches 103 is performed, and in the operation in the half-tone priority mode in which this narrowing is performed, it is possible to select the adjusting value low in secondary transfer voltage (small in absolute value).

Incidentally, in either of the narrowing by the BkHT patches 103 and the narrowing by the Bk solid patches 102, the values of the coefficients are not limited to the above-described numerical values, and the narrowing methods are also not limited to the above-described methods. For example, a method in which a brightness tolerance is stored in the ROM 32 in advance and a method in which patch numbers in a certain number are extracted in an ascending order of the average brightness values would be considered. Further, in this embodiment, the discrimination of the transfer property was made by the average brightness value but may also be made by the dispersion value. The discrimination of the transfer property may also be made by using both the average brightness value and the dispersion value. The dispersion value is effective in detecting density non-uniformity within the patches. For example, in the narrowing of the adjusting values by the solid patches, it is possible to cite execution of the narrowing using the dispersion value (such that the patch number with a smallest dispersion value is selected) in addition to execution of the narrowing by the average brightness value (such that the patch numbers in a certain number are extracted in an ascending order of the average brightness values). Further, depending on conditions of the image forming apparatus 1 and the recording material S during the adjustment, it is possible that there is no difference in acquisition result by the priority image.

The controller 30 (adjusting process portion 31*d*) causes the display portion 70*a* of the operating portion 70 to display the adjusting value $N_A$ selected as described above at the adjusting value display portion 707 of the secondary transfer voltage adjusting screen 706 as shown in FIG. 11 (S17). The operator discriminates whether or not the display contents of the secondary transfer voltage adjusting screen 706 are appropriate, and operates a confirmation portion 710 (OK button 710*a*, application button 710*b*) in the case where the displayed adjusting value $N_A$ is not changed. On the other hand, the operator inputs a desired value to the adjusting value display portion 707 by operating numeric keys (not shown) of the operating portion 70 in the case where the operator desires that the adjusting value is changed from the displayed adjusting value $N_A$, and then operates the finalizing portion 710 (OK button 710*a*, application button 710*b*). In the case where the adjusting values are changed, the controller 30 (adjustment process portion 31*d*) causes the RAM 33 (or the secondary transfer voltage storage/operation portion 31*f*) to store the adjusting values inputted by the operator (S18). The operator can discriminate whether or not display contents of the secondary transfer voltage adjusting screen 706 are appropriate, by checking the outputted chart by eyes or the like. On the other hand, in the case where the adjusting values are not changed and the confirmation portion 710 is operated, the controller 30 causes the RAM 33 (or the secondary transfer voltage storage/operation portion 31*f*) to store the determined adjusting value as it is (S18). The operation in the adjustment mode is thus ended.

Thus, in this embodiment, the image forming apparatus 1 includes the image bearing member 44*b* for bearing the toner image, the transfer means 45*b* for transferring the toner image from the image bearing member 44*b* onto the recording material S in the transfer portion N2, the applying means 76 for applying the transfer voltage to the transfer means 45*b*, the executing portion (the adjusting process portion 31*d* of the controller 30 in this embodiment) for carrying out the control so as to execute the operation in the output mode in which the chart 100 formed by transferring the plurality of test images onto the recording material S under application of different transfer voltages is outputted, the acquiring portion 3 for acquiring the density information on the density of the test images on the recording material S, the setting portion (the adjusting process portion 31*d* or the secondary transfer voltage storage/operation portion 31*f* of the controller 30 in this embodiment) for setting the transfer voltage on the basis of the density information acquired by the acquiring portion 3, and the inputting portion (the operating portion or the receiving portion in this embodiment) for inputting the instruction information. The executing portion 31*d* is capable of carrying out control not only so that the plurality of first test images of which density on the image bearing member is the first density are transferred onto the recording material S but also so that the plurality of second test images of which density on the image bearing member is the second density higher than the above-described first density are transferred onto the recording material S. The setting portion 30 is capable of setting, depending on the instruction information inputted by the inputting portion 70, the first transfer voltage by using at least the density information of the first test images of the first and second test images (half-tone priority) or the second transfer voltage by using at least the density information of the second test images of the first and second test images without using the density information of the first test images (solid image priority).

In this embodiment, the setting portion 30 sets the first transfer voltage by using pieces of the density information of the first test images and the second test images. Specifically, in this embodiment, the setting portion 30 sets the first transfer voltage on the basis of information on the transfer voltage when the first test image, of the plurality of first test images, of which density information satisfies the predetermined condition is transferred onto the recording material S and on the transfer voltage when the second test image, of the plurality of second test images, of which density information satisfies the predetermined condition is transferred onto the recording material S. In this embodiment, the absolute value of the second transfer voltage is not less than the absolute value of the first transfer voltage. Further, in this embodiment, the setting portion 30 sets the second transfer voltage on the basis of information on the transfer voltage when the second test image, of the plurality of second test images, of which density information satisfies the predetermined condition is transferred onto the recording material S. Further, in this embodiment, the executing portion 31*d* carries out control so that the chart 100 formed by transferring the first test images and the second test images onto the recording material S is outputted. Incidentally, the executing portion 31*d* may be capable of carrying out, depending on the instruction information (inputted by the inputting portion 70), control so as to execute the operation in the first output mode in which the chart 100 formed by transferring only the first test images of the first and second test images is outputted or so as to execute the operation in the second output mode in which the chart 100 formed by transferring only the second test images of the first and second test images is outputted. Further, in this embodiment, the first test images are the half-tone images, and the second test images are the solid images.

Further, in this embodiment, the acquiring portion 3 acquires the density information of the test images on the recording material S when the recording material S on which the chart is formed is discharged from the image forming apparatus 1.

As described above, according to this embodiment, in the operation in the adjusting mode, the priority image (half-tone priority image, solid image priority image) selected by the user can be reflected in the adjusting value. Accordingly, according to this embodiment, it is possible to appropriately adjust the secondary transfer voltage for the priority image selected by the user.

Embodiment 2

Next, another Embodiment (Embodiment 2) of the present invention will be described. Basic structure and operation of an image forming apparatus of this embodiment are the same as those of the image forming apparatus of the embodiment 1. Accordingly, in the image forming apparatus of this embodiment, elements identical or corresponding to those of the image forming apparatus of the embodiment 1 are represented by the same reference numerals or symbols and will be omitted from detailed description.

The operation in the adjusting mode in this embodiment will be described. FIG. 18 is a flow chart showing an outline of a procedure of the operation in the adjusting mode in this embodiment. In FIG. 18, processes similar to the processes in the operation in the adjusting mode in the embodiment 1 are represented by the same step numbers or symbols as those in FIG. 8 and will be appropriately omitted from detailed description. In the embodiment 1, choices of the priority image are two levels, but in this embodiment, the choices of the priority image are three levels.

FIG. 19 is a schematic view of a secondary transfer voltage adjusting screen 706 displayed at the display portion 70*a* of the operating portion 70 by control of the controller 30 (adjusting process portion 31*d*) in S1 in this embodiment.

In this embodiment, the secondary transfer voltage adjusting screen 706 includes a priority image selecting portion 708*c* for selecting the density of the image intended to be optimized by the user in the operation in the adjusting mode, which is different from the priority image selecting portion 708*b* in the embodiment 1. In this embodiment, the priority image selecting portion 708*c* is capable of selecting a priority image from three images consisting of a “low-density half-tone image”, a “high-density half-tone image” and a “solid image”. The contents inputted in the determination of the adjusting condition (S1) are stored in the RAM 33, and are reflected in a subsequent process.

The low-density half-tone priority mode will be described. Parts (a) to (c) of FIG. 20 are graphs for illustrating a patch with a good transfer property in the operation in the low-density half-tone priority mode. Part (a) of FIG. 20 shows an example of an acquisition result of an average brightness value for each of patch numbers of the BkHT patches 103. Part (b) of FIG. 20 shows an example of an acquisition result of an average brightness value for each of patch numbers of the Bk solid patches 102. Part (c) of FIG. 20 shows an example of an acquisition result of an average brightness value for each of patch numbers of the B solid patches 101. In the operation in the low-density half-tone priority mode, the controller 30 (adjusting process portion 31*d*) first performs narrowing of the adjusting value by the BkHT patches 103 (S21), as shown in part (a) of FIG. 20, in this embodiment, in S21, narrowing to patch numbers which are not more than a value (threshold L3) obtained by multiplying a lowest (smallest) average brightness value by 1.1 is performed. In an example shown in part (a) of FIG. 20, the narrowing to the patch numbers 1 to 4 is performed. Then, the controller 30 (adjusting process portion 31*d*) performs narrowing of the adjusting value by the Bk solid patches 102 (S22). As shown in part (b) of FIG. 20, in this embodiment, in S22, narrowing to patch numbers which are not more than a value (threshold L4) obtained by multiplying a lowest average brightness value of the patch numbers, obtained in S21 by the above-described narrowing, by 1.2 is performed. In an example shown in part (b) of FIG. 20, the narrowing to the patch numbers 3 and 4 from the patch numbers 1 to 4 obtained by the above-described narrowing in S21 is performed. Finally, the controller 30 (adjusting process portion 31*d*) performs narrowing of the adjusting value by the B solid patches 101 (S23). As shown in part (c) of FIG. 20, in this embodiment, in S23, the patch number lowest in average brightness value is selected from the patch numbers obtained by the above-described narrowing processes in S21 and S22. In an example shown in part (c) of FIG. 20, the patch number 4 is selected from the patch numbers 3 and 4 obtained by the above-described narrowing processes in S21 and S22. Then, the controller 30 (adjusting process portion 31*d*) determines an adjusting value corresponding to this patch number 4($n_A$) as a recommended adjusting value ($N_A$) good in transfer property in the operation in the low-density half-tone priority mode (S16).

The high-density half-tone priority mode will be described. Parts (a) to (c) of FIG. 21 are graphs for illustrating a patch with a good transfer property in the operation in the high-density half-tone priority mode. Part (a) of FIG. 21 shows an example of an acquisition result of an average brightness value for each of patch numbers of the BkHT patches 103. Part (b) of FIG. 21 shows an example of an acquisition result of an average brightness value for each of patch numbers of the Bk solid patches 102. Part (c) of FIG. 21 shows an example of an acquisition result of an average brightness value for each of patch numbers of the B solid patches 101. Average brightness values themselves shown in parts (a) to (c) of FIG. 21 are the same as those shown in parts (a) to (c) of FIG. 20, respectively. Also, in the operation in the high-density half-tone priority mode, the controller 30 (adjusting process portion 31*d*) first performs narrowing of the adjusting value by the BkHT patches 103 (S24), as shown in part (a) of FIG. 21, in S24, narrowing to patch numbers which are not more than a value (threshold L3') obtained by multiplying a lowest (smallest) average brightness value by 1.2 is performed. Thus, the coefficient in the narrowing by the BkHT patches 103 in the operation in the high-density half-tone priority mode is different from the coefficient in the narrowing by the BkHT patches 103 in the operation in the low-density half-tone priority mode. The coefficient in the operation in the high-density half-tone priority mode is larger than the coefficient in the operation in the low-density half-tone priority mode. That is, the adjusting values are gently narrowed by the narrowing with the BkHT patches 103 in the operation in the high-density half-tone priority mode than by the narrowing with the BkHT patches 103 in the operation in the low-density half-tone priority mode. In an example shown in part (a) of FIG. 21, the narrowing to the patch numbers 1 to 5 is performed. Then, the controller 30 (adjusting process portion 31*d*) performs narrowing of the adjusting value by the Bk solid patches 102 (S25). As shown in part (b) of FIG. 21, in this embodiment, in S25, narrowing to patch numbers which are not more than a value (threshold L2) obtained by multiplying a lowest average brightness value of the patch numbers, obtained in S24 by the above-described narrowing, by 1.2 is performed. In an example shown in part (b) of FIG. 21, the narrowing to the patch numbers 3 to 5 from the patch numbers 1 to 5 obtained by the above-described narrowing in S24 is performed. Finally, the controller 30 (adjusting process portion 31*d*) performs narrowing of the adjusting value by the B solid patches 101 (S26). As shown in part (c) of FIG. 21, in this embodiment, in S26, the patch number lowest in average brightness value is selected from the patch numbers obtained by the above-described narrowing processes in S24 and S25. In an example shown in part (c) of FIG. 21, the patch number 5 is selected from the patch numbers 3 to 5 obtained by the above-described narrowing processes in S24 and S25. Then, the controller 30 (adjusting process portion 31*d*) determines an adjusting value corresponding to this patch number 5($n_A$) as a recommended adjusting value ($N_A$) good in transfer property in the operation in the high-density half-tone priority mode (S16).

The solid image priority mode will be described. Parts (a) to (c) of FIG. 22 are graphs for illustrating a patch with a good transfer property in the operation in the solid image priority mode. Part (a) of FIG. 22 shows an example of an acquisition result of an average brightness value for each of patch numbers of the BkHT patches 103. Part (b) of FIG. 22 shows an example of an acquisition result of an average brightness value for each of patch numbers of the Bk solid patches 102. Part (c) of FIG. 22 shows an example of an acquisition result of an average brightness value for each of patch numbers of the B solid patches 101. Average brightness values shown in parts (a) to (c) of FIG. 22 are the same as those shown in parts (a) to (c) of FIG. 20, respectively. In the operation in the solid image priority mode, the controller 30 (adjusting process portion 31*d*) does not perform narrowing of the adjusting value by the BkHT patches 103 but performs narrowing of the adjusting value by the Bk solid patches 102 (S27). As shown in part (b) of FIG. 22, in S27, narrowing to patch numbers which are not more than a value (threshold L4) obtained by multiplying a lowest (smallest) average brightness value by 1.2 is performed. In an example shown in part (b) of FIG. 22, the narrowing to the patch numbers 3 to 8 is performed. Then, the controller 30 (adjusting process portion 31*d*) performs narrowing of the adjusting value by the B solid patches 101 (S28). As shown in part (c) of FIG. 22, in this embodiment, in S28, the patch number lowest in average brightness value is selected from the patch numbers obtained by the above-described narrowing process in S27. In an example shown in part (c) of FIG. 22, the patch number 8 is selected from the patch numbers 3 to 8 obtained by the above-described narrowing process in S27. Then, the controller 30 (adjusting process portion 31*d*) determines an adjusting value corresponding to this patch number 5($n_A$) as a recommended adjusting value ($N_A$) good in transfer property in the operation in the solid image priority mode (S16).

Thus, between the operation in the low-density half-tone priority mode, the operation in the high-density half-tone priority mode, and the operation in the solid image priority mode, the selected adjusting values $N_A$ are different from each other. This is a difference as to whether or not the narrowing by the BkHT patches 103 is performed or a difference in degree of the narrowing, and in the operation in the low-density half-tone priority mode, it is possible to select the adjusting value low in secondary transfer voltage (small in absolute value).

Incidentally, in either of the narrowing by the BkHT patches 103 and the narrowing by the Bk solid patches 102, the values of the coefficients are not limited to the above-described numerical values, and the narrowing methods are also not limited to the above-described methods. For example, a method in which a brightness tolerance is stored in the ROM 32 in advance and a method in which patch numbers in a certain number are extracted in an ascending order of the average brightness values would be considered. Further, adjusting values between the low-density half-tone priority mode and the solid image priority mode may be used for the high-density half-tone priority mode. Further, in this embodiment, the discrimination of the transfer property was made by the average brightness value, but may also be made by the dispersion value. The discrimination of the transfer property may also be made by using both the average brightness value and the dispersion value. Further, depending on conditions of the image forming apparatus 1 and the recording material S during the adjustment, it is possible that there is no difference in acquisition result by the priority image.

Thus, in this embodiment, depending on the instruction information inputted by the inputting portion 70, the setting portion 30 is capable of setting a first transfer voltage by using density information of the first test images of the first and second test images (low-density half-tone priority), setting a second transfer voltage by using density information of the first test images of the first and second test images (solid image priority), and setting a third transfer voltage by using density information of the first test images of the first and second test images (high-density half-tone priority). In this embodiment, the setting portion is constituted so as to set the first transfer voltage and the third transfer voltage by using density information of the first test images and the second test images. The setting portion 30 sets the first transfer voltage on the basis of information on the transfer voltage when the first test image, of the plurality of first test images, of which density information satisfies a predetermined first condition is transferred onto the recording material S and on the transfer voltage when the second test image, of the plurality of second test images, of which density information satisfies a predetermined condition is transferred onto the recording material S. The setting portion 30 sets the third transfer voltage on the basis of information on the transfer voltage when the first test image, of the plurality of first test images, of which density information satisfies a predetermined second condition different from the predetermined first condition is transferred onto the recording material S and on the transfer voltage when the second test image, of the plurality of second test images, of which density information satisfies a predetermined condition is transferred onto the recording material S. In this embodiment, an absolute value of the third transfer voltage is not less than an absolute value of the first transfer voltage, and an absolute value of the second transfer voltage is not less than the absolute value of the third transfer voltage.

As described above, according to this embodiment, in the operation in the adjusting mode, the priority image (low-density half-tone priority image, high-density half-tone priority image, solid image priority image) selected by the user can be reflected in the adjusting value. Accordingly, according to this embodiment, it becomes possible to appropriately adjust the secondary transfer voltage for the priority image selected by the user.

Embodiment 3

Next, another Embodiment (Embodiment 3) of the present invention will be described. Basic structure and operation of an image forming apparatus of this embodiment are the same as those of the image forming apparatus of the embodiment 1. Accordingly, in the image forming apparatus of this embodiment, elements identical or corresponding to those of the image forming apparatus of the embodiment 1 are represented by the same reference numerals or symbols and will be omitted from detailed description.

The operation in the adjusting mode in this embodiment will be described. FIG. 23 is a flow chart showing an outline of a procedure of the operation in the adjusting mode in this embodiment. In FIG. 23, processes similar to the processes in the operation in the adjusting mode in the embodiment 1 are represented by the same step numbers or symbols as those in FIG. 8 and will be appropriately omitted from detailed description. In the embodiment 1, the chart formed in the operation in the adjusting mode was the same irrespective of the priority image, but in this embodiment, the chart formed in the operation in the adjusting mode is changed depending on the priority image.

FIG. 24 is a schematic view of a secondary transfer voltage adjusting screen 706 displayed at the display portion 70*a* of the operating portion 70 by control of the controller 30 (adjusting process portion 31*d*) in S1 in this embodiment.

In this embodiment, the secondary transfer voltage adjusting screen 706 includes a priority image selecting portion 708*c* for selecting the density of the image intended to be optimized by the user in the operation in the adjusting mode, which is different from the priority image selecting portion 708*b* in the embodiment 1. In this embodiment, the priority image selecting portion 708*c* is capable of selecting a priority image from two images consisting of a "low-density image" and a "high-density image". The contents inputted in the determination of the adjusting condition (S1) are stored in the RAM 33, and are reflected in a subsequent process.

In this embodiment, the controller 30 (adjusting process portion 31*d*) first makes reference to the input result of the priority image selecting portion 708*d* after the ATVC (S3) is carried out (S31). In this embodiment, specifically, in S31, whether or not the low-density priority mode is selected is discriminated. The controller 30 (adjusting process portion 31*d*) performs the adjustment as the operation in the "low-density priority mode" in the case where the "low-density image" is selected by the priority image selecting portion 708*b* and performs the adjustment as the operation in the "high-density priority mode" in the case where the "high-density image" is selected by the priority image selecting portion 708*b*. In this embodiment, the controller 30 (adjusting process portion 31*d*) changes the density of the BkHT patches 103 depending on the priority image (532, S33).

That is, in this embodiment, the controller 30 (adjusting process portion 31*d*) sets the density of the BkHT patches 103 at a thin (low) half-tone level in the operation in the "low-density priority mode" (S32). In this embodiment, in the case where the output of the exposure device 42 during the non-image formation is 0 and the output of the exposure device 42 during the image formation of the Bk solid patches 102 is 255, the output of the exposure device 42 during the image formation of the BkHT patches 103 was 96. On the other hand, the controller 30 (adjusting process portion 31*d*) sets the density of the BkHT patches 103 at a thick (high) half-tone level in the operation in the "high-density priority mode" (S33). In this embodiment, in the above-described output condition, the output of the exposure device 42 during the image formation of the BkHT patches 103 in the operation in the "high-density priority mode" was 192. The controller 30 (adjusting process portion 31*d*) sets the density of the BkHT patches 103 depending on the priority and then outputs the chart as described above (S4). Arrangement of the patches on the chart is similar to the arrangement in the embodiment 1. Further, the processes S5 to S9 are similar to those in the embodiment 1.

After S9, the controller 30 (adjusting process portion 31*d*) performs a process for selecting a patch with a good transfer property. In this embodiment, the narrowing condition of the adjusting values with the BkHT patches 103 is not changed depending on the priority image. That is, check of the transfer property by the BkHT patches 103 (S34), check of the transfer property by the Bk solid patches (S25), check of the transfer property by the B solid patches (S36), and determination of the adjusting value $N_A$ (S16) are similarly executed irrespective of the priority image. In this embodiment, the density itself of the BkHT patches 103 is different depending on the priority image, and therefore, even when the narrowing condition is not changed as described above, there arises a difference in narrowing result.

An adjustment example of the operation in the low-density priority mode will be described. Parts (a) to (c) of FIG. 25 are graphs for illustrating a patch with a good transfer property in the operation in the low-density priority mode. Part (a) of FIG. 25 shows an example of an acquisition result of an average brightness value for each of patch numbers of the BkHT patches 103. Part (b) of FIG. 25 shows an example of an acquisition result of an average brightness value for each of patch numbers of the Bk solid patches 102. Part (c) of FIG. 25 shows an example of an acquisition result of an average brightness value for each of patch numbers of the B solid patches 101. The controller 30 (adjusting process portion 31*d*) first performs narrowing of the adjusting value by the BkHT patches 103 (S34). As shown in part (a) of FIG. 25, in this embodiment, in S35, narrowing to patch numbers which are not more than a value (threshold L5) obtained by multiplying a lowest average brightness value by 1.2 is performed. In an example shown in part (a) of FIG. 25, the narrowing to the patch numbers 1 to 4 is performed. Then, the controller 30 (adjusting process portion 31*d*) performs narrowing of the adjusting value by the Bk solid patches 102 (S35). As shown in part (b) of FIG. 25, in this embodiment, in S35, narrowing to patch numbers which are not more than a value (threshold L6) obtained by multiplying a lowest average brightness value of the patch numbers, obtained in S34 by the above-described narrowing, by 1.2 is performed. In an example shown in part (b) of FIG. 25, the narrowing to the patch numbers 3 and 4 from the patch numbers 1 to 4 obtained by the above-described narrowing in S34 is performed. Finally, the controller 30 (adjusting process portion 31*d*) performs narrowing of the adjusting value by the B solid patches 101 (S36). As shown in part (c) of FIG. 25, in this embodiment, in S36, the patch number lowest in average brightness value is selected from the patch numbers obtained by the above-described narrowing processes in S34 and S35. In an example shown in part (c) of FIG. 25, the patch number 4 is selected from the patch numbers 3 and 4 obtained by the above-described narrowing processes in S34 and S35. Then, the controller 30 (adjusting process portion 31*d*) determines an adjusting value corresponding to this patch number 4($n_A$) as a recommended adjusting value ($N_A$) good in transfer property in the operation in the low-density priority mode (S16).

An adjustment example in the operation in the high-density priority mode will be described. Parts (a) to (c) of FIG. 26 are graphs for illustrating a patch with a good transfer property in the operation in the high-density priority mode. Part (a) of FIG. 26 shows an example of an acquisition result of an average brightness value for each of patch numbers of the BkHT patches 103. Part (b) of FIG. 26 shows an example of an acquisition result of an average brightness value for each of patch numbers of the Bk solid patches 102. Part (c) of FIG. 26 shows an example of an acquisition result of an average brightness value for each of patch numbers of the B solid patches 101. When the average brightness value of the BkHT patches 103 in the operation in the high-density priority mode shown in part (a) of FIG. 26 is compared with the average brightness value of the BkHT patches 103 in the operation in the low-density priority mode shown in part (a) of FIG. 25, the patch number low in brightness (good in transfer property, high in density) is moved to a high-voltage side. As shown in part (a) of FIG. 26, in this embodiment, in S34, narrowing to patch numbers which are not more than a value (threshold L5') obtained by multiplying a lowest (smallest) average brightness value by 1.2 is performed. In an example shown in part (a) of FIG. 26, the narrowing to the patch numbers 1 to 6 is performed. Then, the controller 30 (adjusting process portion 31*d*) performs narrowing of the adjusting value by the Bk solid patches 102 (S35). As shown in part (b) of FIG. 26, in this embodiment, in S35, narrowing to patch numbers which are not more than a value (threshold L6) obtained by multiplying a lowest average brightness value of the patch numbers, obtained in S34 by the above-described narrowing, by 1.2 is performed. In an example shown in part (b) of FIG. 26, the narrowing to the patch numbers 3 to 6 from the patch numbers 1 to 6 obtained by the above-described narrowing in S34 is performed. Finally, the controller 30 (adjusting process portion 31*d*) performs narrowing of the adjusting value by the B solid patches 101 (S36). As shown in part (c) of FIG. 26, in this embodiment, in S36 the patch number lowest in average brightness value is selected from the patch numbers obtained by the above-described narrowing processes in S34 and S35. In an example shown in part (c) of FIG. 21, the patch number 6 is selected from the patch numbers 3 to 6 obtained by the above-described narrowing processes in S34 and S35. Then, the controller 30 (adjusting process portion 31*d*) determines an adjusting absolute value corresponding to this patch number 6 ($n_A$) as a recommended adjusting value ($N_A$) good in transfer property in the operation in the high-density priority mode (S16).

Thus, between the operation in the low-density half-tone priority mode, the operation in the high-density half-tone priority mode, and the operation in the solid image priority mode, the selected adjusting values $N_A$ are different from each other. This is a difference in density of the BkHT patches 103 used for the adjustment, and in the operation in the low-density priority mode, it is possible to select the adjusting value low in secondary transfer voltage (small in absolute value).

Incidentally, the density of the BkHT patches 103 is not limited to the above-described numerical values. For example, the user may directly designate the BkHT patch density, or the BkHT patch density may be made changeable depending on the image actually outputted from the image forming apparatus by the user. Such a change can be made from, for example, the operating portion 70 or the external device 200. Further, in this embodiment, the discrimination of the transfer property was made by the average brightness value but may also be made by the dispersion value. The discrimination of the transfer property may also be made by using both the average brightness value and the dispersion value. Further, depending on conditions of the image forming apparatus 1 and the recording material S during the adjustment, it is possible that there is no difference in acquisition result by the priority image.

Thus, in this embodiment, the executing portion 31*d* is capable of carrying out control so that in addition to the above-described first and second test images, the plurality of third test images of which third density is higher on the image bearing member than the second density are outputted. The setting portion 30 sets the first transfer voltage by using the density information of the first test images and the third test images (low-density priority), and sets the second transfer voltage by using the density information of the second test images and the third test images (high-density PY). Specifically, in this embodiment, the setting portion 30 sets the first transfer voltage on the basis of information on the transfer voltage when the first test image, of the plurality of first test images, of which density information satisfies a predetermined condition is transferred onto the recording material S and on the transfer voltage when the third test image, of the plurality of third test images, of which density information satisfies a predetermined condition is transferred onto the recording material S. The setting portion 30 sets the second transfer voltage on the basis of information on the transfer voltage when the second test image, of the plurality of second test images, of which density information satisfies a predetermined condition is transferred onto the recording material S and on the transfer voltage when the third test image, of the plurality of third test images, of which density information satisfies a predetermined condition is transferred onto the recording material S. In this embodiment, an absolute value of the second transfer voltage is not less than an absolute value of the first transfer voltage. Further, in this embodiment, the executing portion 31*d* may be capable of carrying out, depending on the instruction information (inputted by the inputting portion 70), control so as to execute the operation in the first output mode in which the chart 100 formed by transferring only the first and third test images of the first, second, and third test images is outputted or so as to execute the operation in the second output mode in which the chart 100 formed by transferring only the second and third test images of the first, second and third test images is outputted. Further, in this embodiment, the first and second test images are the half-tone images, and the third test images are the solid images.

As described above, according to this embodiment, in the operation in the adjusting mode, the priority image (low-density priority image, high-density priority image) selected by the user can be reflected in the adjusting value. Accordingly, according to this embodiment, it becomes possible to appropriately adjust the secondary transfer voltage for the priority image selected by the user.

OTHER EMBODIMENTS

As described above, the present invention was described based on the specific Embodiments, but the present invention is not limited to the above-described embodiments.

In the above-described embodiments, the secondary transfer voltage was adjusted using the adjusting value corresponding to the predetermined adjusting amount, but for example, the adjusting amount may also be directly set by the adjusting screen.

Further, in the above-described embodiments, the controller acquired the adjusting amount (adjusting value) of the secondary transfer voltage for either one of the selected priority images in a single operation in the adjusting mode. On the other hand, the controller may also acquire and store adjusting amounts (adjusting values) of the secondary transfer voltage for a plurality (may be all) of choices of the priority image in the single operation in the adjusting mode. Before or after the plurality of adjusting amounts (adjusting values) are acquired and stored as described above, the operator (user) is capable of detecting the priority image similarly as described above. Further, the controller is capable of setting the secondary transfer voltage by using the adjusting amount (adjusting value), corresponding to the priority image selected by the operator, selected from the plurality of stored adjusting amounts (adjusting values).

Further, in the above-described embodiments, the operation performed through the operating portion of the image forming apparatus can be made by the external device. That is, the operator operates the image forming apparatus 1 through the operating portion 70 and executes the operation in the adjusting mode, but the operation in the adjusting mode may also be executed by the operation of the image forming apparatus 1 through the external device 200 such as the personal computer. In this case, it is possible to make setting similar to those in the above-described embodiments through a screen displayed at a display portion of the external device 200 by a driver program of the image forming apparatus 1 installed in the external device 200.

Further, in the above-described embodiments, the constitution in which the secondary transfer voltage is subjected to the constant-voltage control was described, but the secondary transfer voltage may also be subjected to constant-current control. In the above-described embodiments, in the constitution in which the secondary transfer voltage is subjected to the constant-voltage control, the secondary transfer voltage was adjusted by adjusting the target voltage during the application of the secondary transfer voltage by the operation in the adjusting mode. In the case of the constitution in which the secondary transfer voltage is subjected to the constant-current control, the secondary transfer voltage can be adjusted by adjusting a target current during the application of the secondary transfer voltage by the operation in the adjusting mode.

Further, the current detection result and the voltage detection result may be an average of a plurality of sampling values acquired in a predetermined sampling interval at one detection timing. Further, in the case where the transfer voltage is subjected to the constant voltage control, the voltage value may be detected (discriminated) from an output instruction value to the power source, and in the case where the transfer voltage is subjected to the control current control, the current value may be detected (discriminated) from an output instruction value to the power source.

Further, in this embodiment, in the operation in the adjusting mode, the chart was used by using the in-line image sensors (first and second line sensors 91 and 92). By this, a load of the operator can be alleviated. However, the present invention is not limited to the above-described embodiments, but for example, the chart outputted in the operation in the adjusting mode is set on the image reading portion 80 as the acquiring portion and then may be read by the image reading portion 80. Thus, the acquiring portion 80 may acquire the density information of the test images on the recording material S after the recording material S on which the chart is formed is set on the acquiring portion 80. Further, for example, the chart outputted in the operation in the adjusting mode may be read by using the image reading means prepared separately from the image forming apparatus 1 by the operator. In this case, information on read image, brightness information (density information) of read patch, or information on adjusting values (adjusting amounts) processed and selected by the external device on the basis of these pieces of the information can be inputted to the image forming apparatus 1. This information input can be performed via a network or by the operating portion 70 or the like via a storing medium, or can be directly performed by key input from the operating portion 70 by the operator. Further, on the basis of the image information or the brightness information (density information), the controller 30 of the image forming apparatus 1 is capable of presenting a recommended adjusting amount of the secondary transfer voltage similarly as in the above-described embodiments.

Further, in the above-described embodiments, as regards the image forming apparatus, the printer unit and the sensing unit were prepared as a unit, but the present invention is not limited thereto. By employing such a constitution, for example, these units are made separable, so that a function of the sensing unit can be prepared as an extension function of the image forming apparatus. However, the constitution of the printer unit and the constitution of the sensing unit in the above-described embodiments may also be disposed and assembled into a unit in a single casing, for example.

Further, the image forming apparatus is not limited to the image forming apparatus of the tandem type, but may also be image forming apparatus of other types. In addition, the image forming apparatus is not limited to the image forming apparatus capable of forming a full-color image, but may also be an image forming apparatus capable of forming a monochromatic (white/black) or mono-color image. For example, the present invention may be applied to a transfer portion in the image forming apparatus having a constitution in which the toner image is formed on the photosensitive drum as the image bearing member and then is directly transferred onto the recording material in the transfer portion. Further, the image forming apparatus may be image forming apparatuses for various uses, such as printers, various printing machines, copying machines, facsimile machines, and multi-function machines.

According to the present invention, it becomes possible to appropriately adjust the transfer voltage for the priority image selected by the user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-033980 filed on Mar. 4, 2022, which is hereby incorporated by reference herein in its entirety.

What is claimed is:

1. An image forming apparatus comprising:

an image bearing member configured to bear a toner image;

a transfer device configured to transfer the toner image from the image bearing member to a recording material;

an applying portion configured to apply a voltage to the transfer device;

a detecting portion configured to detect density information on a density of an image on the recording material onto which the image is transferred by the transfer device;

a controller configured to execute an operation in a setting mode in which during non-image formation, a plurality of test images are transferred onto the recording material under application of different test voltages to the transfer device and then a transfer voltage applied to the transfer device during image formation is set on the basis of a detection result of the test images transferred onto the recording material as detected by the detecting portion; and a receiving portion configured to receive instruction information, wherein in a case that the operation in the setting mode is executed to set the transfer voltage for a one-side mode in which an image is formed on one side of a predetermined recording material, the receiving portion is capable of receiving the instruction information selectively instructing a mode to be executed from a plurality of modes including a first setting mode in which the transfer voltage is set so that the transfer voltage set in the setting mode satisfies a first predetermined condition and a second setting mode in which the transfer voltage is set so that the transfer voltage set in the setting mode satisfies a second predetermined condition different from the first predetermined condition, wherein the test images include a plurality of first test images having a first density on the image bearing member and a plurality of second test images having a second density on the image bearing member, the second density being higher than the first density, and wherein the first predetermined condition includes a first condition regarding the plurality of first test images and the second predetermined condition includes a second condition regarding the plurality of first test images and being different from the first condition.

2. An image forming apparatus according to claim 1, wherein in the first setting mode, the transfer voltage is set with priority of transfer property of an image with a first density, and in the second setting mode, the transfer voltage is set with priority of transfer property of an image with a second density higher than the first density.

3. An image forming apparatus according to claim 1, wherein in a case in which the transfer voltage is capable of being set so as to satisfy that an image density after the plurality of the first test images are transferred is a first threshold or more and an image density after the plurality of the second test images are transferred is a second threshold or more, the transfer voltage is set so that the image density after the plurality of the first test images are transferred is the first threshold or more and the transfer voltage is set so that the image density after the plurality of the second test images are transferred is the second threshold or more when the first setting mode is selected, and the transfer voltage is set so that the image density after the plurality of the first test images are transferred is less than the first threshold and the transfer voltage is set so that the image density after the plurality of the second test images are transferred is less than the second threshold when the second setting mode is selected.

4. An image forming apparatus according to claim 1, wherein the transfer voltage set in the second setting mode is higher than the transfer voltage set in the first setting mode.

5. An image forming apparatus according to claim 3, wherein the first test images are half-tone images and the second test images are solid images.

* * * * *